US012699489B2

(12) United States Patent (10) Patent No.: US 12,699,489 B2
Lim (45) Date of Patent: Aug. 4, 2026

(54) ELECTRONIC DEVICE

(71) Applicant: Samsung Display Co., Ltd., Yongin-si (KR)

(72) Inventor: Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/187,559

(22) Filed: Apr. 23, 2025

(65) Prior Publication Data

US 2026/0016921 A1 Jan. 15, 2026

(30) Foreign Application Priority Data

Jul. 9, 2024 (KR) ........................ 10-2024-0090219

(51) Int. Cl.
*G06F 3/044* (2006.01)
*G06F 3/041* (2006.01)
(52) U.S. Cl.
CPC ........ *G06F 3/0443* (2019.05); *G06F 3/04162* (2019.05); *G06F 3/04166* (2019.05); *G06F 3/0442* (2019.05); *G06F 3/0446* (2019.05); *G06F 2203/04106* (2013.01)
(58) Field of Classification Search
CPC ............... G06F 3/0443; G06F 3/04162; G06F 3/04166; G06F 3/0442; G06F 3/0446; G06F 2203/04106; G06F 3/04164; G06F 3/0445
See application file for complete search history.

(56) References Cited

U.S. PATENT DOCUMENTS

| | | | |
|---|---|---|---|
| 2017/0068342 A1* | 3/2017 | Zimmerman | ......... G06F 3/0414 |
| 2018/0018029 A1 | 1/2018 | Lim et al. | |
| 2020/0033972 A1* | 1/2020 | Huang | ................. G06F 3/0412 |
| 2020/0381486 A1* | 12/2020 | Jeong | ................... G06F 3/0446 |
| 2021/0151513 A1 | 5/2021 | Lee et al. | |
| 2022/0093716 A1* | 3/2022 | Lee | ........................ H10K 59/40 |
| 2022/0404931 A1 | 12/2022 | Kim et al. | |
| 2023/0031348 A1* | 2/2023 | Zhang | ................... G06F 3/0418 |

FOREIGN PATENT DOCUMENTS

| | | |
|---|---|---|
| KR | 10-2018-0007388 A | 1/2018 |
| KR | 10-2021-0058528 A | 5/2021 |
| KR | 10-2022-0145666 A | 10/2022 |
| KR | 10-2022-0169972 A | 12/2022 |

* cited by examiner

*Primary Examiner* — Andrew Sasinowski
(74) *Attorney, Agent, or Firm* — Womble Bond Dickinson (US) LLP

(57) ABSTRACT

An electronic device includes: a sensor layer having an active area, and a peripheral area adjacent to the active area; and a sensor driver to drive the sensor layer by selectively operating in a first mode to sense a touch input or in a second mode to sense a pen input. The sensor layer includes: first electrodes along a first direction, and extending in a second direction crossing the first direction; second electrodes along the second direction, and extending in the first direction; first auxiliary electrodes along the first direction, and extending in the second direction; a first trace line in the peripheral area, and connected with the first auxiliary electrodes; and a first additional electrode in the peripheral area, and including: a first portion overlapping with the first trace line in a plan view; and a second portion connecting one end of the first portion with the sensor driver.

20 Claims, 42 Drawing Sheets

ELECTRONIC DEVICE

CROSS-REFERENCE TO RELATED APPLICATION

The present application claims priority to and the benefit of Korean Patent Application No. 10-2024-0090219, filed on Jul. 9, 2024, in the Korean Intellectual Property Office, the entire disclosure of which is incorporated by reference herein.

BACKGROUND

Aspects of embodiments of the present disclosure relate to an electronic device for sensing an input by a pen.

Multimedia electronic devices, such as a television, a mobile phone, a tablet computer, a notebook computer, a car navigation unit, a game machine, and the like, include a display device for displaying an image. The electronic devices may include a sensor layer (e.g., an input sensor) capable of providing a touch-based input method that enables a user to intuitively and conveniently input information or instructions in an easy and simple manner, in addition to other input methods, such as a button, a keyboard, a mouse, or the like. The sensor layer may sense the user's touch or pressure. Recently, pens for users who are accustomed to inputting information using writing instruments or pens for more accurate touch inputs in specific application programs (e.g., application programs for sketching or drawing) have been increasingly demanded.

The above information disclosed in this Background section is for enhancement of understanding of the background of the present disclosure, and therefore, it may contain information that does not constitute prior art.

SUMMARY

One or more embodiments of the present disclosure may be directed to an electronic device for sensing an input by a pen.

According to one or more embodiments of the present disclosure, an electronic device includes: a sensor layer having an active area, and a peripheral area adjacent to the active area; and a sensor driver configured to drive the sensor layer by selectively operating in a first mode to sense a touch input or in a second mode to sense a pen input. The sensor layer includes: a plurality of first electrodes along a first direction, and extending in a second direction crossing the first direction; a plurality of second electrodes along the second direction, and extending in the first direction; a plurality of first auxiliary electrodes along the first direction, and extending in the second direction; a first trace line in the peripheral area, and connected with the plurality of first auxiliary electrodes; and a first additional electrode in the peripheral area, and including: a first portion overlapping with the first trace line in a plan view; and a second portion connecting one end of the first portion with the sensor driver.

In an embodiment, a coupling capacitor may be defined between the first portion and the first trace line.

In an embodiment, in a plan view, the second portion may be spaced from the active area with the first trace line therebetween.

In an embodiment, the first portion may extend in the first direction, and the second portion may extend in the second direction.

In an embodiment, the first portion may be located over the first trace line.

In an embodiment, the sensor driver may be configured to sense coordinates of the pen input based on one of the plurality of first electrodes and the first additional electrode.

In an embodiment, the sensor driver may further include a receiver electrically connected with the one of the plurality of first electrodes and the first additional electrode, the receiver including: an amplifier including a first input terminal, a second input terminal, and an output terminal; a first feedback capacitor connected between the first input terminal and the output terminal; and a second feedback capacitor connected between the second input terminal and the output terminal. A capacitance of the first feedback capacitor may be different from a capacitance of the second feedback capacitor.

In an embodiment, the sensor layer may further include a plurality of second trace lines connected with the plurality of second electrodes, respectively, and the second portion may be located between the first trace line and the plurality of second trace lines in a plan view.

In an embodiment, a second-first coupling capacitor may be defined between the second portion and the first trace line, and a second-second coupling capacitor may be defined between the second portion and each of the plurality of second trace lines.

In an embodiment, the second portion may include: a first sub-portion having a first area; and a second sub-portion overlapping with the first trace line in a plan view, the second sub-portion having a second area greater than the first area.

In an embodiment, the second portion may overlap with the first trace line in a plan view.

In an embodiment, the second portion may include: a first sub-portion having a first width; and a second sub-portion having a second width different from the first width.

In an embodiment, the second portion may have an uneven shape.

In an embodiment, the first additional electrode may further include a protruding portion protruding from the first portion and located in the active area.

In an embodiment, the protruding portion may overlap with one of the plurality of first electrodes in a plan view.

In an embodiment, the protruding portion may overlap with one of the plurality of first auxiliary electrodes in a plan view.

In an embodiment, the sensor layer may further include a second additional electrode in the peripheral area, and spaced from the first additional electrode in the first direction with the active area therebetween.

In an embodiment, the first additional electrode and the second additional electrode may be connected with each other.

In an embodiment, in the second mode, the sensor driver may be connected with one of the first additional electrode or the second additional electrode, and another one of the first additional electrode or the second additional electrode may be floated.

According to one or more embodiments of the present disclosure, an electronic device includes: a sensor layer; and a sensor driver including a plurality of receivers, the sensor driver being configured to selectively operate in a first mode to sense a touch input or in a second mode to sense a pen input. The sensor layer includes: a plurality of first electrodes along a first direction, and extending in a second direction crossing the first direction; a plurality of second electrodes along the second direction, and extending in the first direction; a plurality of first auxiliary electrodes along the first direction, and extending in the second direction; and a first trace line connected with the plurality of first auxiliary electrodes, the first trace line including a first end and a second end. When one of the plurality of receivers is connected with the first end in the second mode, another one of the plurality of receivers is not connected with the second end. When another one of the plurality of receivers is connected with the second end, the one of the plurality of receivers is not connected with the first end.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

FIG. 23 is a plan view illustrating a portion of a sensor layer according to an embodiment of the present disclosure.

FIG. 25 is a plan view illustrating a portion of a sensor layer according to an embodiment of the present disclosure.

FIG. 26 is a plan view illustrating a portion of a sensor layer according to an embodiment of the present disclosure.

DETAILED DESCRIPTION

Figure 1A:
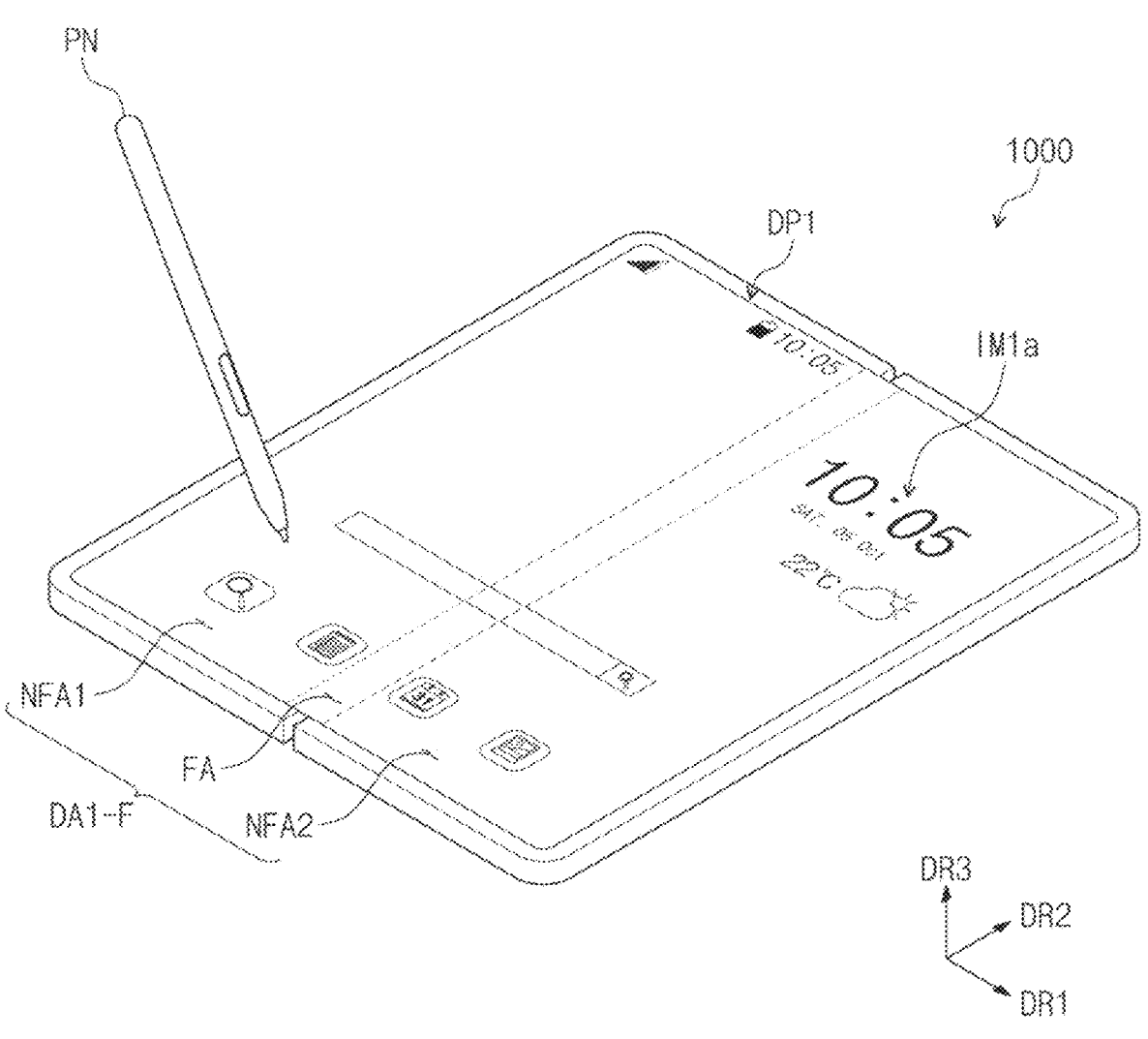
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

As used herein, the terms "part" and "unit" may refer to a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmware, micro-codes, circuits, data, databases, data structures, tables, arrays, or variables.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
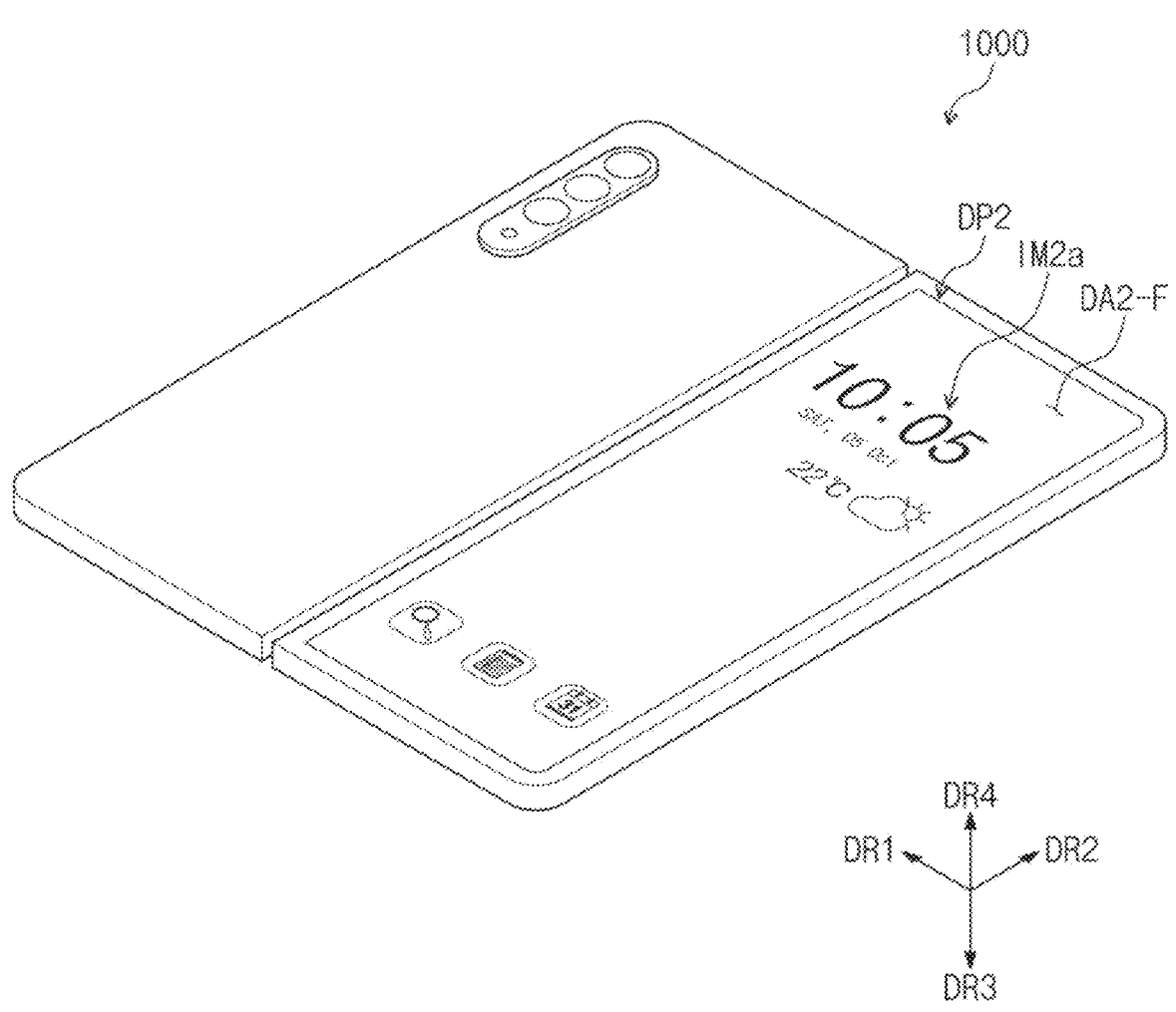
FIG. 1B is a rear perspective view of the electronic device according to an embodiment of the present disclosure.

FIG. 1A is a perspective view of an electronic device according to an embodiment of the present disclosure. FIG. 1B is a rear perspective view of the electronic device according to an embodiment of the present disclosure.

Referring to FIGS. 1A and 1B, the electronic device 1000 may be a device that is activated depending on an electrical signal. For example, the electronic device 1000 may display an image, and may sense an input applied from the outside. The external input may be a user input. The user input may include various suitable kinds of external inputs, such as a part of a user's body, a pen PN, light, heat, or pressure.

The electronic device 1000 may include a first display panel DP1 and a second display panel DP2. The first display panel DP1 and the second display panel DP2 may be separate panels that are separated from each other. The first display panel DP1 may be referred to as a main display panel, and the second display panel DP2 may be referred to as an auxiliary display panel or an external display panel.

The first display panel DP1 may include a first display part DA1-F, and the second display panel DP2 may include a second display part DA2-F. The second display panel DP2 may have a smaller area than that of the first display panel DP1. In correspondence to the sizes of the first display panel DP1 and the second display panel DP2, the area of the first display part DA1-F may be greater than the area of the second display part DA2-F.

In an unfolded state of the electronic device 1000, the first display part DA1-F may have a plane that is parallel to or substantially parallel to a first direction DR1 and a second direction DR2. The thickness direction of the electronic device 1000 may be parallel to or substantially parallel to a third direction DR3 that crosses the first direction DR1 and the second direction DR2. Accordingly, front surfaces (e.g., upper surfaces) and rear surfaces (e.g., lower surfaces) of members constituting the electronic device 1000 may be defined based on the third direction DR3.

The first display panel DP1 or the first display part DA1-F may include a folding area FA that is folded and unfolded, and a plurality of non-folding areas NFA1 and NFA2 spaced apart from each other with the folding area FA therebetween. The second display panel DP2 may overlap with one of the plurality of non-folding areas NFA1 and NFA2. For example, the second display panel DP2 may overlap with the first non-folding area NFA1.

The display direction of a first image IM1*a* displayed on a portion of the first display panel DP1, for example, such as on the first non-folding area NFA1, may be opposite to the display direction of a second image IM2*a* displayed on the second display panel DP2. For example, the first image IM1*a* may be displayed in the third direction DR3, and the second image IM2*a* may be displayed in a fourth direction DR4 opposite to the third direction DR3.

In an embodiment of the present disclosure, the folding area FA may be bent about a folding axis extending in a direction parallel to or substantially parallel to the long sides of the electronic device 1000, for example, such as in a direction parallel to or substantially parallel to the second direction DR2. The folding area FA may have a suitable curvature (e.g., a certain or predetermined curvature) and a suitable radius of curvature (e.g., a certain or predetermined radius of curvature) in a folded state of the electronic device 1000. The electronic device 1000 may be folded in an in-folding manner, such that the first non-folding area NFA1 and the second non-folding area NFA2 face each other, and the first display part DA1-F is not exposed to the outside.

In an embodiment of the present disclosure, the electronic device 1000 may be folded in an out-folding manner, such that the first display part DA1-F is exposed to the outside. In an embodiment of the present disclosure, the electronic device 1000 may be folded in an in-folding manner or an out-folding manner from the unfolded state. However, the present disclosure is not limited thereto.

Although FIG. 1A illustrates an example in which one folding area FA is defined in the electronic device 1000, the present disclosure is not limited thereto. For example, a plurality of folding axes and a plurality of folding areas corresponding thereto may be defined in the electronic device 1000, and the electronic device 1000 may be folded about the plurality of folding axes in an in-folding manner or an out-folding manner from the unfolded state.

According to an embodiment of the present disclosure, at least one of the first display panel DP1 or the second display panel DP2 may sense an input by the pen PN without including or suing a digitizer. Because the digitizer for sensing the pen PN may be omitted, an increase in the thickness and the weight of the electronic device 1000 and a decrease in the flexibility of the electronic device 1000 depending on an addition of a digitizer may not occur. Accordingly, not only the first display panel DP1, but also the second display panel DP2, may be designed to sense the pen PN.

Figure 2:
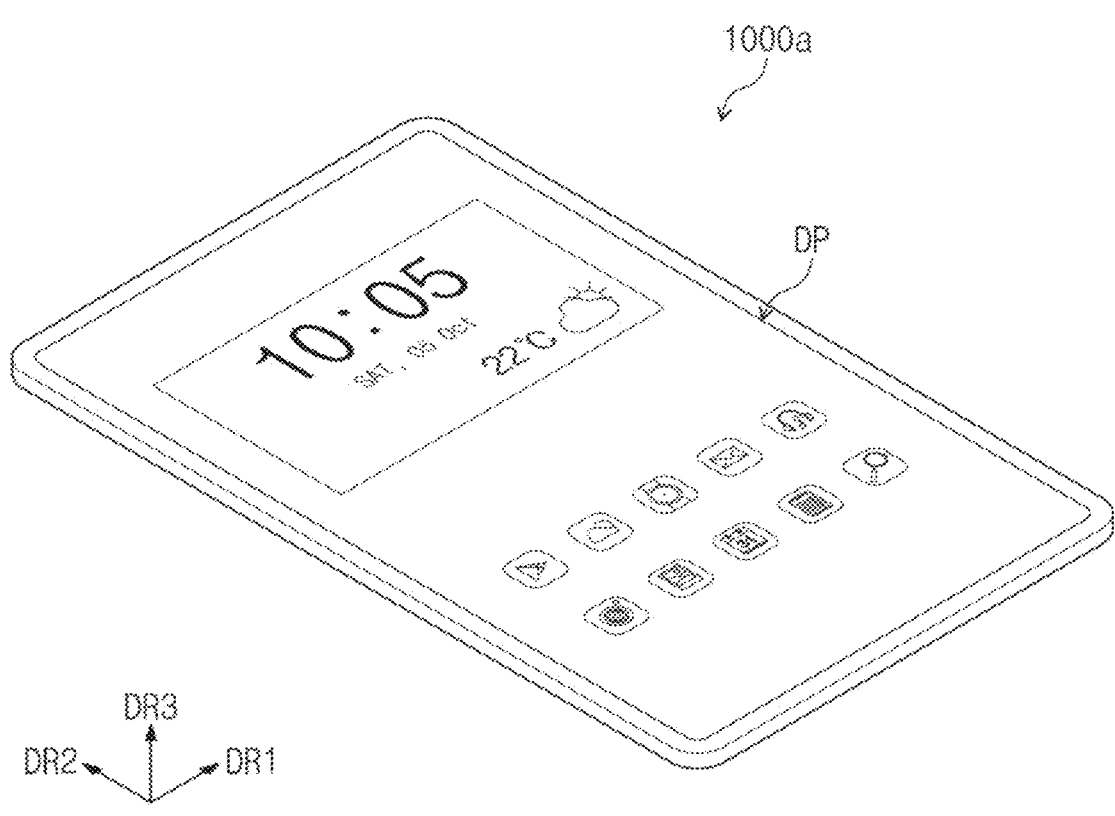
FIG. 2 is a perspective view of an electronic device according to an embodiment of the present disclosure.
Figure 3:
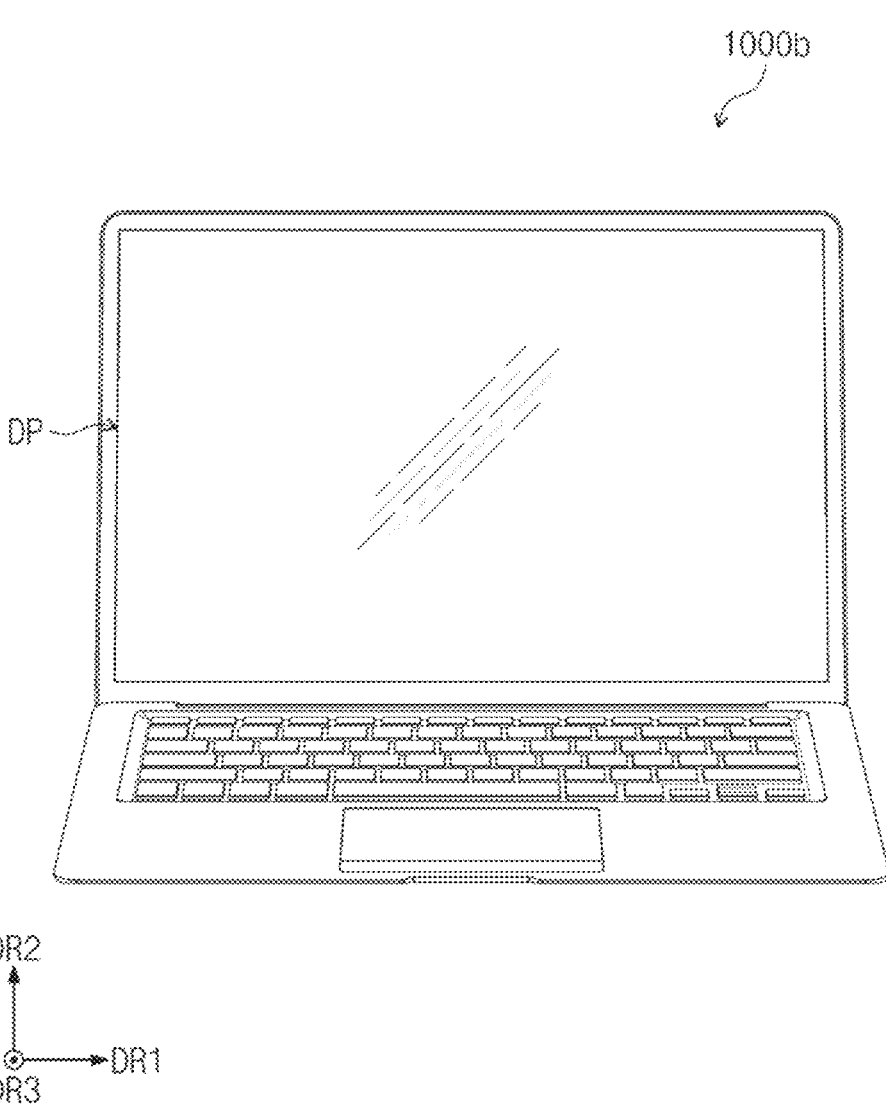
FIG. 3 is a perspective view of an electronic device according to an embodiment of the present disclosure.

FIG. 2 is a perspective view of an electronic device according to an embodiment of the present disclosure. FIG. 3 is a perspective view of an electronic device according to an embodiment of the present disclosure.

FIG. 2 illustrates an example in which the electronic device 1000*a* is a mobile phone, and the electronic device 1000*a* may include a display panel DP. FIG. 3 illustrates an example in which the electronic device 1000*b* is a notebook computer, and the electronic device 1000*b* may include the display panel DP.

In an embodiment of the present disclosure, the display panel DP may sense an external input applied from the outside. The external input may be a user input. The user input may include various suitable kinds of external inputs, such as a part of the user's body, the pen PN (e.g., refer to FIG. 1A), light, heat, or pressure.

According to an embodiment of the present disclosure, the display panel DP may sense an input by the pen PN (e.g., refer to FIG. 1A) without a digitizer. Because the digitizer for sensing the pen PN may be omitted, an increase in the thickness and the weight of the electronic device 1000*a* or 1000*b* depending on the addition of the digitizer may not occur.

Although the foldable electronic device 1000 is illustrated in FIG. 1A and a bar-type electronic device 1000*a* is illustrated in FIG. 2, the present disclosure is not limited thereto. For example, embodiments of the present disclosure may be applied to various suitable electronic devices, such as a rollable electronic device, a slidable electronic device, and a stretchable electronic device.

Figure 4:
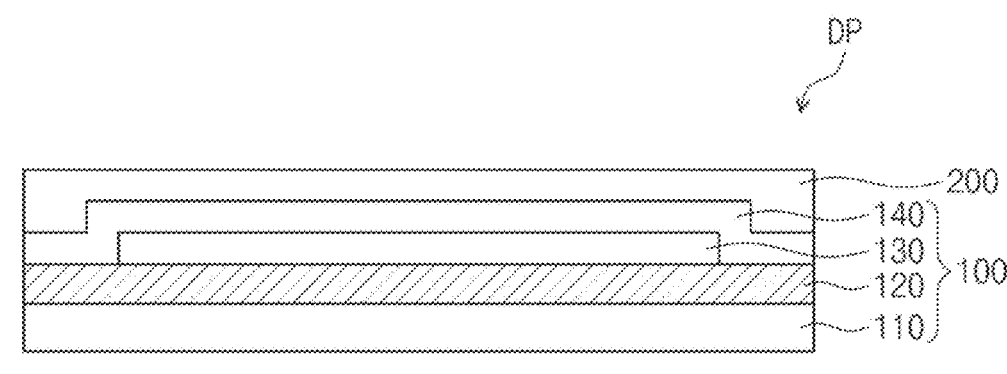
FIG. 4 is a schematic sectional view of a display panel according to an embodiment of the present disclosure.
Figure 4:
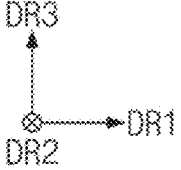

FIG. 4 is a schematic sectional view of the display panel according to an embodiment of the present disclosure.

Referring to FIG. 4, the display panel DP may include a display layer 100 and a sensor layer 200.

The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, or a polymer substrate, but the present disclosure is not particularly limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a suitable process, such as coating or deposition. The insulating layer, the semiconductor layer, and the conductive layer may be selectively subjected to patterning by performing a photolithography process a plurality of times.

The light emitting element layer 130 may be disposed on the circuit layer 120. The light emitting element layer 130 may include light emitting elements. For example, the light emitting element layer 130 may include an organic luminescent material, an inorganic luminescent material, an organic-inorganic luminescent material, a quantum dot, a quantum rod, a micro LED, or a nano LED.

The encapsulation layer 140 may be disposed on the light emitting element layer 130. The encapsulation layer 140 may protect the light emitting element layer 130 from foreign matter, such as moisture, oxygen, and dust particles.

The sensor layer 200 may be disposed on the display layer 100. The sensor layer 200 may sense an external input applied from the outside. The sensor layer 200 may be an integrated sensor continuously formed in the process of manufacturing the display layer 100. As another example, the sensor layer 200 may be an external sensor that is attached to the display layer 100. The sensor layer 200 may be referred to as a sensor, an input sensing layer, an input sensing panel, or an electronic device for sensing input coordinates.

According to an embodiment of the present disclosure, the sensor layer 200 may sense both an input by a passive input means, such as a part of the user's body, and an input by the input device PN (e.g., refer to FIG. 1A) that generates a magnetic field having a suitable resonant frequency (e.g., a certain or predetermined resonant frequency).

Figure 5:
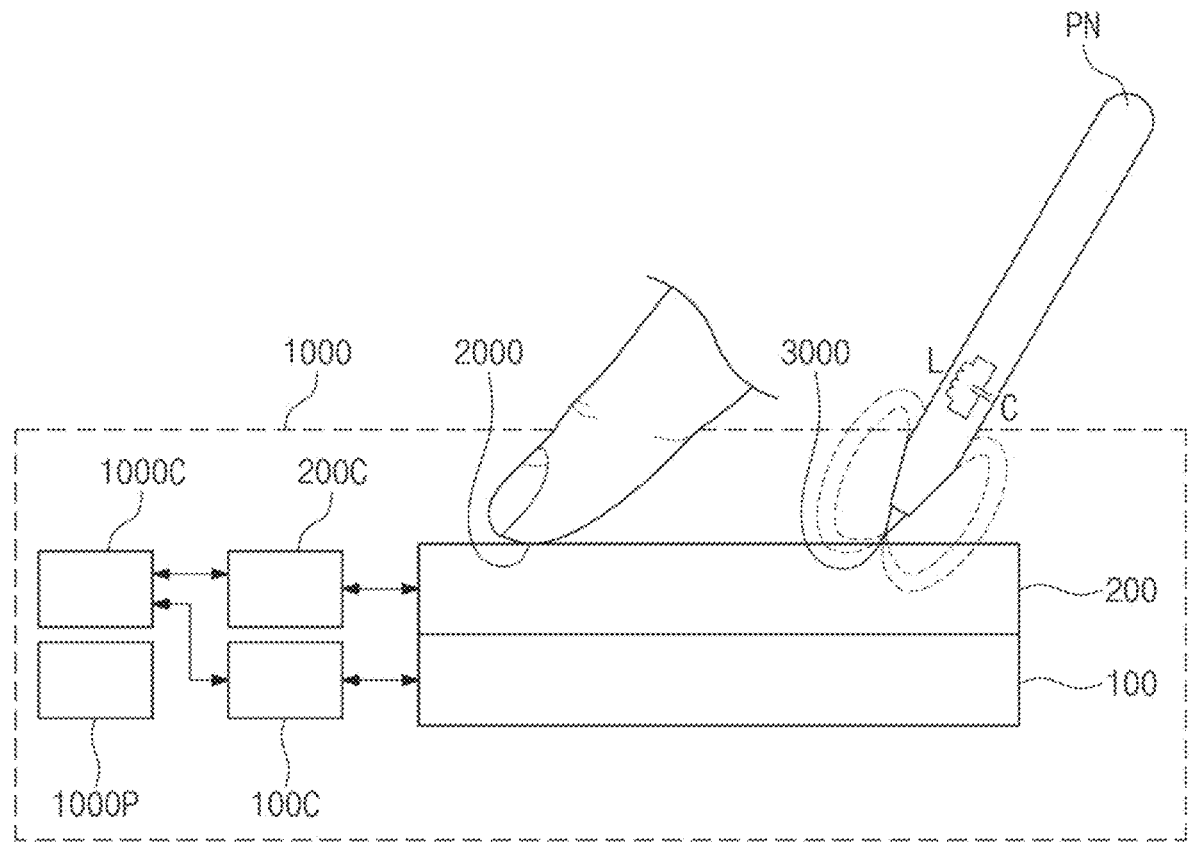
FIG. 5 is a block diagram illustrating an electronic device according to an embodiment of the present disclosure.

FIG. 5 is a block diagram illustrating an electronic device according to an embodiment of the present disclosure.

Referring to FIG. 5, the electronic device 1000 may include the display layer 100, the sensor layer 200, a display driver 100C, a sensor driver 200C, a main driver 1000C, and a power circuit 1000P.

The sensor layer 200 may sense a first input 2000 or a second input 3000 applied from the outside. Each of the first input 2000 and the second input 3000 may be an input by an input means capable of changing a capacitance of the sensor layer 200, or an input by an input means capable of causing an induced current in the sensor layer 200. For example, the first input 2000 may be an input by a passive input means, such as a part of the user's body. The second input 3000 may be an input by the pen PN, or an input by an RFIC tag. For example, the pen PN may be a pen of a passive kind or a pen of an active kind.

In an embodiment of the present disclosure, the pen PN may be a device that generates a magnetic field having a suitable resonant frequency (e.g., a certain or predetermined resonant frequency). The pen PN may transmit an output signal based on an electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the present disclosure, the RLC resonance circuit may be a variable resonance circuit that varies the resonant frequency. In this case, the inductor L may be a variable inductor, and/or the capacitor C may be a variable capacitor. However, the present disclosure is not particularly limited thereto.

The inductor L generates a current by a magnetic field formed in the sensor layer 200. However, the present disclosure is not particularly limited thereto. For example, when the pen PN operates in an active type, the pen PN may generate a current even though a magnetic field is not provided to the pen PN from the outside. The generated current is transferred to the capacitor C. The capacitor C charges the current input from the inductor L and discharges the charged current to the inductor L. Thereafter, the inductor L may emit a magnetic field having a suitable resonant frequency (e.g., a certain or predetermined resonant frequency). An induced current may flow in the sensor layer 200 by the magnetic field emitted from the pen PN. The induced current may be transferred to the sensor driver 200C as a reception signal (e.g., a sensing signal or a signal).

The main driver 1000C may control overall operation of the electronic device 1000. For example, the main driver 1000C may control operations of the display driver 100C and the sensor driver 200C. The main driver 1000C may include at least one microprocessor and may further include a graphic controller. The main driver 1000C may be referred to as an application processor, a central processing unit, or a main processor.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode determination signal for determining an operating mode of the sensor driver 200C and the sensor layer 200.

The sensor driver 200C may be implemented with an integrated circuit (IC) and may be electrically connected with the sensor layer 200. For example, the sensor driver 200C may be directly mounted on a certain area of the display panel. As another example, the sensor driver 200C may be mounted on a separate printed circuit board using a chip on film (COF) method and may be electrically connected with the sensor layer 200.

The sensor driver 200C and the sensor layer 200 may selectively operate in a first mode or a second mode. For example, the first mode may be a mode for sensing a touch input, for example, the first input 2000. The second mode may be a mode for sensing an input by the pen PN, for example, the second input 3000. The first mode may be referred to as a touch sensing mode, and the second mode may be referred to as a pen sensing mode.

Switching between the first mode and the second mode may be performed in various ways. For example, the sensor driver 200C and the sensor layer 200 may be driven in the first mode and the second mode in a time-division manner and may sense the first input 2000 and the second input 3000. As another example, the switching between the first mode and the second mode may be performed by the user's selection or the user's specific action. In another case, by activating or deactivating a specific application, one of the first mode and the second mode may be activated or deactivated, or the operating mode may be switched from one mode to the other mode. In yet another case, when the first input 2000 is sensed while the sensor driver 200C and the sensor layer 200 alternately operate in the first mode and the second mode, the sensor driver 200C and the sensor layer 200 may remain in the first mode, and when the second input 3000 is sensed, the sensor driver 200C and the sensor layer 200 may remain in the second mode.

The sensor driver 200C may calculate coordinate information of an input based on a signal received from the sensor layer 200 and may provide a coordinate signal having the coordinate information to the main driver 1000C. The main driver 1000C executes an operation corresponding to the user input, based on the coordinate signal. For example, the main driver 1000C may operate the display driver 100C such that a new application image is displayed on the display layer 100.

The power circuit 1000P may include a power management integrated circuit (PMIC). The power circuit 1000P may generate a plurality of drive voltages for driving the display layer 100, the sensor layer 200, the display driver 100C, and the sensor driver 200C. For example, the plurality of drive voltages may include a gate high-voltage, a gate low-voltage, a first drive voltage (e.g., an ELVSS voltage), a second drive voltage (e.g., an ELVDD voltage), an initialization voltage, and the like, but are not particularly limited to the examples.

Figure 6:
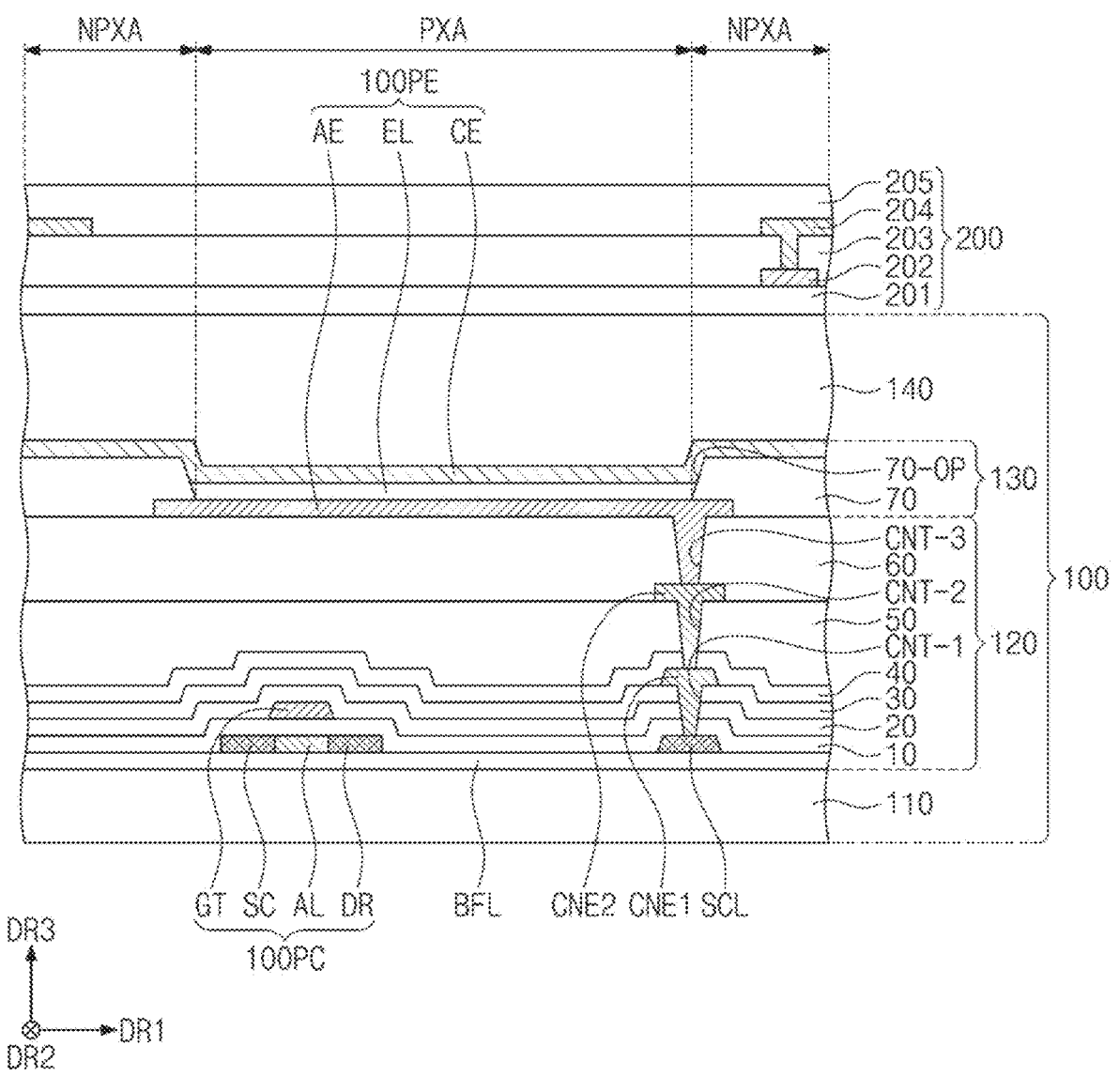
FIG. 6 is a sectional view of the display panel according to an embodiment of the present disclosure.

FIG. 6 is a sectional view of the display panel according to an embodiment of the present disclosure.

Referring to FIG. 6, at least one buffer layer BFL is formed on the upper surface of the base layer 110. The buffer layer BFL may improve a coupling force between the base layer 110 and a semiconductor pattern. The buffer layer BFL may be formed of multiple layers. As another example, the display layer 100 may further include a barrier layer. The buffer layer BFL may include at least one of silicon oxide, silicon nitride, or silicon oxy nitride. For example, the buffer layer BFL may include a structure in which silicon oxide layers and silicon nitride layers are alternately stacked one above another.

The semiconductor pattern SC, AL, DR, and SCL may be disposed on the buffer layer BFL. The semiconductor pattern SC, AL, DR, and SCL may include poly silicon. However, without being limited thereto, the semiconductor pattern SC, AL, DR, and SCL may include amorphous silicon, a low-temperature polycrystalline silicon, or an oxide semiconductor.

FIG. 6 illustrates only the semiconductor pattern SC, AL, DR, and SCL, and semiconductor patterns may be additionally disposed in other areas. The semiconductor pattern SC, AL, DR, and SCL may be arranged according to a specific rule across pixels. The semiconductor pattern SC, AL, DR, and SCL may have different electrical properties depending on whether doping is performed or not. The semiconductor pattern SC, AL, DR, and SCL may include first areas SC, DR, and SCL having a high conductivity and a second area AL having a low conductivity. The first areas SC, DR, and SCL may be doped with an N-type dopant or a P-type dopant. A P-type transistor may include a doped area doped with a P-type dopant, and an N-type transistor may include a doped area doped with an N-type dopant. The second area AL may be a non-doped area or may be an area more lightly doped than the first areas SC, DR, and SCL.

The first areas SC, DR, and SCL may have a higher conductivity than the second area AL and may substantially serve as electrodes or signal lines. The second area AL may substantially correspond to an active area AL (e.g., a channel) of a transistor 100PC. In other words, one portion AL of the semiconductor pattern SC, AL, DR, and SCL may be the active area AL of the transistor 100PC, another portion SC or DR may be a source area SC or a drain area DR of the transistor 100PC, and the other portion SCL may be a connecting electrode or a connecting signal line SCL.

Each of the pixels may have an equivalent circuit including seven transistors, one capacitor, and a light emitting element, and the equivalent circuit of the pixel may be modified in various forms. In FIG. 6, one transistor 100PC and one light emitting element 100P E included in the pixel are illustrated as an example.

The source area SC, the active area AL, and the drain area DR of the transistor 100PC may be formed from the semiconductor pattern SC, AL, DR, and SCL. The source area SC and the drain area DR may extend from the active area AL in opposite directions on the cross-section. In FIG. 6, a portion of the connecting signal line SCL formed from the semiconductor pattern SC, AL, DR, and SCL is illustrated. Although not separately illustrated, the connecting signal line SCL may be connected to the drain area DR of the transistor 100PC when viewed from above the plane.

A first insulating layer 10 may be disposed on the buffer layer BFL. The first insulating layer 10 may commonly overlap the plurality of pixels and may cover the semiconductor pattern SC, AL, DR, and SCL. The first insulating layer 10 may be an inorganic layer and/or an organic layer and may have a single-layer structure or a multi-layered structure. The first insulating layer 10 may include at least one of aluminum oxide, titanium oxide, silicon oxide, silicon nitride, silicon oxy nitride, zirconium oxide, or hafnium oxide. In this embodiment, the first insulating layer 10 may be a single silicon oxide layer. Not only the first insulating layer 10 but also insulating layers of the circuit layer 120 that will be described below may be inorganic layers and/or organic layers and may have a single-layer structure or a multi-layered structure. The inorganic layers may include at least one of the aforementioned materials, but are not limited thereto.

A gate GT of the transistor 100PC is disposed on the first insulating layer 10. The gate GT may be a portion of a metal pattern. The gate GT overlaps the active area AL. The gate GT may function as a mask in a process of doping or reducing the semiconductor pattern SC, AL, DR, and SCL.

A second insulating layer 20 may be disposed on the first insulating layer 10 and may cover the gate GT. The second insulating layer 20 may commonly overlap the pixels. The second insulating layer 20 may be an inorganic layer and/or an organic layer and may have a single-layer structure or a multi-layered structure. The second insulating layer 20 may include at least one of silicon oxide, silicon nitride, or silicon oxy nitride. In this embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer structure or a multi-layered structure. For example, the third insulating layer 30 may have a multi-layered structure including a silicon oxide layer and a silicon nitride layer.

A first connecting electrode CNE1 may be disposed on the third insulating layer 30. The first connecting electrode CNE1 may be connected to the connecting signal line SCL through a contact hole CNT-1 that penetrates the first insulating layer 10, the second insulating layer 20, and the third insulating layer 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 that penetrates the fourth insulating layer 40 and the fifth insulating layer 50.

A sixth insulating layer 60 may be disposed on the fifth insulating layer 50 and may cover the second connecting electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic luminescent material, an inorganic luminescent material, an organic-inorganic luminescent material, a quantum dot, a quantum rod, a micro LED, or a nano LED. Hereinafter, it will be exemplified that the light emitting element 100PE is an organic light emitting element. However, the present disclosure is not particularly limited thereto.

The light emitting element 100PE may include a first electrode AE, an emissive layer EL, and a second electrode CE.

The first electrode AE may be disposed on the sixth insulating layer 60. The first electrode AE may be connected to the second connecting electrode CNE2 through a contact hole CNT-3 that penetrates the sixth insulating layer 60.

A pixel defining layer 70 may be disposed on the sixth insulating layer 60 and may cover a portion of the first electrode AE. The pixel defining layer 70 has an opening 70-OP defined therein. The opening 70-OP of the pixel defining layer 70 exposes at least a portion of the first electrode AE.

The first display part DA1-F (e.g., refer to FIG. 1A) may include an emissive area PXA and a non-emissive area NPXA adjacent to the emissive area PXA. The non-emissive area NPXA may surround the emissive area PXA. In this embodiment, the emissive area PXA is defined to correspond to a partial area of the first electrode AE exposed through the opening 70-OP.

The emissive layer EL may be disposed on the first electrode AE. The emissive layer EL may be disposed in an area corresponding to the opening 70-OP. In other words, the emissive layer EL may be separately formed in each of the pixels. When the emissive layer EL is separately formed in each of the pixels, the emissive layers EL may each emit at least one of a blue light, a red light, or a green light.

However, without being limited thereto, the emissive layer EL may have a one-body shape and may be commonly included in the plurality of pixels. In this case, the emissive layer EL may provide blue light or white light.

The second electrode CE may be disposed on the emissive layer EL. The second electrode CE may have a one-body shape and may be commonly included in the plurality of pixels.

In an embodiment of the present disclosure, a hole control layer may be disposed between the first electrode AE and the emissive layer EL. The hole control layer may be commonly disposed in the emissive area PXA and the non-emissive area NPXA. The hole control layer may include a hole transport layer and may further include a hole injection layer. An electron control layer may be disposed between the emissive layer EL and the second electrode CE. The electron control layer may include an electron transport layer and may further include an electron injection layer. The hole control layer and the electron control layer may be commonly formed in the plurality of pixels using an open mask or an ink-jet process.

The encapsulation layer 140 may be disposed on the light emitting element layer 130. The encapsulation layer 140 may include an inorganic layer, an organic layer, and an inorganic layer sequentially stacked one above another. However, layers constituting the encapsulation layer 140 are not limited thereto. The inorganic layers may protect the light emitting element layer 130 from moisture and oxygen, and the organic layer may protect the light emitting element layer 130 from foreign matter such as dust particles. The inorganic layers may include a silicon nitride layer, a silicon oxy nitride layer, a silicon oxide layer, a titanium oxide layer, or an aluminum oxide layer. The organic layer may include an acrylic organic layer, but is not limited thereto.

The sensor layer 200 may include a base layer 201, a first conductive layer 202, an intermediate insulating layer 203, a second conductive layer 204, and a cover insulating layer 205.

The base layer 201 may be an inorganic layer including at least one of silicon nitride, silicon oxy nitride, or silicon oxide. As another example, the base layer 201 may be an organic layer including an epoxy resin, an acrylic resin, or an imide-based resin. The base layer 201 may have a single-layer structure or may have a multi-layered structure stacked in the third direction DR3.

Each of the first conductive layer 202 and the second conductive layer 204 may have a single-layer structure or may have a multi-layered structure stacked in the third direction DR3.

Each of the first conductive layer 202 and the second conductive layer 204 that have a single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), indium zinc tin oxide (IZTO), or the like. In addition, the transparent conductive layer may include a conductive polymer such as poly(3,4-ethylenedioxythiophene) (PEDOT), a metal nano wire, or graphene.

Each of the first conductive layer 202 and the second conductive layer 204 that have a multi-layered structure may include metal layers. The meal layers may have, for example, a three-layered structure of titanium/aluminum/titanium. The conductive layer having the multi-layered structure may include at least one metal layer and at least one transparent conductive layer.

At least one of the intermediate insulating layer 203 or the cover insulating layer 205 may include an inorganic film.

The inorganic film may include at least one of aluminum oxide, titanium oxide, silicon oxide, silicon nitride, silicon oxy nitride, zirconium oxide, or hafnium oxide.

At least one of the intermediate insulating layer 203 or the cover insulating layer 205 may include an organic film. The organic film may include at least one of an acrylic resin, a methacrylic resin, a polyisoprene resin, a vinyl resin, an epoxy resin, a urethane-based resin, a celluosic resin, a siloxane-based resin, a polyimide resin, a polyamide resin, or a perylene-based resin.

Figure 7:
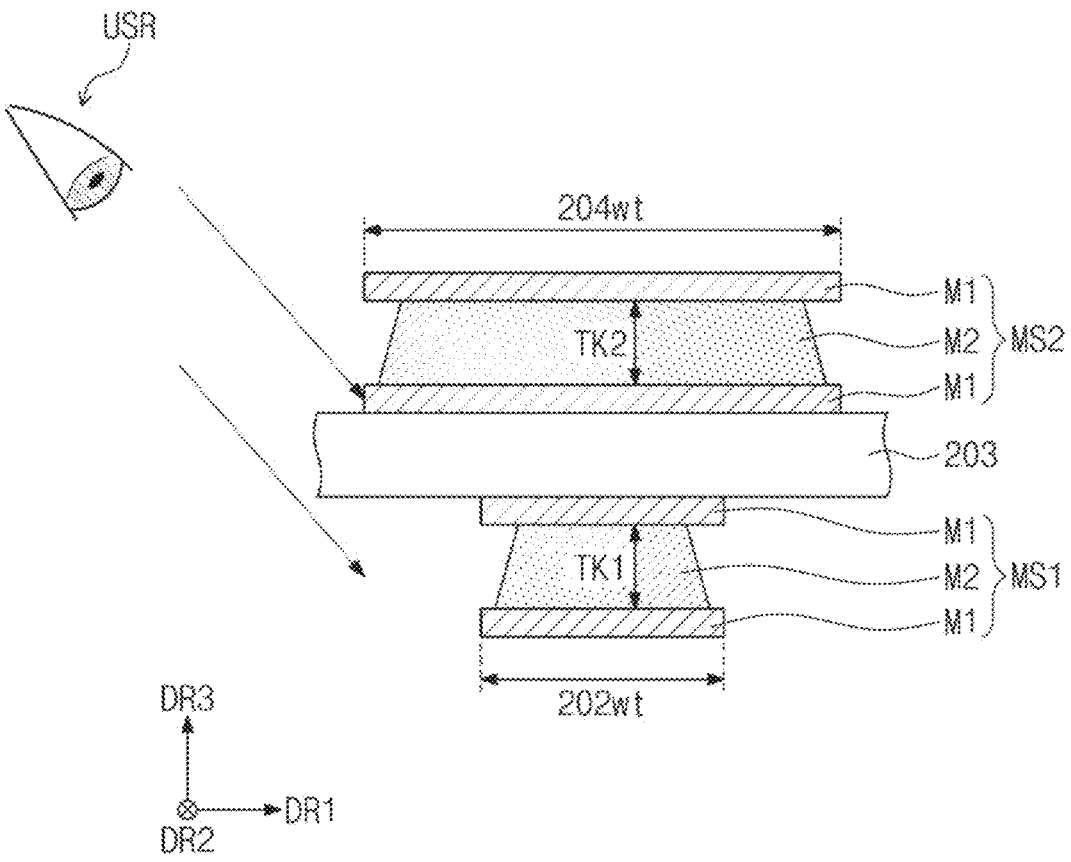
FIG. 7 is a sectional view of a sensor layer according to an embodiment of the present disclosure.

FIG. 7 is a plan view of the sensor layer according to an embodiment of the present disclosure.

Referring to FIGS. 6 and 7, the second width 204wt of a second mesh line MS2 included in the second conductive layer 204 may be greater than or equal to the first width 202wt of a first mesh line MS1 included in the first conductive layer 202.

When a user USR looks at the first mesh line MS1 and the second mesh line MS2 from the side, the probability that the first mesh line MS1 will be visually recognized by the user USR may be decreased because the first mesh line MS1 has a smaller width than the second mesh line MS2.

Each of the first mesh line MS1 and the second mesh line MS2 may include first metal layers M1 and a second metal layer M2 disposed between the first metal layers M1. For example, the first metal layers M1 may include titanium (Ti), and the second metal layer M2 may include aluminum (Al). However, this is only an example, and the present disclosure is not particularly limited thereto.

In an embodiment of the present disclosure, the first thickness TK1 of the second metal layer M2 of the first mesh line MS1 and the second thickness TK2 of the second metal layer M2 of the second mesh line MS2 may be substantially the same as each other, but are not particularly limited thereto. For example, the first thickness TK1 may be greater than the second thickness TK2. As another example, the second thickness TK2 may be greater than the first thickness TK1. In an embodiment of the present disclosure, each of the first thickness TK1 and the second thickness TK2 may be 1000 angstroms or more, for example, 6000 angstroms.

Figure 8:
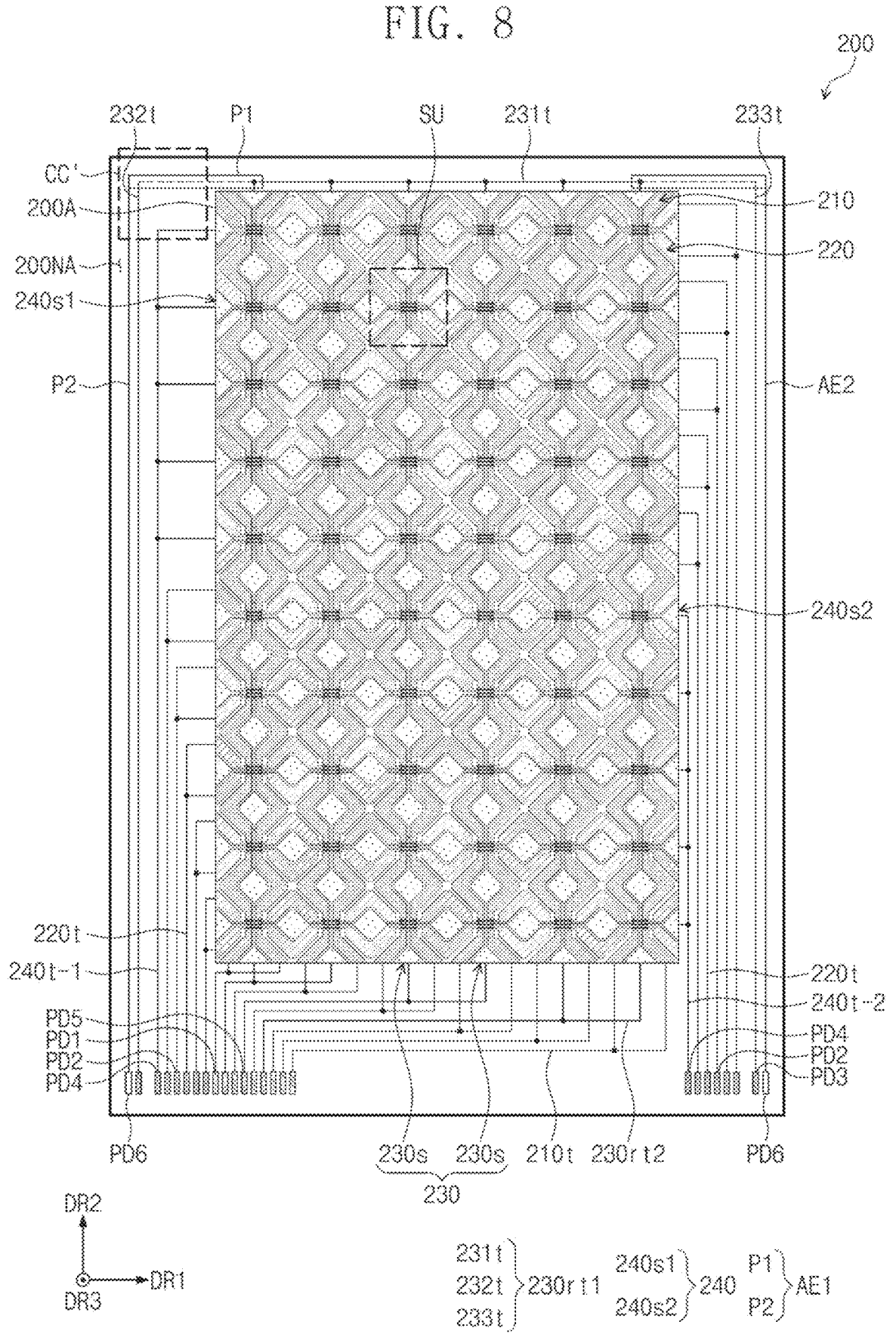
FIG. 8 is a plan view of a sensor layer according to an embodiment of the present disclosure.
Figure 9:
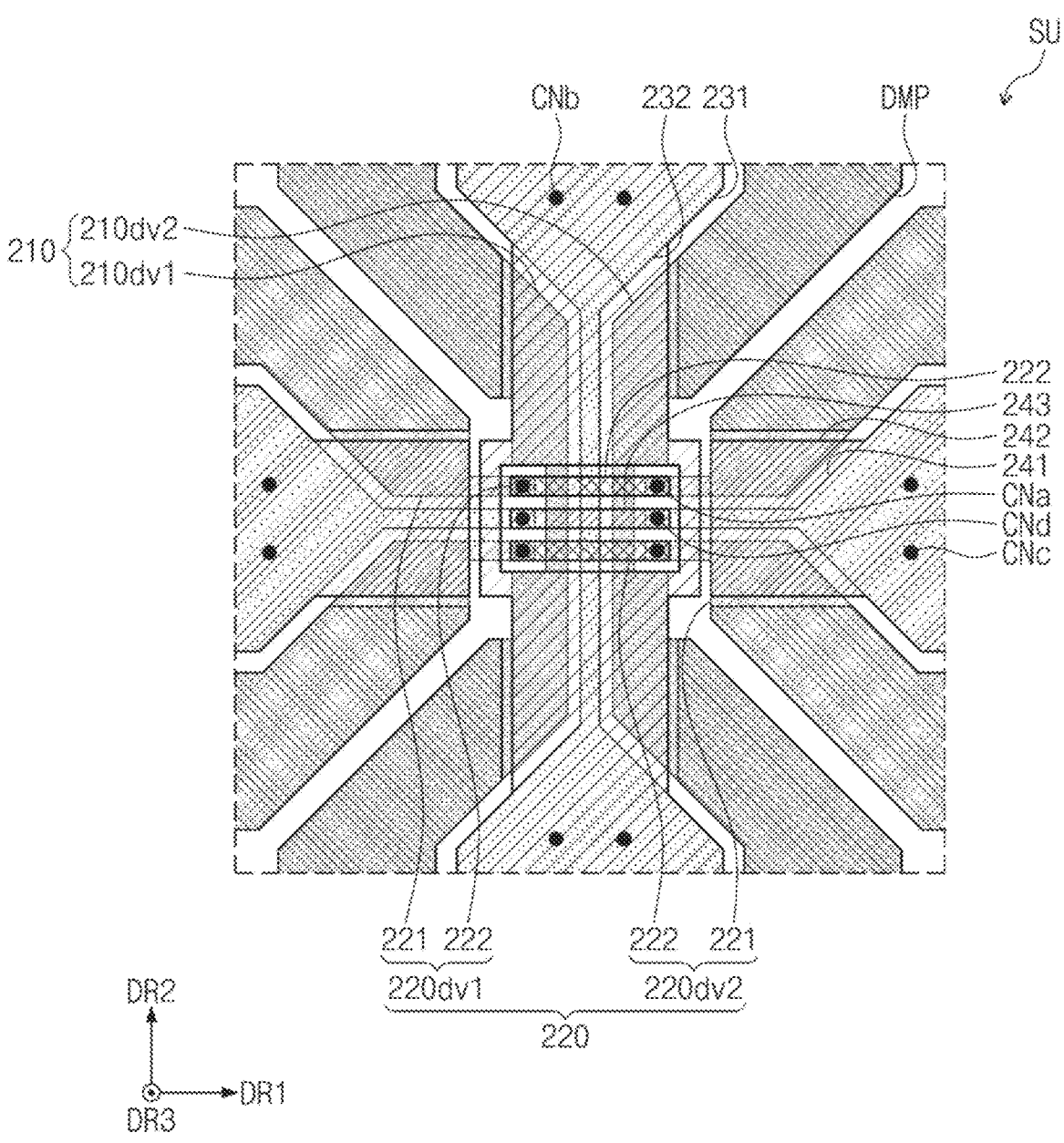
FIG. 9 is an enlarged plan view illustrating one sensing unit according to an embodiment of the present disclosure.
Figure 10A:
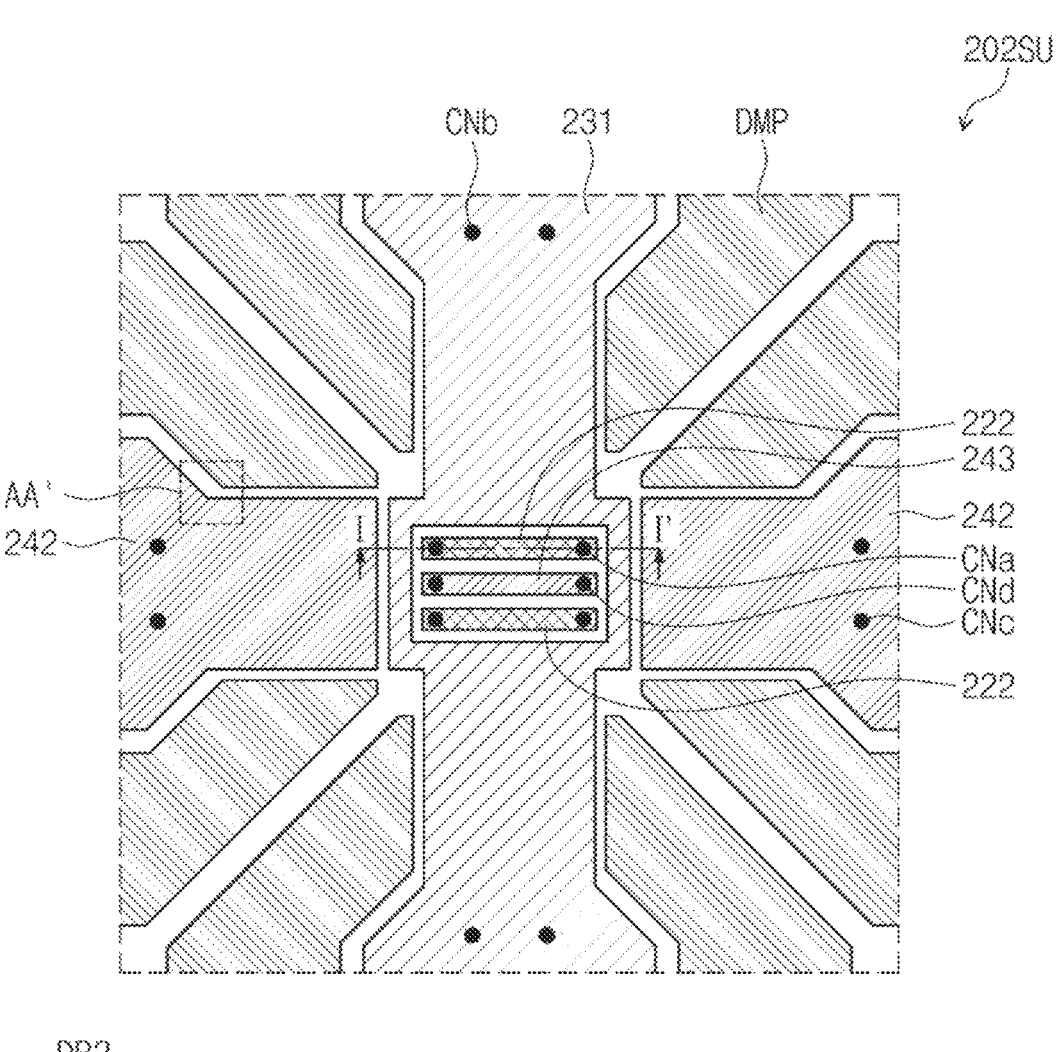
FIG. 10A is a plan view illustrating a first conductive layer of the sensing unit according to an embodiment of the present disclosure.
Figure 10A:
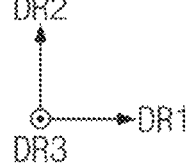
Figure 10B:
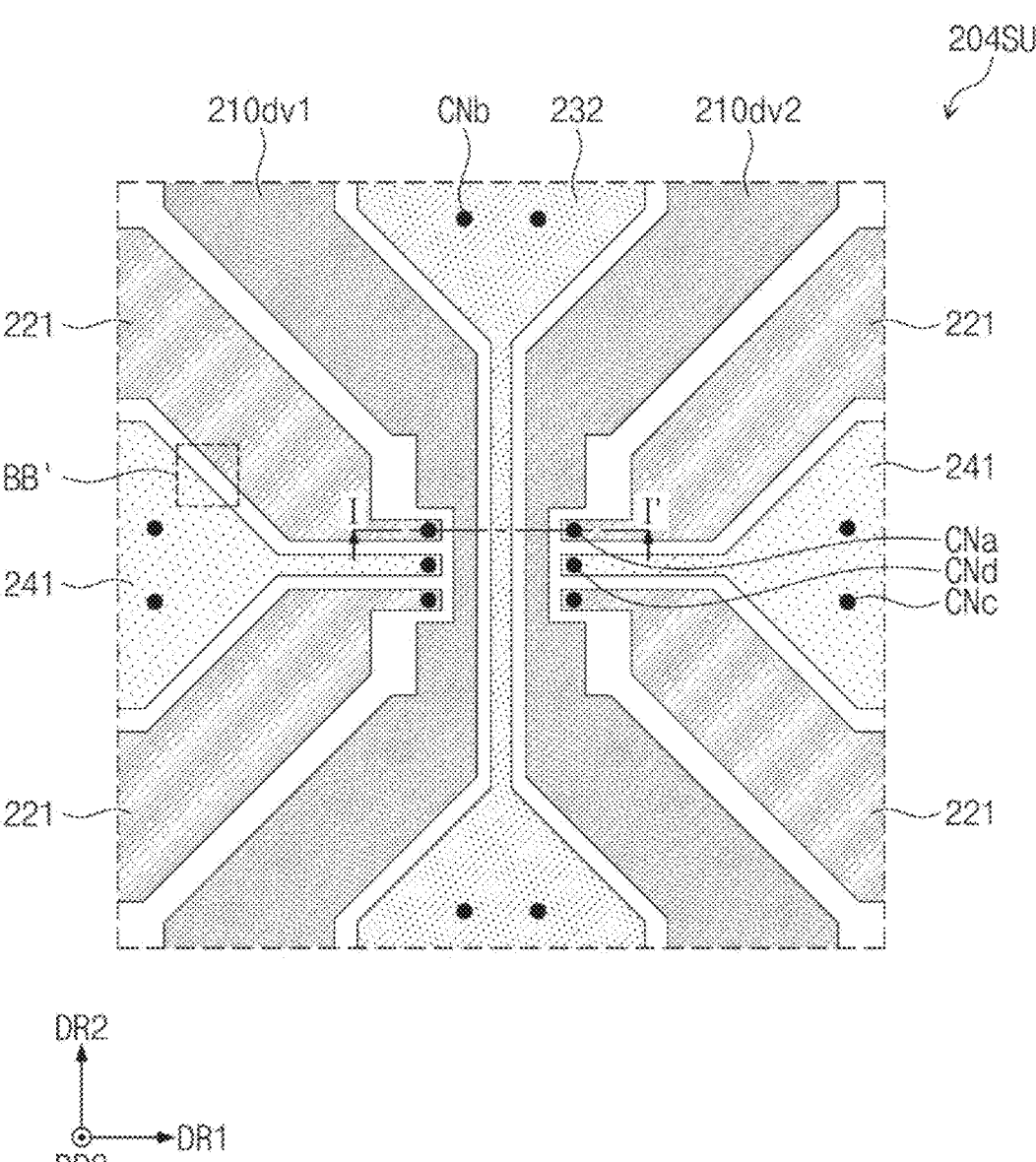
FIG. 10B is a plan view illustrating a second conductive layer of the sensing unit according to an embodiment of the present disclosure.
Figure 10C:
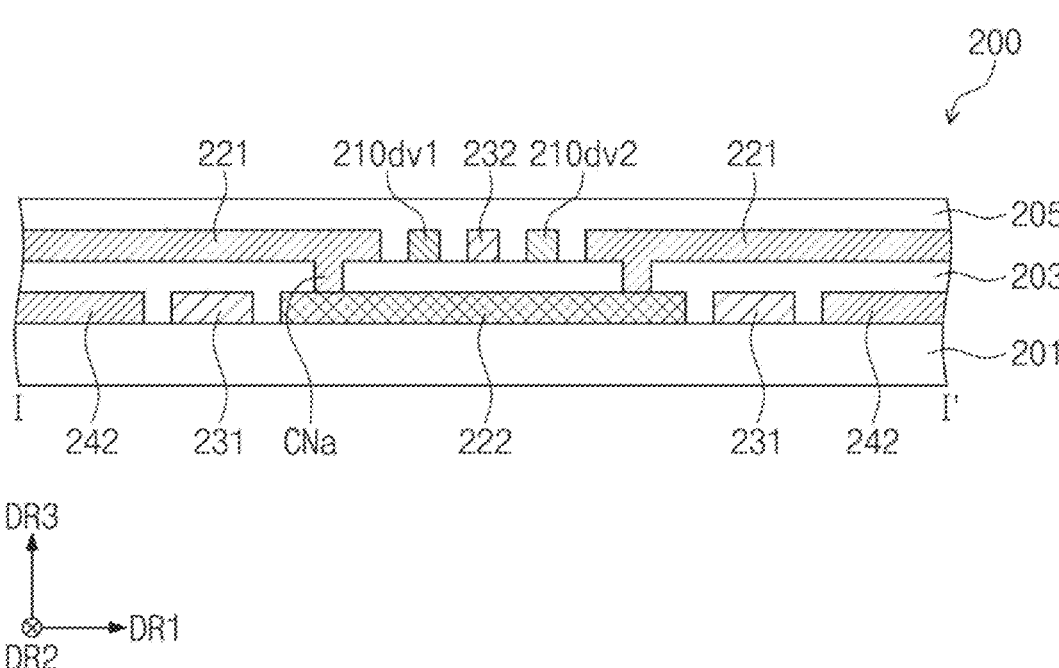
FIG. 10C is a sectional view of the sensor layer taken along the line I-I' illustrated in FIGS. 10A and 10B according to an embodiment of the present disclosure.

FIG. 8 is a plan view of the sensor layer according to an embodiment of the present disclosure. FIG. 9 is an enlarged plan view illustrating one sensing unit according to an embodiment of the present disclosure. FIG. 10A is a plan view illustrating a first conductive layer of the sensing unit according to an embodiment of the present disclosure. FIG. 10B is a plan view illustrating a second conductive layer of the sensing unit according to an embodiment of the present disclosure. FIG. 10C is a sectional view of the sensor layer taken along the line I-I' illustrated in FIGS. 10A and 10B according to an embodiment of the present disclosure.

Referring to FIG. 8, an active area 200A and a peripheral area 200NA adjacent to the active area 200A may be defined in the sensor layer 200.

The sensor layer 200 may include a plurality of first electrodes 210, a plurality of second electrodes 220, a plurality of third electrodes 230, and a plurality of fourth electrodes 240 disposed in the active area 200A.

The plurality of first electrodes 210 and the plurality of second electrodes 220 may be referred to as touch electrodes 210 and 220, and the plurality of third electrodes 230 and the plurality of fourth electrodes 240 may be referred to as pen electrodes 230 and 240.

Each of the first electrodes 210 may cross the second electrodes 220. Each of the first electrodes 210 may extend in the second direction DR2. The first electrodes 210 may be spaced apart from one another in the first direction DR1.

Each of the second electrodes 220 may extend in the first direction DR1. The second electrodes 220 may be spaced apart from one another in the second direction DR2. The sensing unit SU of the sensor layer 200 may be an area where one first electrode 210 and one second electrode 220 cross each other.

Although six first electrodes 210, ten second electrodes 220, and sixty sensing units SU are illustrated in FIG. 8, the number of first electrodes 210 and the number of second electrodes 220 are not limited thereto.

Referring to FIGS. 8 and 9, each of the first electrodes 210 may include first split electrodes 210dv1 and 201dv2. The first split electrodes 210dv1 and 210dv2 may extend in the second direction DR2, and may be spaced apart from each other in the first direction DR1. The first split electrodes 210dv1 and 210dv2 may have shapes having a line symmetry with respect to a line extending in the second direction DR2.

Each of the second electrodes 220 may include second split electrodes 220dv1 and 220dv2. The second electrodes 220 may extend in the first direction DR1, and may be spaced apart from one another in the second direction DR2. The second split electrodes 220dv1 and 220dv2 may have shapes having a line symmetry with respect to a line extending in the first direction DR1.

Referring to FIGS. 9, 10A, 10B, and 10C, each of the second split electrodes 220dv1 and 220dv2 may include a sensing pattern 221 and a bridge pattern 222. The sensing pattern 221 and the bridge pattern 222 may be disposed at (e.g., in or on) different layers from each other. The sensing pattern 221 and the bridge pattern 222 may be electrically connected with each other through a first contact CNa. For example, the bridge pattern 222 may be included in the first conductive layer 202SU, and the sensing pattern 221 and the first split electrodes 210dv1 and 210dv2 may be included in the second conductive layer 204SU. The first conductive layer 202SU may be included in the first conductive layer 202 of FIG. 6, and the second conductive layer 204SU may be included in the second conductive layer 204 of FIG. 6.

Each of the third electrodes 230 may extend in the second direction DR2. The third electrodes 230 may be spaced apart from one another in the first direction DR1. In an embodiment of the present disclosure, each of the third electrodes 230 may include a plurality of first auxiliary electrodes 230s electrically connected to each other in parallel. The number of first auxiliary electrodes 230s included in each of the third electrodes 230 may be variously modified as needed or desired. For example, as the number of first auxiliary electrodes 230s included in each of the third electrodes 230 is increased, a resistance of each of the third electrodes 230 may be lowered, and thus, a power efficiency and a sensing sensitivity may be improved. On the other hand, as the number of first auxiliary electrodes 230s included in each of the third electrodes 230 is decreased, a loop coil pattern formed using the third electrodes 230 may be implemented in more various desired forms.

Although FIG. 8 illustrates an example in which one third electrode 230 includes two first auxiliary electrodes 230s, the present disclosure is not particularly limited thereto. The first auxiliary electrodes 230s may be disposed to correspond to the first electrodes 210 in a one-to-one manner. Accordingly, one sensing unit SU may include a portion of one first auxiliary electrode 230s.

A coupling capacitor may be defined between one first electrode 210 and one first auxiliary electrode 230s. In this case, an induced current generated when the pen is sensed may be transferred from the first auxiliary electrode 230s to the first electrode 210 through the coupling capacitor. In other words, the first auxiliary electrode 230s may serve to supplement a signal transferred from the first electrode 210 to the sensor driver 200C. Thus, a greatest effect may be obtained when the phase of a signal induced in the first auxiliary electrode 230s coincides with the phase of a signal induced in the first electrode 210. Accordingly, the centers of the first electrodes 210 in the second direction DR2 may overlap with the centers of the first auxiliary electrodes 230s in the second direction DR2. In addition, the centers of the first electrodes 210 in the first direction DR1 may also overlap with the centers of the first auxiliary electrodes 230s in the first direction DR1.

Because one third electrode 230 includes two first auxiliary electrodes 230s in an embodiment of the present disclosure, the one third electrode 230 may correspond to (e.g., may overlap with) two first electrodes 210. Accordingly, the number of first electrodes 210 included in the sensor layer 200 may be greater than the number of third electrodes 230. For example, the number of first electrodes 210 may be equal to the product of the number of third electrodes 230 included in the sensor layer 200 and the number of first auxiliary electrodes 230s included in each of the third electrodes 230. In FIG. 9, the number of first electrodes 210 may be six, the number of third electrodes 230 may be three, and the number of first auxiliary electrodes 230s included in each of the third electrodes 230 may be two.

The fourth electrodes 240 may be arranged in the second direction DR2. The fourth electrodes 240 may extend in the first direction DR1. In an embodiment of the present disclosure, each of the fourth electrodes 240 may include second auxiliary electrodes 240s1 or 240s2 electrically connected with one another.

The routing directions of the second auxiliary electrode 240s1 and the second auxiliary electrode 240s2 may be different from each other. In FIG. 8, two fourth electrodes 240 and five second auxiliary electrodes 240s1 or 240s2 included in each of the fourth electrodes 240 are illustrated as an example.

As used herein, when routing directions are different from each other, this means that connection positions of electrodes and trace lines are different from each other. For example, a first connection position of a fourth trace line 240t-1 electrically connected with the second auxiliary electrode 240s1 may be different from a second connection position of a fourth trace line 240t-2 electrically connected with the second auxiliary electrode 240s2. The first connection position may be a left end with respect to the second auxiliary electrode 240s1, and the second connection position may be a right end with respect to the second auxiliary electrode 240s2.

In an embodiment of the present disclosure, the sensor layer 200 may include one fourth electrode. In this case, the fourth electrode may include ten second auxiliary electrodes connected in parallel with each other. The number of second auxiliary electrodes is described based on the illustration of FIG. 8, and the number of second auxiliary electrodes included in the fourth electrode is not limited to the above-described example.

FIG. 8 illustrates an example in which five second auxiliary electrodes 240s1 are electrically connected with one another, and five second auxiliary electrodes 240s2 are electrically connected with one another. In other words, the ratio between the areas of two fourth electrodes 240 or the ratio between the numbers of second auxiliary electrodes included in the two fourth electrodes 240 may have a ratio of 1:1. However, the present disclosure is not particularly limited thereto. For example, the number of second auxiliary electrodes 240s1 and the number of second auxiliary electrodes 240s2 may be different from each other.

In an embodiment of the present disclosure, when each of the fourth electrodes 240 includes the second auxiliary electrodes 240s1 or 240s2 connected in parallel with each other, an effect of increasing the area of one fourth electrode may be obtained. In addition, the resistance of each of the fourth electrodes 240 may be lowered, and thus, the sensing sensitivity for the second input 3000 (e.g., refer to FIG. 5) may be improved.

A coupling capacitor may be defined between one second electrode 220 and one second auxiliary electrode 240s1. In this case, an induced current generated when the pen is sensed may be transferred from the second auxiliary electrode 240s1 to the second electrode 220 through the coupling capacitor. In other words, the second auxiliary electrode 240s1 may serve to supplement a signal transferred from the second electrode 220 to the sensor driver 200C. Thus, the greatest effect may be obtained when the phase of a signal induced in the second auxiliary electrode 240s1 coincides with the phase of a signal induced in the second electrode 220. Accordingly, the centers of the second electrodes 220 in the first direction DR1 may overlap with the centers of the second auxiliary electrodes 240s1 in the first direction DR1. In addition, the centers of the second electrodes 220 in the second direction DR2 may also overlap with the centers of the second auxiliary electrodes 240s1 in the second direction DR2.

Each of the first auxiliary electrodes 230s included in the third electrode 230 may include a third-first pattern 231 and a third-second pattern 232. The third-first pattern 231 and the third-second pattern 232 may be disposed at (e.g., in or on) different layers from each other. The third-first pattern 231 and the third-second pattern 232 may be electrically connected with each other through a second contact CNb. The third-first pattern 231 may be included in the first conductive layer 202SU, and the third-second pattern 232 may be included in the second conductive layer 204SU.

In an embodiment of the present disclosure, a portion of the third-first pattern 231 may overlap with a portion of each of the first split electrodes 210dv1 and 210dv2. Accordingly, a coupling capacitance may be provided (e.g., formed) between the first electrode 210 and the third electrode 230.

Each of the second auxiliary electrodes 240s1 or 240s2 included in the fourth electrode 240 may include a fourth-first pattern 241, a fourth-second pattern 242, and a fourth-third pattern 243. The fourth-second pattern 242 and the fourth-third pattern 243 may be disposed at (e.g., in or on) the same layer as each other, and the fourth-first pattern 241 may be disposed at (e.g., in or on) a layer different from the layer at (e.g., in or on) which the fourth-second pattern 242 and the fourth-third pattern 243 are disposed. The fourth-first pattern 241 and the fourth-second pattern 242 may be electrically connected with each other through a third contact CNc, and the fourth-first pattern 241 and the fourth-third pattern 243 may be electrically connected with each other through a fourth contact CNd. The fourth-second pattern 242 and the fourth-third pattern 243 may be included in the first conductive layer 202SU, and the fourth-first pattern 241 may be included in the second conductive layer 204SU.

In an embodiment of the present disclosure, a portion of the fourth-second pattern 242 may overlap with the sensing pattern 221 of each of the second split electrodes 220dv1 and 220dv2. Accordingly, a coupling capacitor may be defined (e.g., provided or formed) between the second electrode 220 and the fourth electrode 240.

In an embodiment of the present disclosure, the first conductive layer 202SU may further include dummy patterns DMP. Each of the dummy patterns DMP may be electrically floated or electrically grounded. In an embodiment of the present disclosure, the dummy patterns DMP may be omitted. Because the dummy patterns DMP are disposed in empty spaces, a probability that specific patterns will be visually recognized due to the reflection of external light may be decreased. In other words, the electronic device 1000 (e.g., refer to FIG. 1A) in which a visibility depending on the reflection of external light is improved may be provided.

The sensor layer 200 may further include a plurality of first trace lines 210t disposed in the peripheral area 200NA, a plurality of first pads PD1 connected to the first trace lines 210t in a one-to-one correspondence, a plurality of second trace lines 220t, and a plurality of second pads PD2 connected to the second trace lines 220t in a one-to-one correspondence.

The first trace lines 210t may be electrically connected to the first electrodes 210 in a one-to-one correspondence. Two first split electrodes 210dv1 and 210dv2 included in one first electrode 210 may be connected to one first trace line among the first trace lines 210t. Each of the first trace lines 210t may include a plurality of branch portions for connection to the two first split electrodes 210dv1 and 210dv2. In an embodiment of the present disclosure, the two first split electrodes 210dv1 and 210dv2 may be connected with each other in the active area 200A.

The second trace lines 220t may be electrically connected to the second electrodes 220 in a one-to-one correspondence. Two second split electrodes 220dv1 and 220dv2 included in one second electrode 220 may be connected to one second trace line among the second trace lines 220t. Each of the second trace lines 220t may include a plurality of branch portions for connection to the two second split electrodes 220dv1 and 220dv2. In an embodiment of the present disclosure, the two second split electrodes 210dv1 and 210dv2 may be connected with each other in the active area 200A.

The sensor layer 200 may further include a third trace line 230rt1 disposed in the peripheral area 200NA, a plurality of third pads PD3 connected to one end and an opposite end of the third trace line 230rt1, the fourth trace lines 240t-1 and 240t-2, fourth pads PD4 connected to the fourth trace lines 240t-1 and 240t-2 in a one-to-one correspondence, fifth trace lines 230rt2, and fifth pads PD5 connected to the fifth trace lines 230rt2 in a one-to-one correspondence.

The third trace line 230rt1 may be electrically connected with at least one first auxiliary electrode 230s among the first auxiliary electrodes 230s. In an embodiment of the present disclosure, the third trace line 230rt1 may be electrically connected with all of the first auxiliary electrodes 230s. In other words, the third trace line 230rt1 may be electrically connected to all of the third electrodes 230.

At least a portion of the third trace line 230rt1 may have a multi-layered structure. The third trace line 230rt1 may include a first trace portion disposed on the base layer 201, and a second trace portion disposed on the intermediate insulating layer 203.

The first trace portion may be disposed in the same layer as that of the first conductive layer 202 (e.g., refer to FIG. 6), and the second trace portion may be disposed in the same layer as that of the second conductive layer 204 (e.g., refer to FIG. 6).

The first trace portion and the second trace portion may be connected with each other through a contact. As such, the resistance of the third trace line 230rt1 may be decreased.

The third trace line 230rt1 may include a first line portion 231t that extends in the first direction DR1 and that is electrically connected to the third electrodes 230, a second line portion 232t extending from a first end of the first line portion 231t in the second direction DR2, and a third line portion 233t extending from a second end of the first line portion 231t in the second direction DR2.

In an embodiment of the present disclosure, each of the resistance of the second line portion 232t and the resistance of the third line portion 233t may be the same or substantially the same as the resistance of one third electrode among the third electrodes 230. Accordingly, the second line portion 232t and the third line portion 233t may serve as the third electrodes 230, and the same effect as placing the third electrodes 230 in the peripheral area 200NA may be obtained. For example, one of the second line portion 232t or the third line portion 233t and one of the third electrodes 230 may form a coil. Accordingly, the pen located in an area adjacent to the peripheral area 200NA may also be sufficiently charged by a loop including the second line portion 232t or the third line portion 233t.

In an embodiment of the present disclosure, the widths of the second line portion 232t and the third line portion 233t in the first direction DR1 may be adjusted to adjust the resistance of the second line portion 232t and the resistance of the third line portion 233t. However, the present disclosure is not limited thereto, and the first to third line portions 231t, 232t, and 233t may have substantially the same width as each other.

The fifth trace lines 230rt2 may be connected to the third electrodes 230 in a one-to-one correspondence. In other words, the number of fifth trace lines 230rt2 may correspond to the number of third electrodes 230. In FIG. 9, three fifth trace lines 230rt2 are illustrated as an example.

In an embodiment of the present disclosure, the fifth trace lines 230t2 and the fifth pads PD5 may be omitted, and a charging drive mode for charging the pen may be omitted. In this case, the sensor layer 200 may sense an input by an active pen capable of emitting a magnetic field, even though a magnetic field is not provided from the sensor layer 200.

The fourth trace lines 240t-1 and 240t-2 may be spaced apart from each other with the active area 200A therebetween. The fourth trace line 240t-1 may be electrically connected to at least one second auxiliary electrode 240s1 among the second auxiliary electrodes 240s1. For example, one end of each of the second auxiliary electrodes 240s1 may be connected to the fourth trace line 240t-1. The fourth trace line 240t-2 may be electrically connected to at least one second auxiliary electrode 240s2 among the second auxiliary electrodes 240s2. For example, one end of each of the second auxiliary electrodes 240s2 may be connected to the fourth trace line 240t-2.

The sensor layer 200 may further include a first additional electrode AE1 and a second additional electrode AE2 that are disposed in the peripheral area 200NA, and a plurality of sixth pads PD6 that are connected to the first additional electrode AE1 and the second additional electrode AE2 in a one-to-one correspondence.

The first additional electrode AE1 may include a first portion P1 and a second portion P2.

The first portion P1 may extend in the first direction DR1. The first portion P1 may overlap with the third trace line 230*rt*1 when viewed from above the plane (e.g., in a plan view). For example, the first portion P1 may overlap with the first line portion 231*t*.

The first portion P1 may be disposed over the third trace line 230*rt*1. A portion of the third trace line 230*rt*1 that overlaps with the first portion P1 may be implemented with a single layer. For example, the portion of the third trace line 230*rt*1 that overlaps with the first portion P1 may be disposed on the base layer 201, and the first portion P1 may be disposed on the intermediate insulating layer 203. The portion of the third trace line 230*rt*1 that overlaps with the first portion P1 may be disposed in the same layer as that of the first conductive layer 202 (e.g., refer to FIG. 6), and the first portion P1 may be disposed in the same layer as that of the second conductive layer 204 (e.g., refer to FIG. 6).

The second portion P2 may extend from the first portion P1 in the second direction DR2. One end of the second portion P2 may be connected with the first portion P1, and an opposite end of the second portion P2 may be connected with the sixth pad PD6.

The second portion P2 may be spaced apart from the active area 200A with the third trace line 230*rt*1 therebetween.

The second portion P2 may have a multi-layered structure. The second portion P2 may include a first layer portion disposed on the base layer 201, and a second layer portion disposed on the intermediate insulating layer 203.

The first layer portion may be disposed in the same layer as that of the first conductive layer 202 (e.g., refer to FIG. 6), and the second layer portion may be disposed in the same layer as that of the second conductive layer 204.

The second additional electrode AE2 may have a shape having a line symmetry with the first additional electrode AE1 with respect to a line extending in the second direction DR2. The second additional electrode AE2 may be spaced apart from the first additional electrode AE1 in the first direction DR1 with the active area 200A therebetween.

Figure 11A:
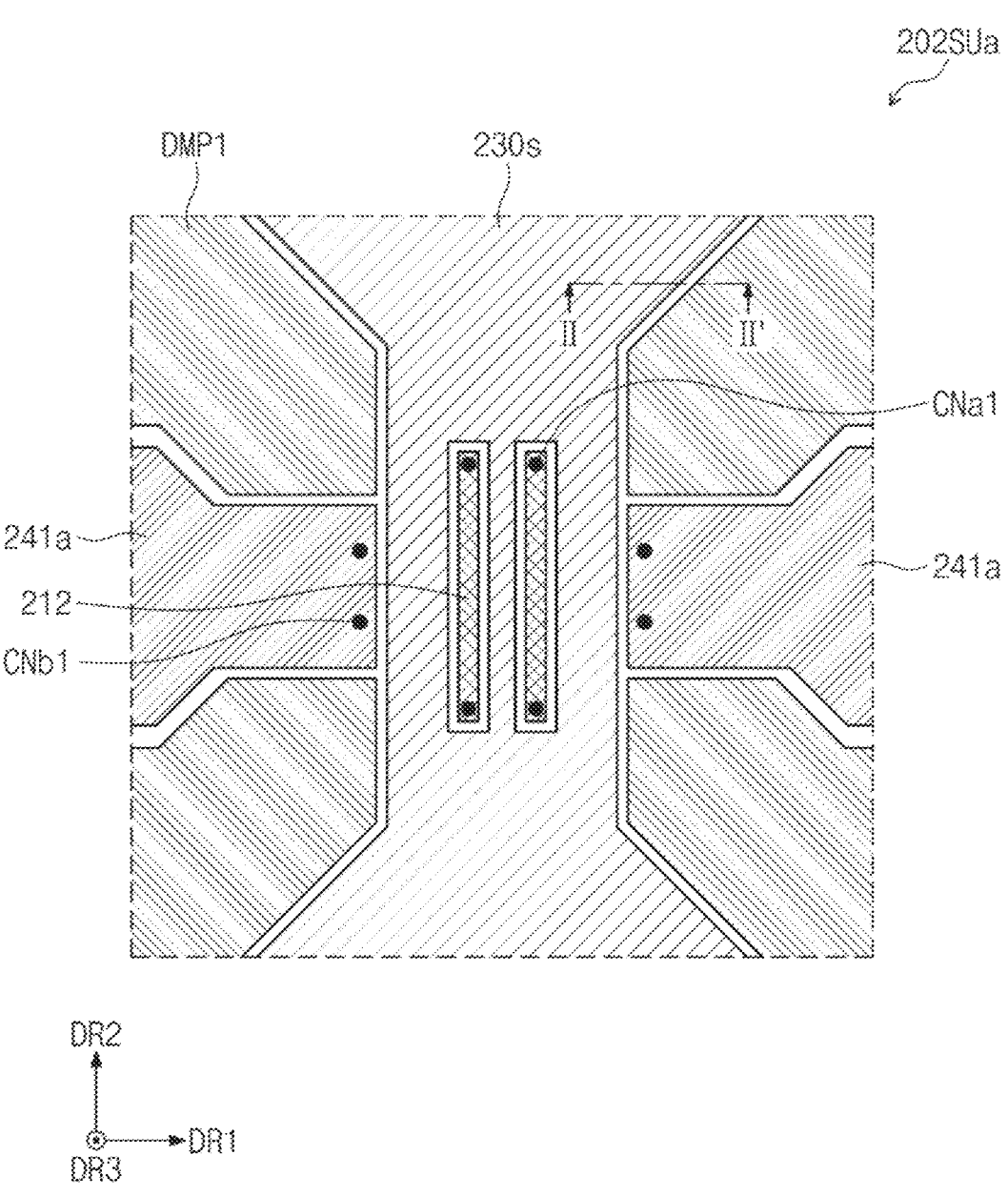
FIG. 11A is a plan view illustrating a first conductive layer of a sensing unit according to an embodiment of the present disclosure.
Figure 11B:
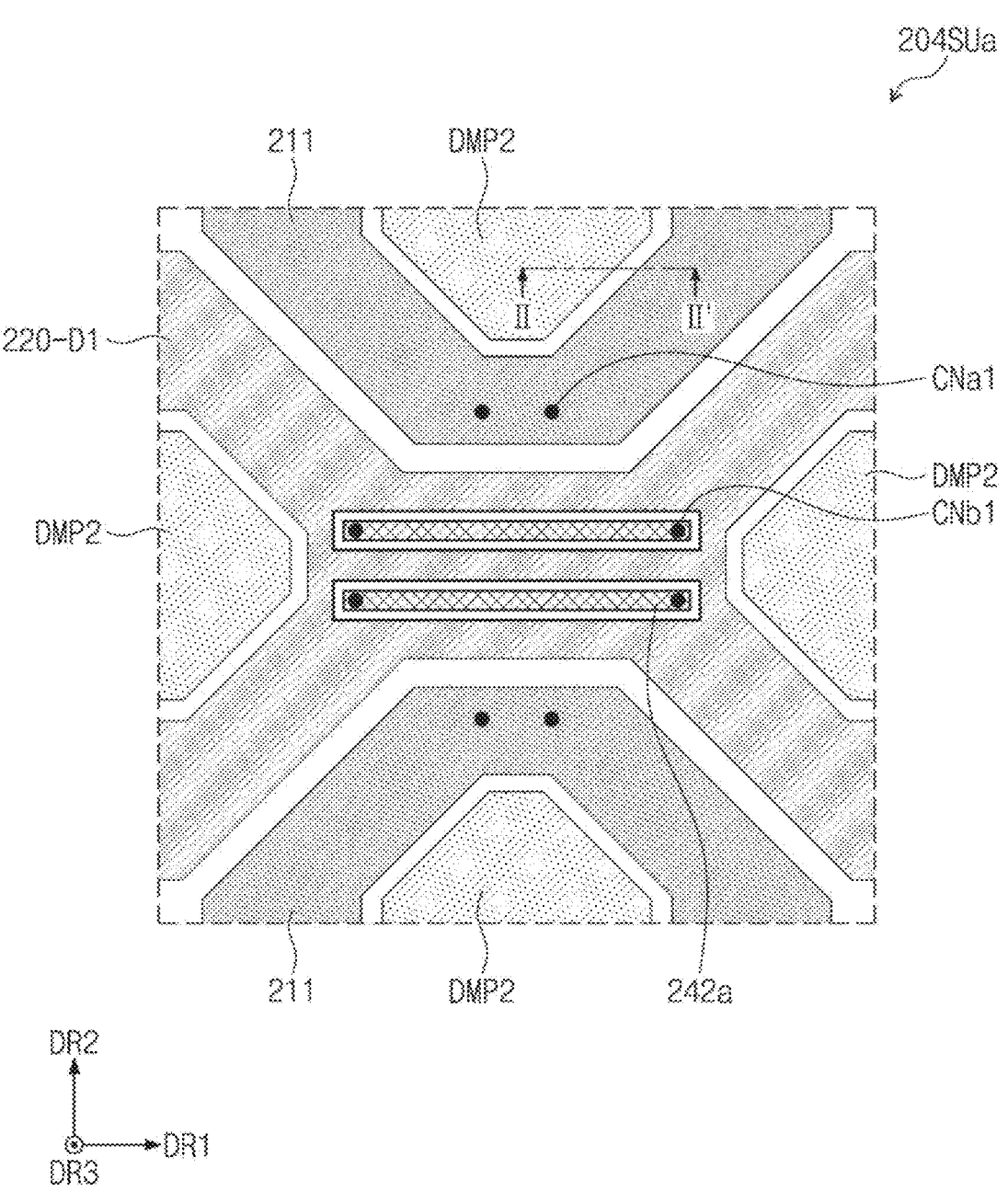
FIG. 11B is a plan view illustrating a second conductive layer of the sensing unit according to an embodiment of the present disclosure.
Figure 11C:
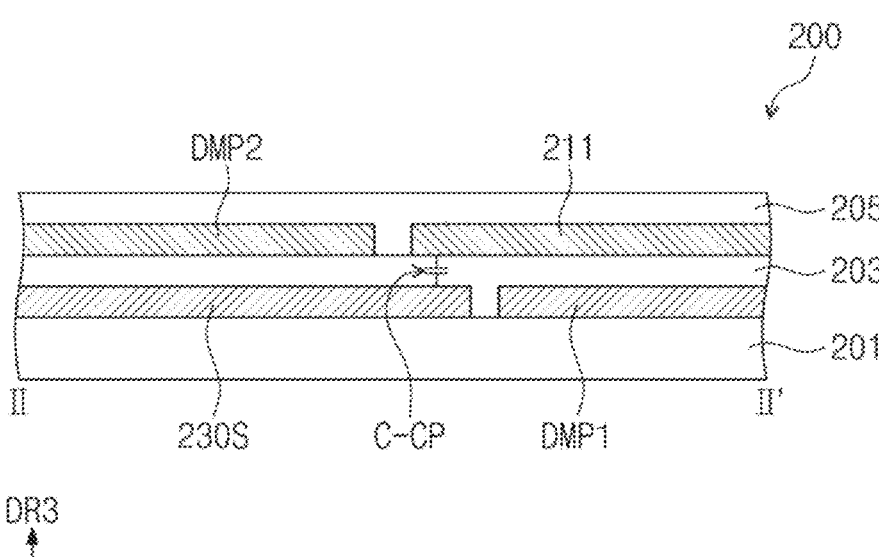
FIG. 11C is a sectional view of the sensor layer taken along the line II-II' illustrated in FIGS. 11A and 11B according to an embodiment of the present disclosure.

FIG. 11A is a plan view illustrating a first conductive layer of a sensing unit according to an embodiment of the present disclosure. FIG. 11B is a plan view illustrating a second conductive layer of the sensing unit according to an embodiment of the present disclosure. FIG. 11C is a sectional view of the sensor layer taken along the line II-II' illustrated in FIGS. 11A and 11B according to an embodiment of the present disclosure.

Referring to FIGS. 8, 9, 11A, 11B, and 11C, each of the plurality of first electrodes 210 may include a plurality of first sensing patterns 211 and a plurality of first bridge patterns 212. The first sensing patterns 211 may be spaced apart from one another in the second direction DR2. The first bridge patterns 212 may extend in the second direction DR2, and may be electrically connected to the first sensing patterns 211 through first contacts CNa1. Although FIGS. 11A and 11B illustrate an example in which two first sensing patterns 211 adjacent to each other are electrically connected with each other by two first bridge patterns 212, the present disclosure is not particularly limited thereto. For example, two first sensing patterns 211 adjacent to each other may be electrically connected with each other by one first bridge pattern 212, or may be electrically connected with each other by three or more first bridge patterns 212.

The first sensing patterns 211 adjacent to each other in the second direction DR2 may be spaced apart from each other with the second electrode 220-D1 therebetween. In an embodiment of the present disclosure, the first sensing patterns 211 and the second electrode 220-D1 may be included in the second conductive layer 204SUa, and the first bridge patterns 212 may be included in the first conductive layer 202SUa. The first bridge patterns 212 may be insulated from the second electrode 220-D1 overlapping with the first bridge patterns 212, and may cross the second electrode 220-D1.

Each of the first auxiliary electrodes 230*s* included in each of the plurality of third electrodes 230 may extend in the second direction DR2. The first auxiliary electrodes 230*s* may be included in the first conductive layer 202SUa. One or more holes may be defined in each of the first auxiliary electrodes 230*s*. One first bridge pattern 212 may be disposed in one hole. Accordingly, the first bridge pattern 212 may be electrically insulated from the first auxiliary electrodes 230*s*.

Each of the second auxiliary electrodes 240*s*1 or 240*s*2 included in each of the plurality of fourth electrodes 240 may include a plurality of second sensing patterns 241*a* and a plurality of second bridge patterns 242*a*. The second sensing patterns 241*a* may be spaced apart from one another in the first direction DR1. The second bridge patterns 242*a* may extend in the first direction DR1, and may be electrically connected to the second sensing patterns 241*a* through second contacts CNb1.

Although FIGS. 11A and 11B illustrate an example in which two second sensing patterns 241*a* adjacent to each other are electrically connected with each other by two second bridge patterns 242*a*, the present disclosure is not particularly limited thereto. For example, two second sensing patterns 241*a* adjacent to each other may be electrically connected with each other by one second bridge pattern 242*a*, or may be electrically connected with each other by three or more second bridge patterns 242*a*.

In an embodiment of the present disclosure, the second sensing patterns 241*a* and the first auxiliary electrodes 230*s* may be included in the first conductive layer 202SUa, and the second bridge patterns 242*a* may be included in the second conductive layer 204SUa. The second bridge patterns 242*a* may be insulated from the first auxiliary electrodes 230*s* overlapping with the second bridge patterns 242*a*, and may cross the first auxiliary electrodes 230*s*.

In the second conductive layer 204SUa in one sensing unit SU, the area occupied by the components included in the plurality of first electrodes 210 and the plurality of second electrodes 220 may be larger than the area occupied by the components included in the plurality of third electrodes 230 and the plurality of fourth electrodes 240. A change in a capacitance by the first input 2000 (e.g., refer to FIG. 5) may be increased as the distance is decreased. Accordingly, a component for sensing the first input 2000 (e.g., refer to FIG. 5) may be disposed in a relatively larger area in a layer adjacent to the surface of the electronic device 1000 (e.g., refer to FIG. 1A). Thus, a touch performance may be improved.

In an embodiment of the present disclosure, the first conductive layer 202SUa may further include first dummy patterns DMP1, and the second conductive layer 204SUa may further include second dummy patterns DMP2. Each of the first dummy patterns DMP1 and the second dummy patterns DMP2 may be floated or may be electrically floated. Each of the first dummy patterns DMP1 and the second dummy patterns DMP2 may be divided into a plurality of conductive patterns. For example, one first dummy pattern DMP1 may include a plurality of floating dummy patterns spaced apart, separated, or electrically isolated from one another.

The area of the first auxiliary electrode 230*s* and the area of the first sensing pattern 211 may be variously adjusted.

For example, the position of a boundary between the first auxiliary electrode 230s and the first dummy patterns DMP1 and the position of a boundary between the first sensing pattern 211 and the second dummy patterns DMP2 may be adjusted. In this case, the area of the overlapping area between the first auxiliary electrode 230s and the first sensing pattern 211 may be adjusted, and the magnitude of a capacitance of a coupling capacitor C-CP between the first auxiliary electrode 230s and the first sensing pattern 211 may be adjusted accordingly.

Figure 12A:
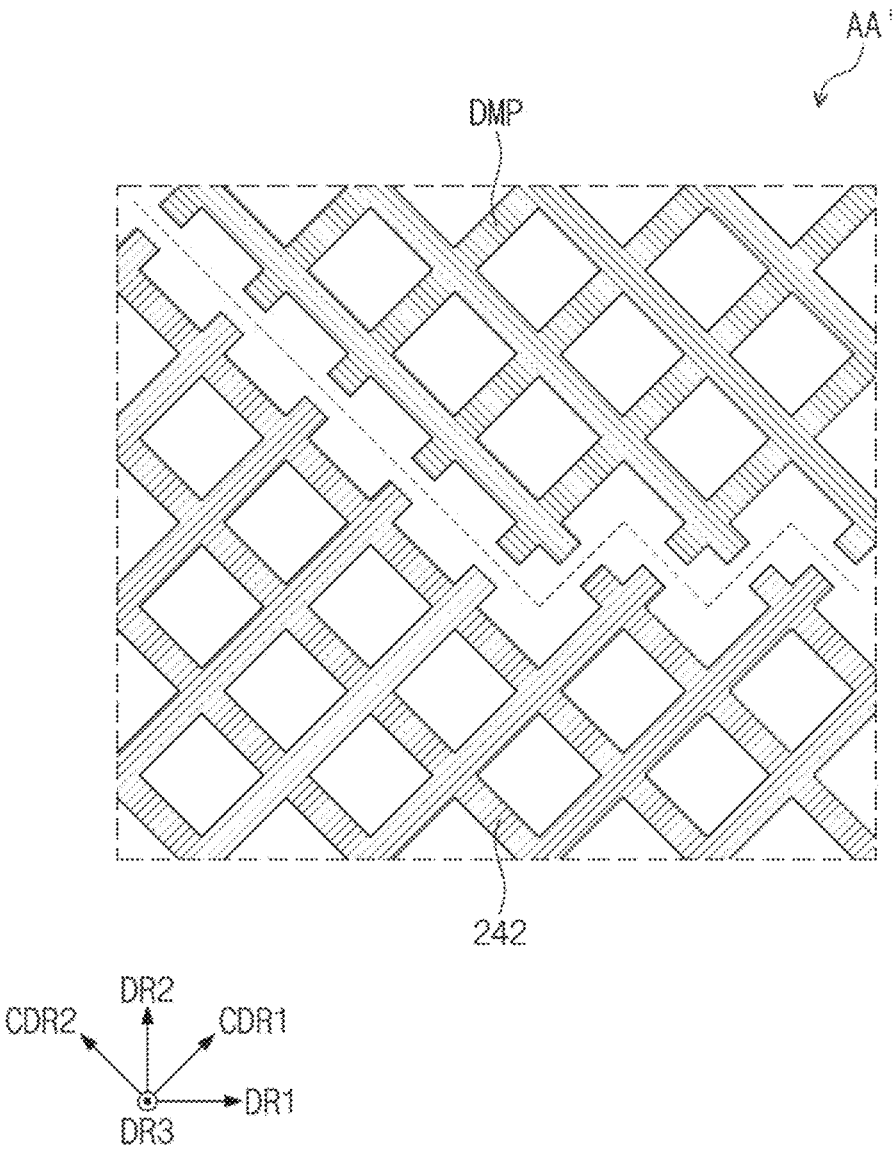
FIG. 12A is an enlarged plan view of the area AA' illustrated in FIG. 10A according to an embodiment of the present disclosure.
Figure 12B:
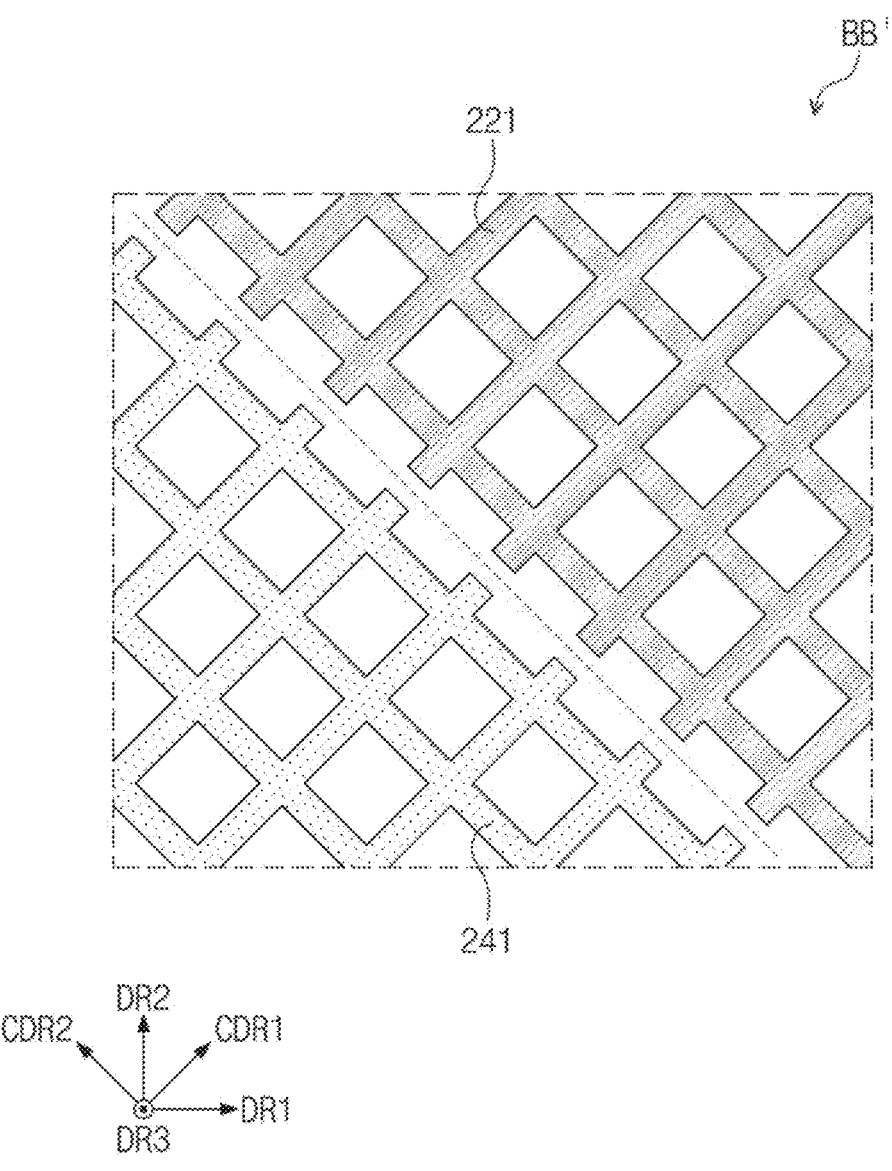
FIG. 12B is an enlarged plan view of the area BB' illustrated in FIG. 10B according to an embodiment of the present disclosure.

FIG. 12A is an enlarged plan view of the area AA' illustrated in FIG. 10A according to an embodiment of the present disclosure. FIG. 12B is an enlarged plan view of the area BB' illustrated in FIG. 10B according to an embodiment of the present disclosure.

Referring to FIGS. 10A, 10B, 12A, and 12B, the plurality of first electrodes 210, the plurality of second electrodes 220, the plurality of third electrodes 230, the plurality of fourth electrodes 240, and the dummy patterns DMP may each have a mesh structure. The mesh structure may include a plurality of mesh lines. Each of the plurality of mesh lines may have a suitable shape extending in a certain direction. The plurality of mesh lines may be connected with one another. The shape may have various suitable shapes, such as a straight line, a line having protrusions, and/or an uneven line. Openings where a mesh structure is not disposed may be defined (e.g., provided or formed) in each of the plurality of first electrodes 210, the plurality of second electrodes 220, the plurality of third electrodes 230, the plurality of fourth electrodes 240, and the dummy patterns DMP.

FIGS. 12A and 12B illustrate an example in which the mesh structure includes mesh lines extending in a first crossing direction CDR1 that crosses the first direction DR1 and the second direction DR2, and mesh lines extending in a second crossing direction CDR2 that crosses the first crossing direction CDR1. However, the extension directions of the mesh lines constituting the mesh structure are not particularly limited to those illustrated in FIGS. 12A and 12B. For example, the mesh structure may include only mesh lines extending in the first direction DR1 and the second direction DR2, or may include mesh lines extending in the first direction DR1, the second direction DR2, the first crossing direction CDR1, and the second crossing direction CDR2. In other words, the mesh structure may be variously modified as needed or desired.

Figure 13:
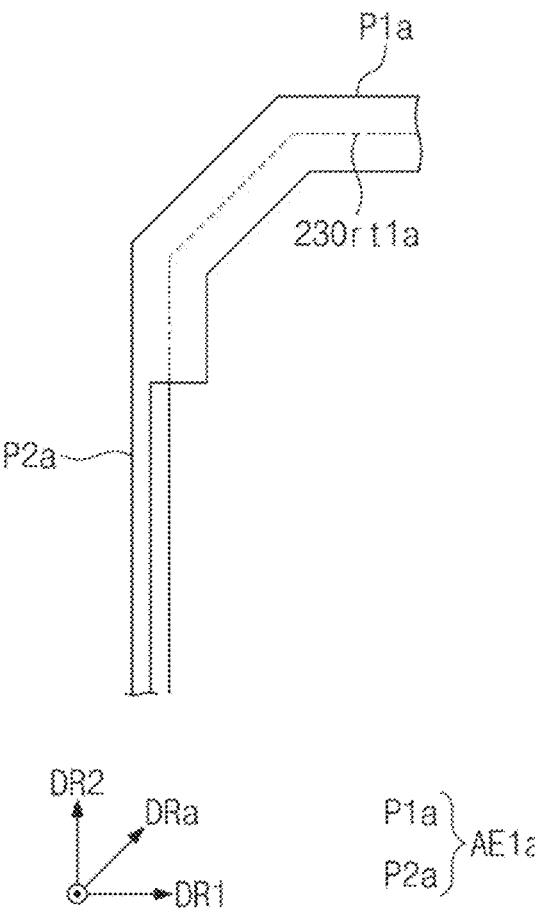
FIG. 13 is an enlarged plan view of an area corresponding to the area CC' of FIG. 8 according to an embodiment of the present disclosure.

FIG. 13 is an enlarged plan view of an area corresponding to the area CC' of FIG. 8 according to an embodiment of the present disclosure.

Referring to FIG. 13, a third trace line 230rt1a may include a first portion extending in the first direction DR1, a second portion extending from the first portion in a first crossing direction DRa, and a third portion extending from the second portion in the second direction DR2. However, the present disclosure is not limited thereto, and the shape of the third trace line 230rt1a according to an embodiment of the present disclosure is not limited to the shape illustrated in FIG. 13.

A first additional electrode AE1a may include a first portion P1a and a second portion P2a.

The first portion P1a may overlap with the third trace line 230rt1a when viewed from above the plane (e.g., in a plan view). The first portion P1a may have a shape corresponding to the shape of the third trace line 230rt1a.

The second portion P2a may extend from the first portion P1a. The second portion P2a may extend in the second direction DR2.

Figure 14:
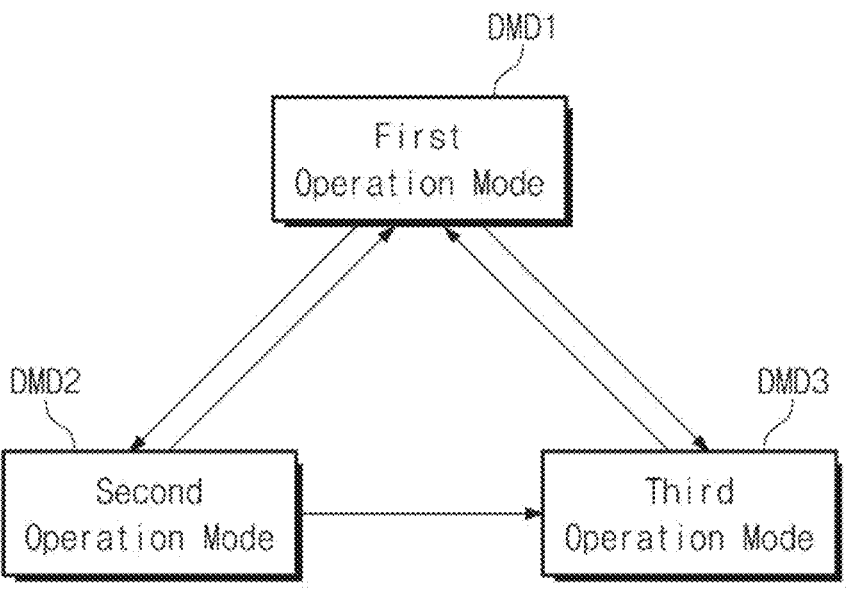
FIG. 14 is a view illustrating an operation of a sensor driver according to an embodiment of the present disclosure.

FIG. 14 is a view illustrating an operation of the sensor driver according to an embodiment of the present disclosure.

Referring to FIGS. 5 and 14, the sensor driver 200C may be selectively driven in one of a first operating mode DMD1, a second operating mode DMD2, and a third operating mode DMD3.

The first operating mode DMD1 may be referred to as a touch and pen standby mode, the second operating mode DMD2 may be referred to as a touch activation and pen standby mode, and the third operating mode DMD3 may be referred to as a pen activation mode. The first operating mode DMD1 may be a mode in which the sensor driver 200C waits for the first input 2000 and the second input 3000. The second operating mode DMD2 may be a mode in which the sensor driver 200C senses the first input 2000 and waits for the second input 3000. The third operating mode DMD3 may be a mode in which the sensor driver 200C senses the second input 3000.

In an embodiment of the present disclosure, the sensor driver 200C may first be driven in the first operating mode DMD1. When the first input 2000 is sensed in the first operating mode DMD1, the sensor driver 200C may be switched (e.g., changed) to the second operating mode DMD2. As another example, when the second input 3000 is sensed in the first operating mode DMD1, the sensor driver 200C may be switched (e.g., changed) to the third operating mode DMD3.

In an embodiment of the present disclosure, when the second input 3000 is sensed in the second operating mode DMD2, the sensor driver 200C may be switched to the third operating mode DMD3. When the first input 2000 is released (e.g., not sensed) in the second operating mode DMD2, the sensor driver 200C may be switched to the first operating mode DMD1. When the second input 3000 is released (e.g., not sensed) in the third operating mode DMD3, the sensor driver 200C may be switched to the first operating mode DMD1.

Figure 15:
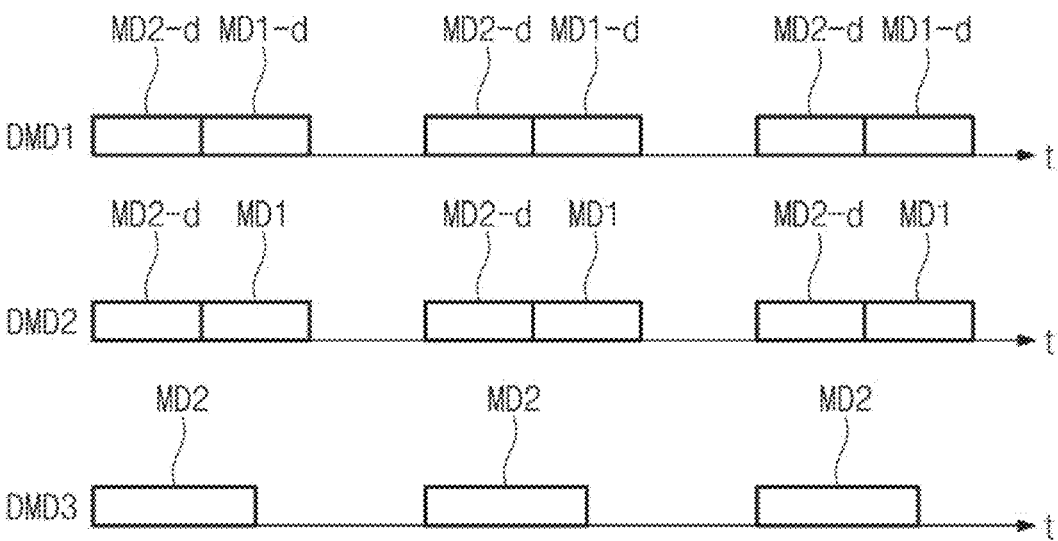
FIG. 15 is a view illustrating an operation of the sensor driver according to an embodiment of the present disclosure.

FIG. 15 is a view illustrating an operation of the sensor driver according to an embodiment of the present disclosure.

Referring to FIGS. 5, 8, 14, and 15, operations in the first to third operating modes DMD1, DMD2, and DMD3 are illustrated in the order of time (t).

In the first operating mode DMD1, the sensor driver 200C may be repeatedly driven in a second mode MD2-d and a first mode MD1-d. During the second mode MD2-d, the sensor layer 200 may be scan-driven to detect the second input 3000. During the first mode MD1-d, the sensor layer 200 may be scan-driven to detect the first input 2000. Although FIG. 15 illustrates an example in which the sensor driver 200C operates in the first mode MD1-d continuously after the second mode MD2-d, the sequence thereof is not limited thereto.

In the second operating mode DMD2, the sensor driver 200C may be repeatedly driven in a second mode MD2-d and a first mode MD1. During the second mode MD2-d, the sensor layer 200 may be scan-driven to detect the second input 3000. During the first mode MD1, the sensor layer 200 may be scan-driven to detect the coordinates by the first input 2000.

In the third operating mode DMD3, the sensor driver 200C may be driven in a second mode MD2. During the second mode MD2, the sensor layer 200 may be scan-driven to detect the coordinates by the second input 3000. In the third operating mode DMD3, the sensor driver 200C may not operate in the first mode MD1-D or MD1 until the second input 3000 is released (e.g., not sensed).

In the first mode MD1-*d* and the first mode MD1, the third electrodes 230 and the fourth electrodes 240 may all be grounded. Accordingly, a touch noise may be prevented or substantially prevented from being introduced through the third electrodes 230 and the fourth electrodes 240.

In the second mode MD2-*d* and the second mode MD2, first ends of the third electrodes 230 and the fourth electrodes 240 may all be floated. In addition, in the second mode MD2-*d* and the second mode MD2, second ends of the third electrodes 230 and the fourth electrodes 240 may all be grounded or floated. Accordingly, a compensation for a sensing signal may be maximized or improved by a coupling between the first electrodes 210 and the third electrodes 230 and a coupling between the second electrodes 220 and the fourth electrodes 240.

Figure 16A:
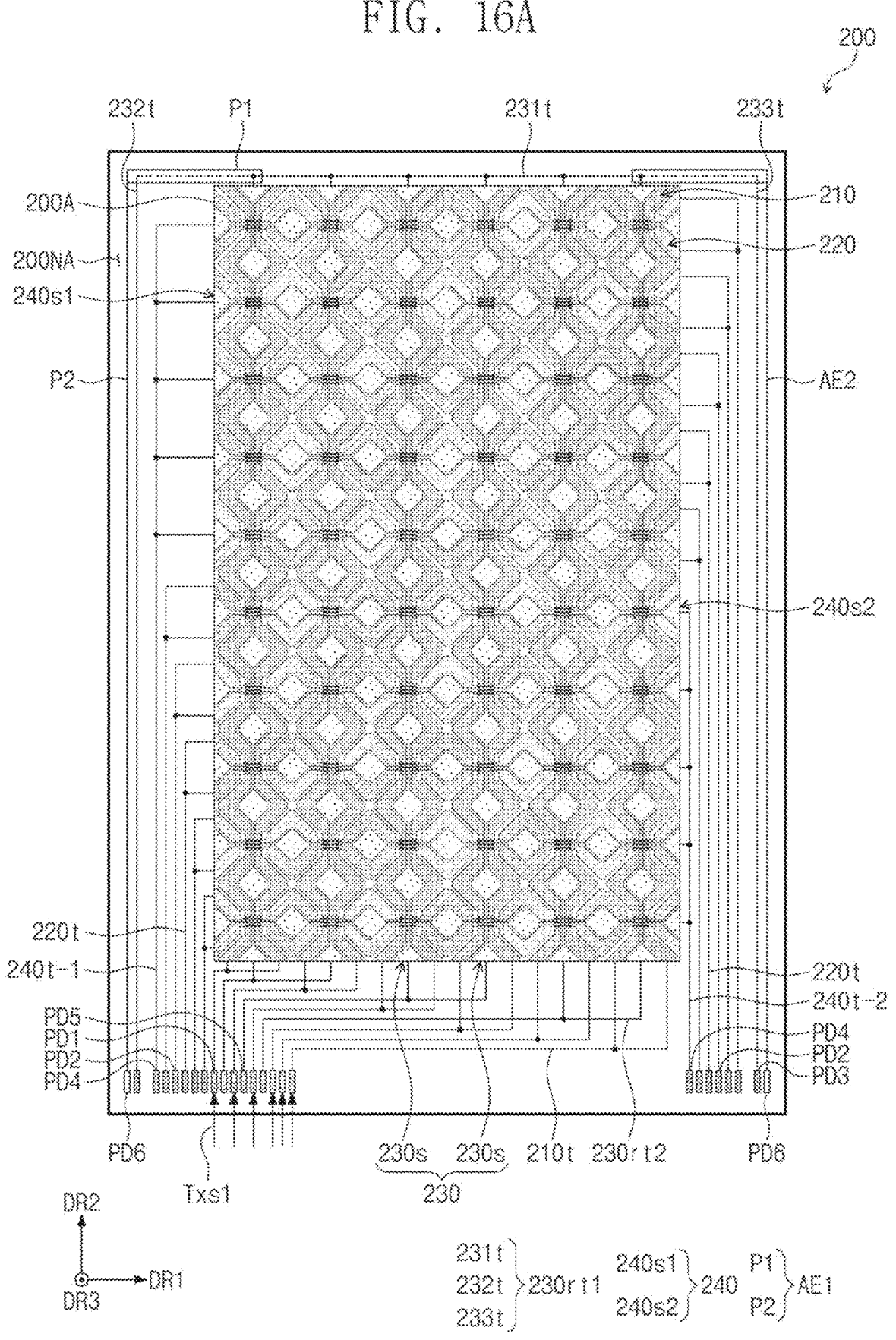
FIGS. 16A and 16B are views illustrating a first mode according to one or more embodiments of the present disclosure.
Figure 16B:
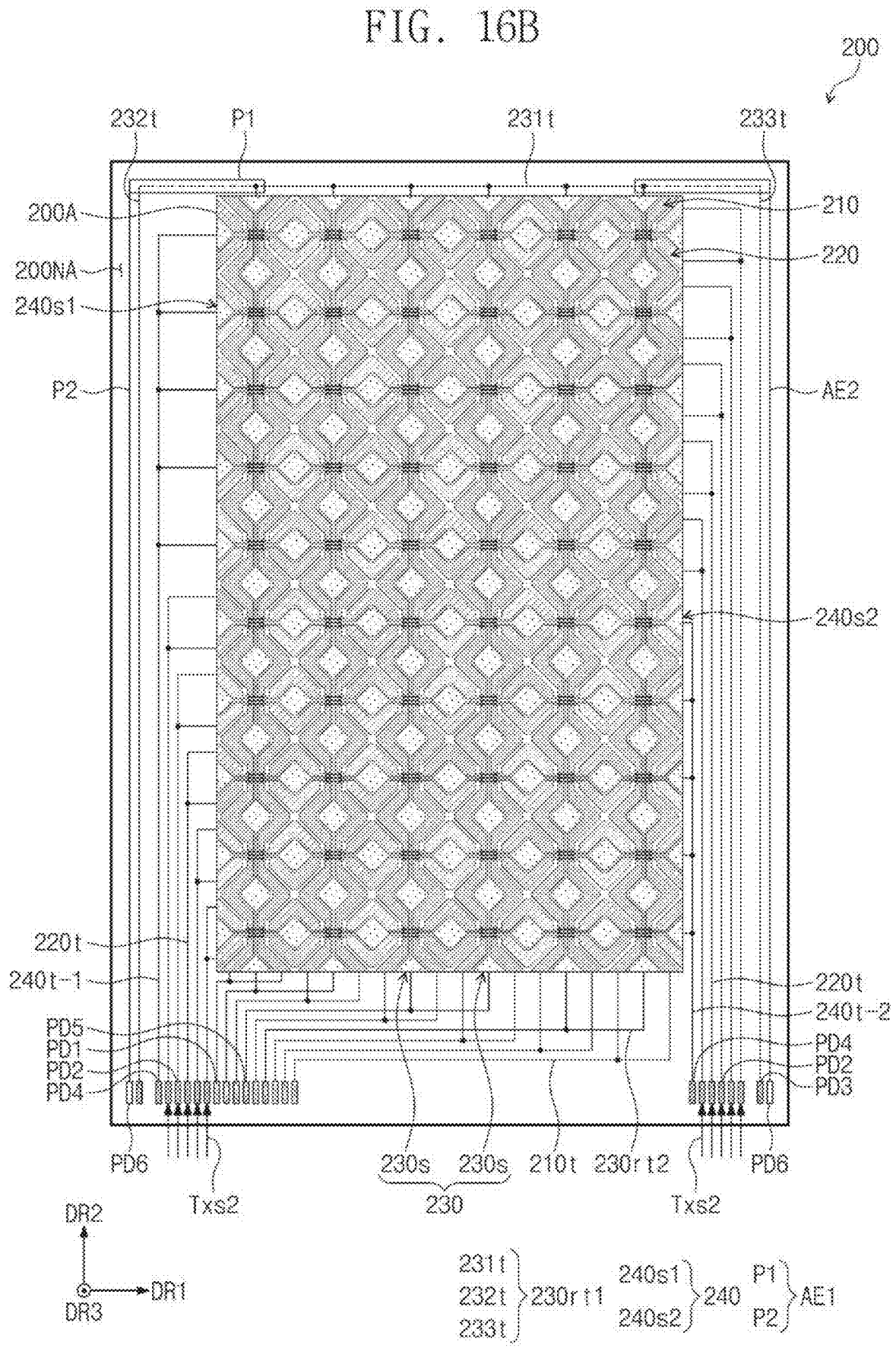

FIGS. 16A and 16B are views illustrating the first mode according to one or more embodiments of the present disclosure.

Referring to FIGS. 15, 16A, and 16B, the first mode MD1-*d* and the first mode MD1 may include a self-capacitance detection mode. The self-capacitance detection mode may include a first sub-section and a second sub-section. FIG. 16A is a view illustrating an operation in the first sub-section, and FIG. 16B is a view illustrating an operation in the second sub-section.

In the self-capacitance detection mode, the sensor driver 200C may calculate input coordinates by outputting drive signals Txs1 and Txs2 to the first electrodes 210 and the second electrodes 220, and sensing a change in the capacitance of each of the first electrodes 210 and the second electrodes 220. Referring to FIG. 16A, in the first sub-section, the sensor driver 200C may output the drive signal Txs1 to the first trace lines 210*t*. Referring to FIG. 16B, in the second sub-section, the sensor driver 200C may output the drive signal Txs2 to the second trace lines 220*t*.

The third electrodes 230 are electrically connected with the third trace line 230*rt*1 and the fifth trace lines 230*rt*2, and the fourth electrodes 240 are electrically connected with the fourth trace lines 240*t*-1 and 240*t*-2. In the self-capacitance detection mode, the third electrodes 230 and the fourth electrodes 240 may all be grounded. Accordingly, a noise may not be introduced through the third electrodes 230 and the fourth electrodes 240.

Figure 17:
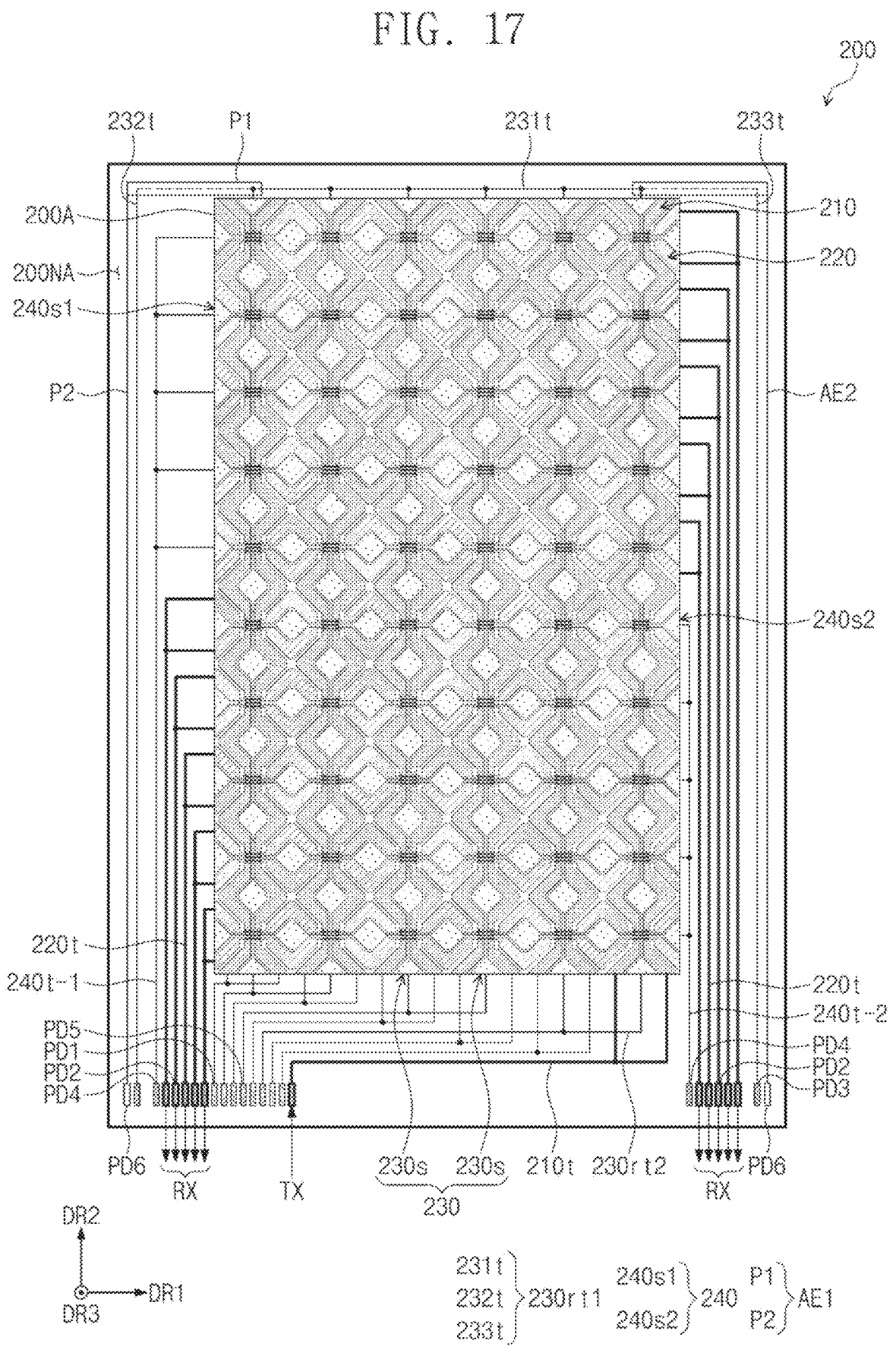
FIG. 17 is a view illustrating the first mode according to an embodiment of the present disclosure.

FIG. 17 is a view illustrating the first mode according to an embodiment of the present disclosure.

Referring to FIGS. 5, 15, and 17, the first mode MD1-*d* and the first mode MD1 may further include a mutual-capacitance detection mode. FIG. 17 is a view illustrating the mutual-capacitance detection mode in the first mode MD1-*d* and the first mode MD1.

In the mutual-capacitance detection mode, the sensor driver 200C may sequentially provide a transmission signal TX to the first electrodes 210, and may detect the coordinates for the first input 2000 using a reception signal RX detected through the second electrodes 220. For example, the sensor driver 200C may sense a change in the mutual capacitance between the first electrodes 210 and the second electrodes 220, and may calculate input coordinates.

FIG. 17 illustrates an example in which the transmission signal TX is provided to one first electrode 210, and the reception signal RX is output from the second electrodes 220. In FIG. 16, for convenience of illustration of the signal, hatching is drawn on only one first electrode 210 to which the transmission signal TX is provided. The sensor driver 200C may sense a change in the capacitance between the first electrode 210 and each of the second electrodes 220, and may detect the input coordinates for the first input 2000.

In the mutual-capacitance detection mode, the third electrodes 230 and the fourth electrodes 240 may all be grounded. Accordingly, a noise may not be introduced through the third electrodes 230 and the fourth electrodes 240.

In each of the first mode MD1-*d* and the first mode MD1, the sensor layer 200 may alternately repeat the operations described above with reference to FIGS. 16A, 16B, and 17. However, the present disclosure is not particularly limited thereto. For example, in each of the first mode MD1-*d* and the first mode MD1, the sensor layer 200 may repeat only the operation described above with reference to FIG. 17. As another example, in the first mode MD1-*d*, the sensor layer 200 may repeat only at least one of the operations described above with reference to FIGS. 16A, 16B, and 17, and in the first mode MD1, the sensor layer 200 may alternately repeat the operations described above with reference to FIGS. 16A, 16B, and 17.

Figure 18A:
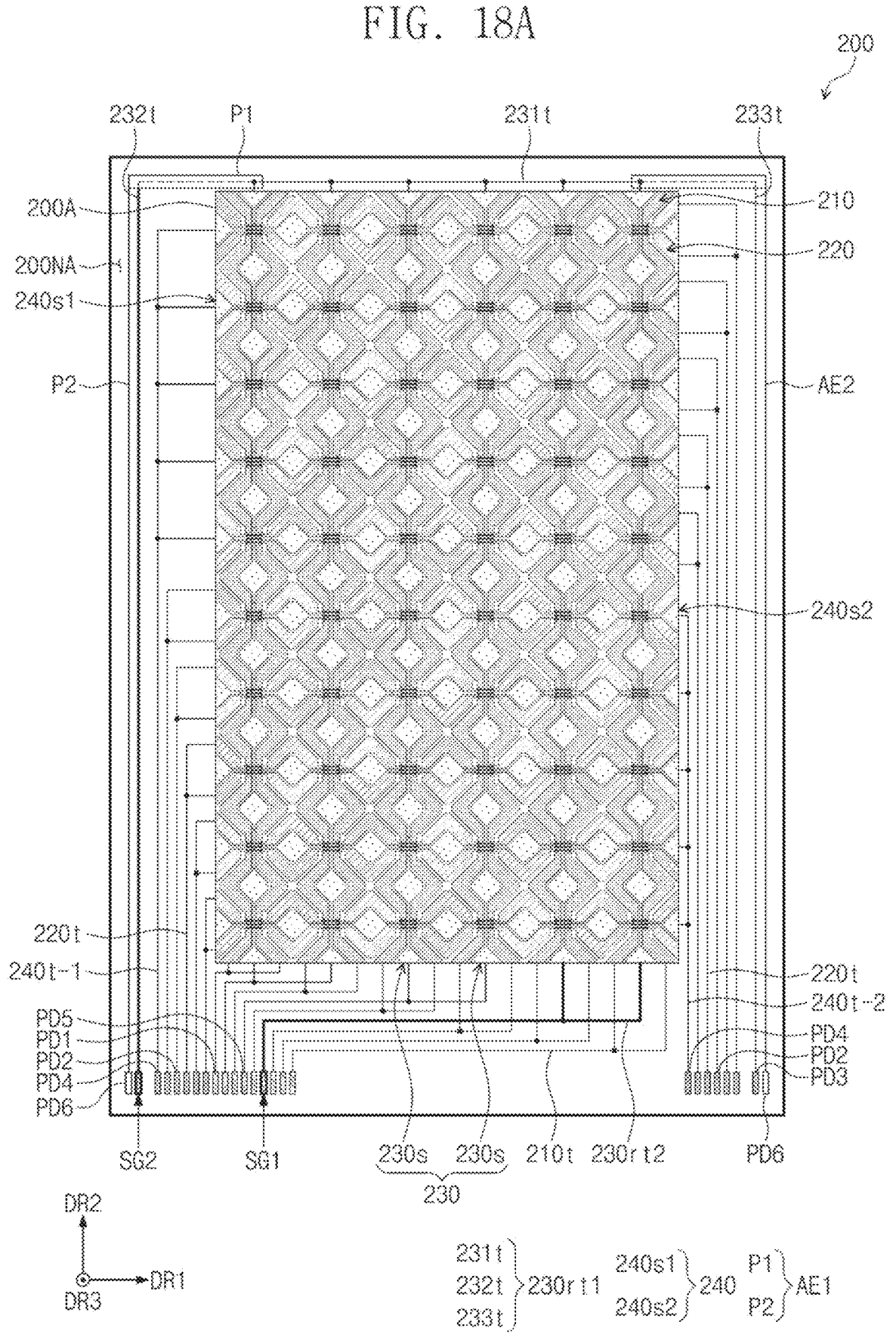
FIG. 18A is a view illustrating a second mode according to an embodiment of the present disclosure.
Figure 18B:
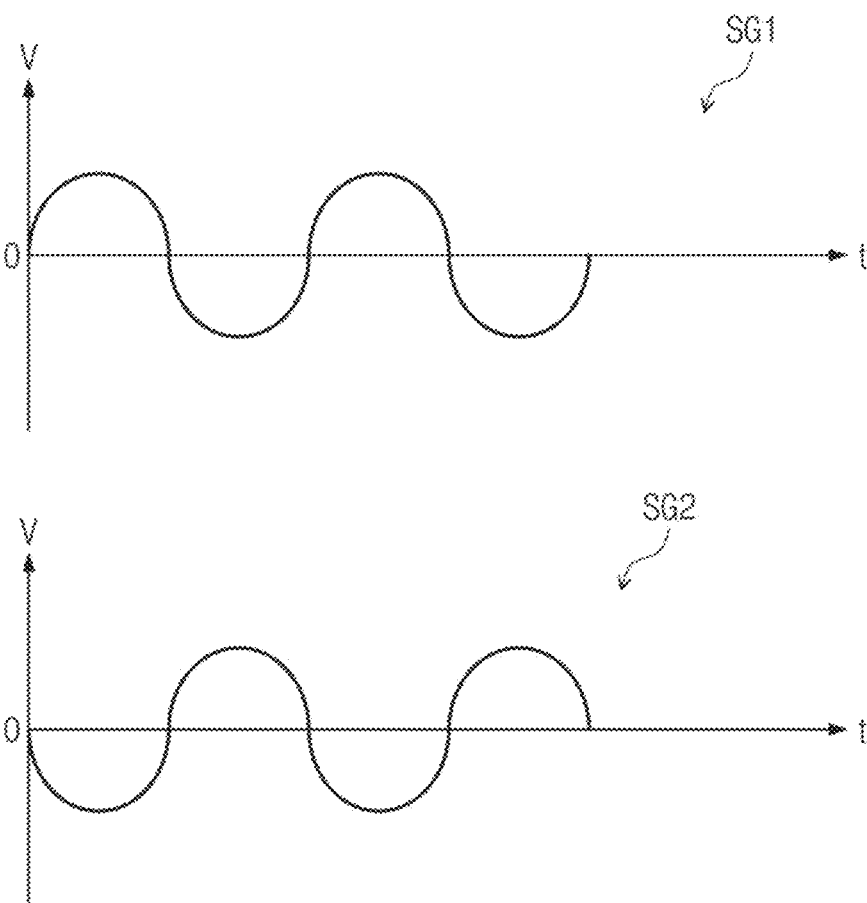
FIG. 18B illustrates graphs depicting waveforms of a first signal and a second signal according to an embodiment of the present disclosure.

FIG. 18A is a view illustrating the second mode according to an embodiment of the present disclosure. FIG. 18B illustrates graphs depicting waveforms of a first signal and a second signal according to an embodiment of the present disclosure.

Referring to FIGS. 5, 15, 18A, and 18B, the second mode MD2 may include a charging drive mode and a pen sensing drive mode.

In the charging drive mode, the sensor driver 200C may apply a first charging signal SG1 to at least one pad among the third pads PD3 and the fifth pads PD5, and may apply a second charging signal SG2 to at least one other pad. The second charging signal SG2 may be an inverse signal of the first charging signal SG1. The first charging signal SG1 and the second charging signal SG2 may be sinusoidal waves. However, the present disclosure is not limited thereto, and the waveforms of the first charging signal SG1 and the second charging signal SG2 are not limited thereto. For example, the first charging signal SG1 and the second charging signal SG2 may be square waves.

Although FIG. 18A illustrates an example in which the first charging signal SG1 is applied to one pad and the second charging signal SG2 is applied to another pad, the present disclosure is not limited thereto. For example, the first charging signal SG1 may be applied to two or more pads, and the second charging signal SG2 may be applied to two or more other pads.

Because the first charging signal SG1 and the second charging signal SG2 are applied to at least two pads, an electric current RFS may have a current path to flow through at least one pad to at least one other pad. Furthermore, because the first charging signal SG1 and the second charging signal SG2 may be sinusoidal-wave signals having an inverse phase relationship with each other, the direction of the electric current RFS may be periodically varied.

The first charging signal SG1 and the second charging signal SG2 may have an inverse phase relationship with each other. Accordingly, a noise caused in the display layer 100 by the first charging signal SG1 may cancel out a noise caused by the second charging signal SG2. Thus, a flicker phenomenon may not occur in the display layer 100, and a display quality of the display layer 100 may be improved.

FIG. 18A illustrates an example in which the second charging signal SG2 is provided to one third pad PD3*a* connected with one third trace line 230*rt*1, and the first charging signal SG1 is provided to one fifth pad PD5*a* connected with the third electrode 230. The electric current RFS may flow along a current path defined by the fifth pad PD5*a*, the fifth trace line 230*t*2 connected to the fifth pad PD5$a$, the third electrode 230, a portion of the third trace line 230$t$1 connected to the third pad PD3$a$, and the third pad PD3$a$. The current path may have a coil shape. Accordingly, in the charging drive mode of the second mode, the resonance circuit of the pen PN may be charged by the current path. In this case, the plurality of third electrodes 230 may be referred to as a plurality of channels.

According to some embodiments of the present disclosure, a current path having a loop coil pattern may be implemented by the components included in the sensor layer 200. Accordingly, the electronic device 1000 may charge the pen PN using the sensor layer 200. Thus, a component having a coil for charging the pen PN may not need to be separately added, so that an increase in the thickness and the weight of the electronic device 1000 and a decrease in the flexibility of the electronic device 1000 due to the addition of a separately added component may not occur.

In the charging drive mode, the first electrodes 210, the second electrodes 220, and the fourth electrodes 240 may be grounded or electrically floated, or may receive a constant or substantially constant voltage. In more detail, the first electrodes 210, the second electrodes 220, and the fourth electrodes 240 may be floated. In this case, the electric current RFS may not flow to the first electrodes 210, the second electrodes 220, and the fourth electrodes 240.

The charging drive mode may include a searching charging drive mode and a tracking charging drive mode.

In the searching charging drive mode, the first charging signal SG1 or the second charging signal SG2 may be sequentially provided to all channels included in the sensor layer 200, because the position of the pen PN is not sensed. For example, the first charging signal SG1 and the second charging signal SG2 may be sequentially scanned in the first direction DR1. In other words, in the searching charging drive mode, the entire active area 200A of the sensor layer 200 may be scanned.

When the pen PN is sensed in the searching charging drive mode, the sensor layer 200 may be driven in the tracking charging drive mode. For example, in the tracking charging drive mode, the sensor driver 200C may sequentially output the first charging signal SG1 and the second charging signal SG2 to an area overlapping with the point where the pen PN is sensed, rather than to the entire sensor layer 200.

Accordingly, after the position of the pen PN is sensed, channels that are driven for charging may be limited in correspondence to the position of the pen PN in a previous frame. Thus, the channels overlapping with an area where the pen is not located may not be driven for charging, so that an efficiency of a charging operation may be improved.

Figure 19A:
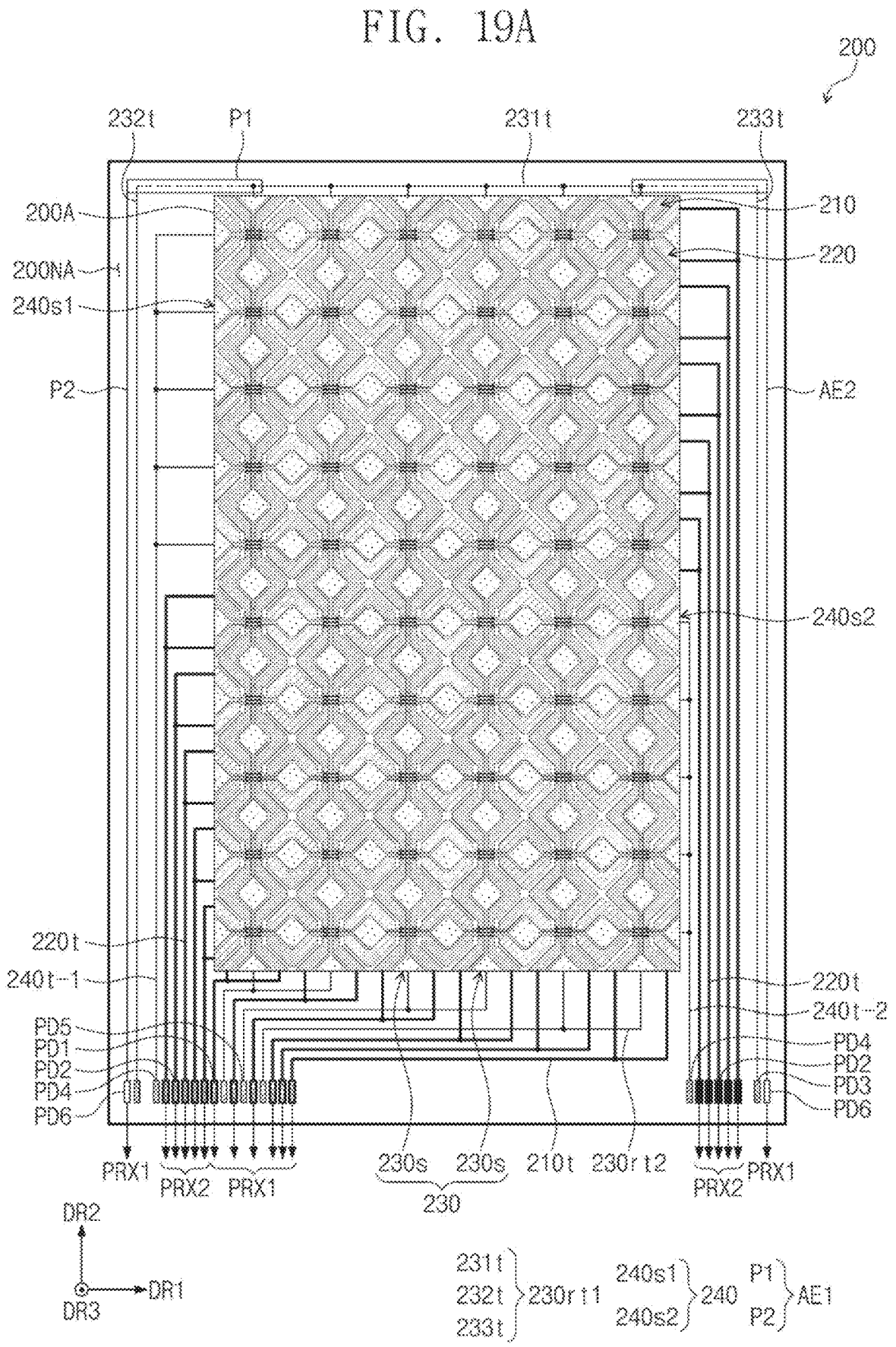
FIG. 19A is a view illustrating the second mode according to an embodiment of the present disclosure.
Figure 19B:
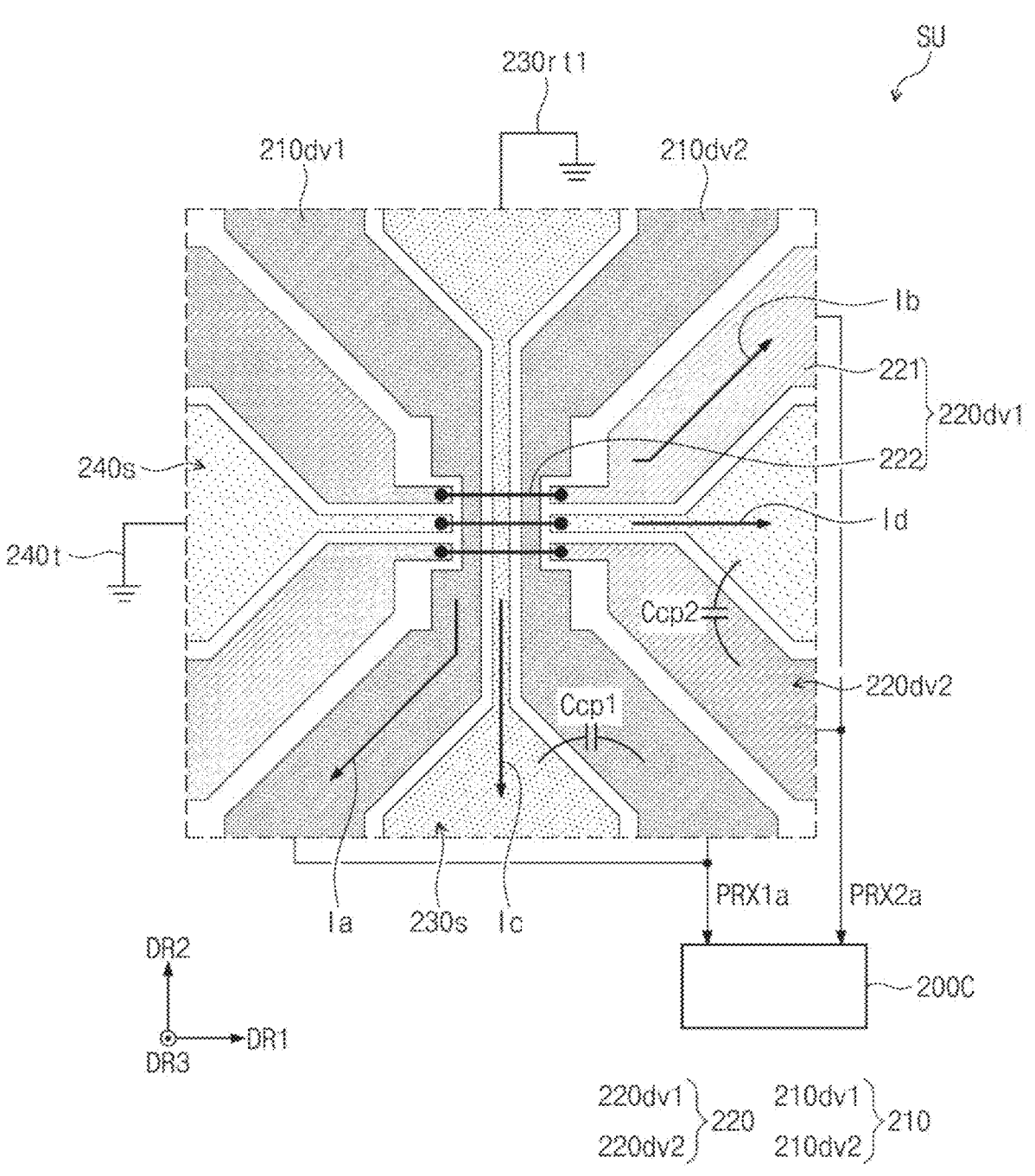
FIG. 19B is a view illustrating the second mode based on a sensing unit according to an embodiment of the present disclosure.

FIG. 19A is a view illustrating the second mode according to an embodiment of the present disclosure. FIG. 19B is a view illustrating the second mode based on a sensing unit according to an embodiment of the present disclosure.

Referring to FIGS. 5, 19A, and 19B, in the second mode, the charging drive mode and the pen sensing drive mode may be alternately repeated. In FIG. 19B, one sensing unit SU is illustrated through which first to fourth induced currents Ia, Ib, Ic, and Id may be generated by the pen PN flow.

The RLC resonance circuit of the pen PN may emit a magnetic field having a resonant frequency, while discharging charged charges. Due to the magnetic field provided by the pen PN, the first induced current Ia may be generated in the first electrode 210, and the second induced current Ib may be generated in the second electrode 220. In addition, the third induced current Ic may be generated in the first auxiliary electrode 230$s$ of the third electrode 230, and the fourth induced current Id may be generated in the second auxiliary electrode 240$s$ of the fourth electrode 240. The second auxiliary electrode 240$s$ may be the second auxiliary electrode 240$s$1 or 240$s$2 illustrated in FIG. 18A.

A first coupling capacitor Ccp1 may be formed between the first auxiliary electrode 230$s$ and the first electrode 210, and a second coupling capacitor Ccp2 may be formed between the second auxiliary electrode 240$s$ and the second electrode 220. The third induced current Ic may be transferred to the first electrode 210 through the first coupling capacitor Ccp1, and the fourth induced current Id may be transferred to the second electrode 220 through the second coupling capacitor Ccp2. In this case, the plurality of first electrodes 210 and the plurality of second electrodes 220 may each be referred to as a channel.

The sensor driver 200$c$ may receive a first reception signal PRX1$a$ based on the first induced current Ia and the third induced current Ic from the first electrode 210, and may receive a second reception signal PRX2$a$ based on the second induced current Ib and the fourth induced current Id from the second electrode 220.

The first reception signal PRX1$a$ and the second reception signal PRX2$a$ may be provided as sinusoidal waves by the first to fourth induced currents Ia, Ib, Ic, and Id.

In other words, the sensor driver 200C may receive the first reception signal PRX1$a$ from the plurality of first electrodes 210, and may receive the second reception signal PRX2$a$ from the plurality of second electrodes 220. The sensor driver 200C may detect the coordinates of the pen PN based on the first reception signal PRX1$a$ and/or the second reception signal PRX2$a$.

The sensor driver 200C may receive the first reception signal PRX1$a$ from the first electrodes 210, and may receive the second reception signal PRX2$a$ from the second electrodes 220. In this case, the first ends of the third electrodes 230 and the fourth electrodes 240 may all be floated. Accordingly, a compensation for a sensing signal may be maximized or improved by the coupling between the first electrodes 210 and the third electrodes 230 and the coupling between the second electrodes 220 and the fourth electrodes 240. In addition, the second ends of the third electrodes 230 and the fourth electrodes 240 may be grounded or floated. Accordingly, the third induced current Ic and the fourth induced current Id may be sufficiently transferred to the first electrodes 210 and the second electrodes 220 by the coupling between the first electrodes 210 and the third electrodes 230 and the coupling between the second electrodes 220 and the fourth electrodes 240.

In an embodiment of the present disclosure, routing directions of an electrode and an auxiliary electrode of the sensor layer 200 that overlap with each other may be different from each other. For example, the routing direction of the first electrode 210 and the routing direction of the first auxiliary electrode 230$s$ may be different from each other. In addition, the routing direction of the second electrode 220 and the routing direction of the second auxiliary electrode 240$s$ may be different from each other. For example, in FIG. 19B, the first electrode 210 and the first trace line 210$t$ may be connected to each other on the lower side of the sensing unit SU, and the first auxiliary electrode 230$s$ and the third trace line 230$rt$1 may be connected to each other on the upper side of the sensing unit SU. The second electrode 220 and the second trace line 220$t$ may be connected to each other on the left side of the sensing unit SU, and the second auxiliary electrode 240*s* and the fourth trace line 240*t* may be connected to each other on the right side of the sensing unit SU.

Figure 20A:
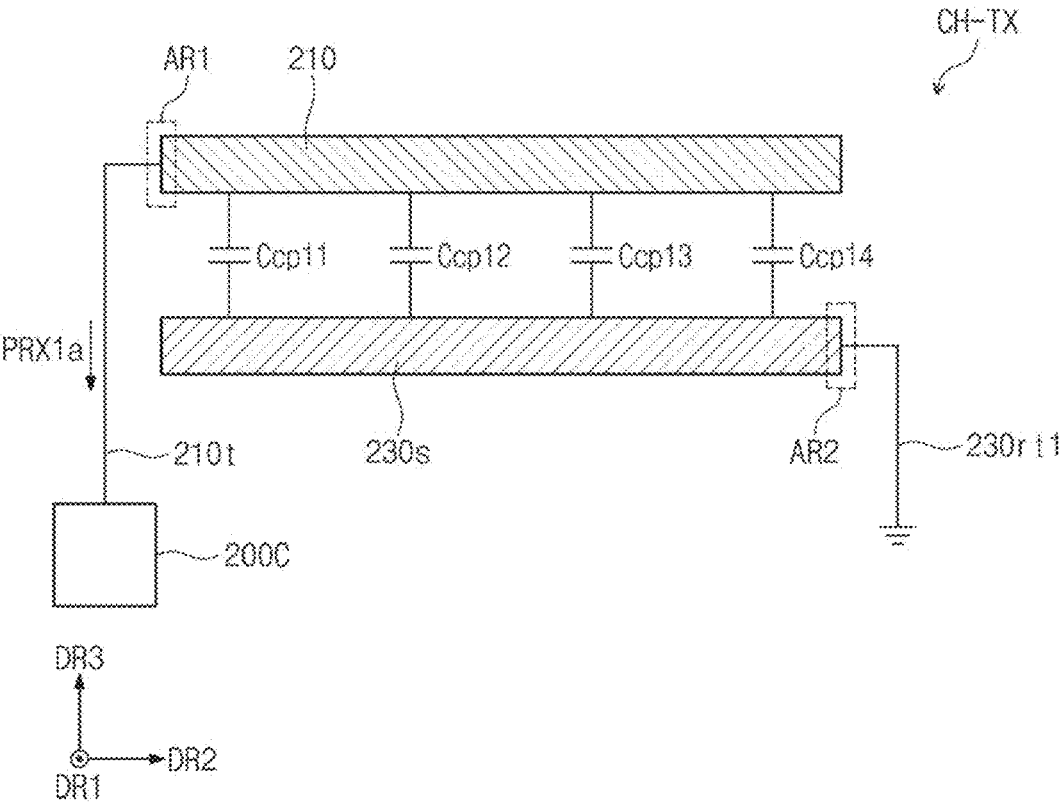
FIG. 20A is a schematic view illustrating one channel according to an embodiment of the present disclosure.

FIG. 20A is a schematic view illustrating one channel according to an embodiment of the present disclosure.

Referring to FIGS. 8, 19B, and 20A, one first channel CH-TX is illustrated. For example, the one first channel CH-TX may include the first electrode 210, and the first auxiliary electrode 230*s* overlapping with the first electrode 210. For example, the first electrode 210 and the first auxiliary electrode 230*s* may overlap with each other when viewed in the third direction DR3 (e.g., in a plan view). The first electrode 210 may output the first reception signal PRX1*a* to the sensor driver 200C, and the first auxiliary electrode 230*s* may be coupled with the first electrode 210.

In an embodiment of the present disclosure, the first auxiliary electrode 230*s* may be electrically connected with the ground in the pen sensing drive mode. For example, the third trace line 230*rt*1 electrically connected to the first auxiliary electrode 230*s* may be grounded. In other words, the third electrode 230 may be directly connected to the ground through the third trace line 230*rt*1.

The first electrode 210 may be connected with the first trace line 210*t* in a first area AR1, and the first auxiliary electrode 230*s* may be connected with the third trace line 230*rt*1 in a second area AR2. Each of the first electrode 210 and the first auxiliary electrode 230*s* may extend in the second direction DR2, and the first area AR1 and the second area AR2 may be spaced apart from each other in the second direction DR2.

A plurality of first coupling capacitors Ccp11, Ccp12, Ccp13, and Ccp14 may be defined between the first electrode 210 and the first auxiliary electrode 230*s*. In a sensing mode, the sensor driver 200C may receive a first induced current flowing from the first auxiliary electrode 230*s* toward the first electrode 210 through the first coupling capacitors Ccp11, Ccp12, Ccp13, and Ccp14. The first induced current may be transferred to the sensor driver 200C as a reception signal (e.g., a sensing signal or a signal).

Figure 20B:
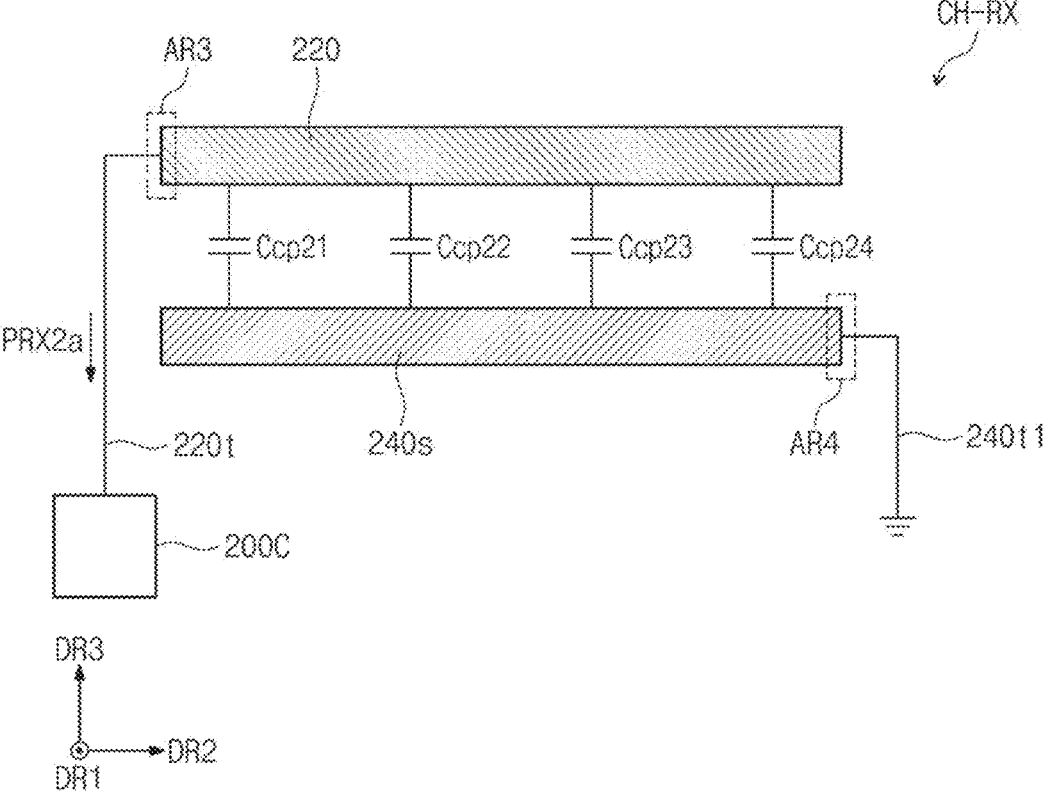
FIG. 20B is a schematic view illustrating one channel according to an embodiment of the present disclosure.

FIG. 20B is a schematic view illustrating one channel according to an embodiment of the present disclosure.

Referring to FIGS. 8, 19B, and 20B, one second channel CH-RX is illustrated. For example, the one second channel CH-RX may include the second electrode 220, and the second auxiliary electrode 240*s* overlapping with the second electrode 220. For example, the second electrode 220 and the second auxiliary electrode 240*s* may overlap with each other when viewed in the third direction DR3 (e.g., in a plan view). The second electrode 220 may output the second reception signal PRX2*a* to the sensor driver 200C, and the second auxiliary electrode 240*s* may be coupled with the second electrode 220.

In an embodiment of the present disclosure, the second auxiliary electrode 240*s* may be electrically connected with the ground in the pen sensing drive mode. For example, the fourth trace line 240*t* electrically connected to the second auxiliary electrode 240*s* may be grounded. In other words, the second auxiliary electrode 240*s* may be directly connected to the ground through the fourth trace line 240*t*.

The second electrode 220 may be connected with the second trace line 220*t* in a third area AR3, and the second auxiliary electrode 240*s* may be connected with the fourth trace line 240*t* in a fourth area AR4. Each of the second electrode 220 and the second auxiliary electrode 240*s* may extend in the first direction DR1, and the third area AR3 and the fourth area AR4 may be spaced apart from each other in the first direction DR1.

A plurality of second coupling capacitors Ccp21, Ccp22, Ccp23, and Ccp24 may be defined between the second electrode 220 and the second auxiliary electrode 240*s*. In a sensing mode, the sensor driver 200C may receive a second induced current flowing from the second auxiliary electrode 240*s* toward the second electrode 220 through the second coupling capacitors Ccp21, Ccp22, Ccp23, and Ccp24. The second induced current may be transferred to the sensor driver 200C as a reception signal (e.g., a sensing signal or a signal).

Figure 20C:
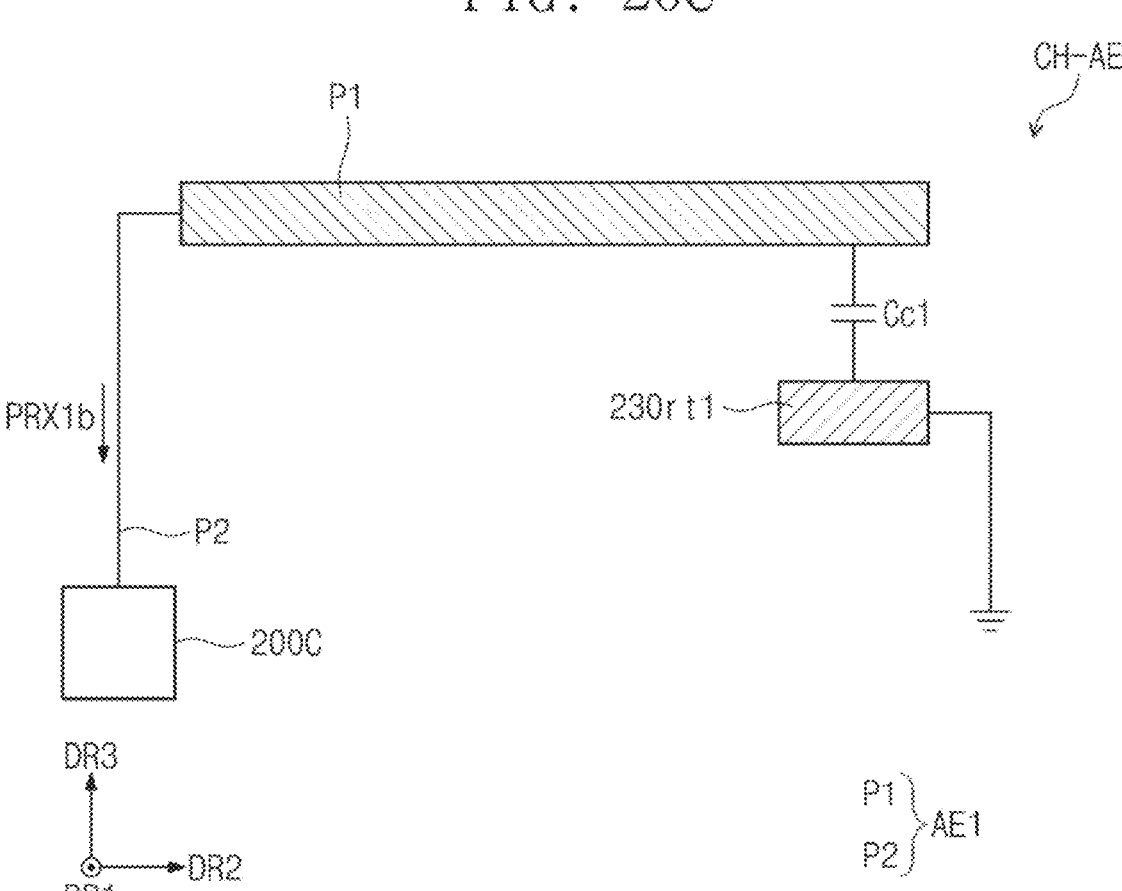
FIG. 20C is a schematic view illustrating one channel according to an embodiment of the present disclosure.

FIG. 20C is a schematic view illustrating one channel according to an embodiment of the present disclosure.

Referring to FIGS. 8, 19B, and 20C, one additional channel CH-AE is illustrated. For example, the one additional channel CH-AE may include the first additional electrode AE1, and the third trace line 230*rt*1 overlapping with the first additional electrode AE1.

The first additional electrode AE1 may output a first reception signal PRX1*b* to the sensor driver 200C. The first additional electrode AE1 may be coupled with the third trace line 230*rt*1.

The first additional electrode AE1 may include the first portion P1 and the second portion P2. For example, the first portion P1 and the third trace line 230*rt*1 may overlap with each other when viewed in the third direction DR3 (e.g., in a plan view). The second portion P2 of the first additional electrode AE1 may output a second reception signal PRX2*b* to the sensor driver 200C, and the first portion P1 may be coupled with the third trace line 230*rt*1.

In an embodiment of the present disclosure, the third trace line 230*rt*1 may be electrically connected with the ground in the pen sensing drive mode.

A coupling capacitor Cc1 may be defined between the first portion P1 and the third trace line 230*rt*1. In a sensing mode, the sensor driver 200C may receive a third induced current flowing from the third trace line 230*rt*1 toward the first additional electrode AE1 through the coupling capacitor Cc1. The third induced current may be transferred to the sensor driver 200C as a reception signal (e.g., a sensing signal or a signal).

Figure 21A:
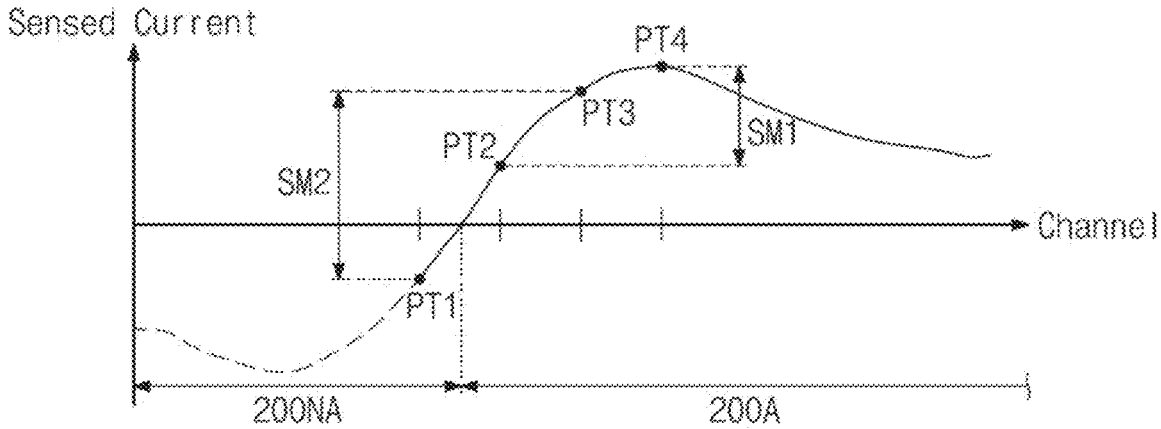
FIG. 21A is a graph depicting currents sensed from first channels and an additional channel according to an embodiment of the present disclosure.
Figure 21B:
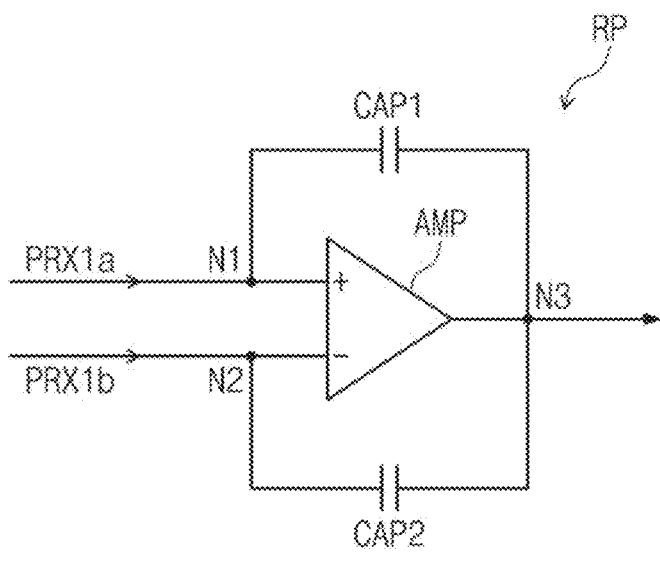
FIG. 21B is a view illustrating a receiver according to an embodiment of the present disclosure.

FIG. 21A is a graph depicting currents sensed from first channels and an additional channel according to an embodiment of the present disclosure. FIG. 21B is a view illustrating a receiver according to an embodiment of the present disclosure.

Referring to FIGS. 19A, 21A, and 21B, the directions of the currents sensed from channels on opposite sides of a portion where the pen PN (e.g., refer to FIG. 5) is located may be different from each other. The direction of a current flowing through the channels located on the left side with respect to the position of the pen PN may be different from the direction of a current flowing through the channels located on the right side with respect to the position of the pen PN. Accordingly, the sensor driver 200C may sense the currents flowing in the different directions with respect to the position of the pen PN.

The sensor driver 200C may sense the currents by differentially sensing the channels adjacent to each other, or the channels spaced apart from each other. For example, the sensor driver 200C may sense the currents by differentially sensing two channels spaced apart from each other with one channel therebetween.

The sensor driver 200C may include a plurality of receivers RP. One of the plurality of receivers RP may be electrically connected with one of the plurality of first electrodes 210 and/or the first additional electrode AE1.

Each of the plurality of receivers RP may include an amplifier AMP, a first feedback capacitor CAP1, and a second feedback capacitor CAP2.

Hereinafter, for convenience of illustration, one of the plurality of receivers RP will be described in more detail. The amplifier AMP may include a first input terminal N1, a second input terminal N2, and an output terminal N3. The first input terminal N1 may be electrically connected with the one of the plurality of first electrodes 210. The second input terminal N2 may be electrically connected with the first additional electrode AE1.

The first input terminal N1 may receive the first reception signal PRX1$a$. The second input terminal N2 may receive the first reception signal PRX1$b$.

The first feedback capacitor CAP1 may be connected between the first input terminal N1 and the output terminal N3.

The second feedback capacitor CAP2 may be connected between the second input terminal N2 and the output terminal N3.

To match an impedance by a difference between the capacitance of the plurality of first coupling capacitors Ccp11, Ccp12, Ccp13, and Ccp14 (e.g., refer to FIG. 20A) and the capacitance of the coupling capacitor Cc1 (e.g., refer to FIG. 20C), the capacitance of the first feedback capacitor CAP1 may be different from the capacitance of the second feedback capacitor CAP2.

A signal having a second signal magnitude SM2 may be output through the one of the plurality of receivers RP, and the coordinates of the pen PN (e.g., refer to FIG. 5) at the boundary between the active area 200A and the peripheral area 200NA may be sensed (e.g., may be easily sensed) based on the signal.

When the pen PN (e.g., refer to FIG. 5) is disposed at the boundary between the active area 200A and the peripheral area 200NA, and unlike in some embodiments of the present disclosure, the sensor layer 200 does not include the first additional electrode AE1 and the second additional electrode AE2, an outermost signals capable of being measured by differentially sensing two of the plurality of first electrodes 210 may be the second signal PT2 and the fourth signal PT4. In this case, a signal differentially sensed using the second signal PT2 and the fourth signal PT4 may have a first signal magnitude SM1. However, according to some embodiments of the present disclosure, the sensor layer 200 may sense the first signal PT1 through the first additional electrode AE1 disposed in the peripheral area 200NA. The outermost signals capable of being measured by differentially sensing one of the plurality of first electrodes 210 and the first additional electrode AE1 may be the first signal PT1 and the third signal PT3. In this case, a signal differentially sensed using the first signal PT1 and the third signal PT3 may have the second signal magnitude SM2. The second signal magnitude SM2 may be greater than the first signal magnitude SM1. Accordingly, a sensing reliability of the pen PN (e.g., refer to FIG. 5) at the boundary between the active area 200A and the peripheral area 200NA may be improved.

Figure 22:
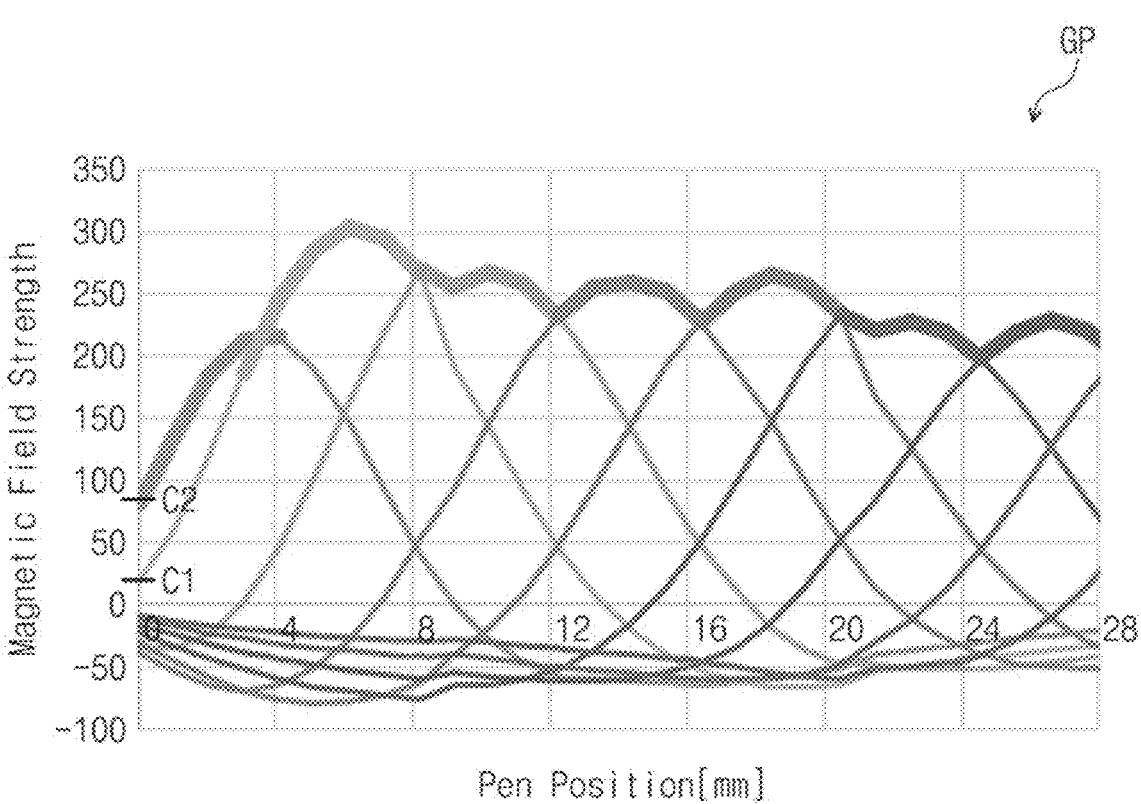
FIG. 22 is a graph depicting magnetic field strength versus pen position according to an embodiment of the present disclosure.

FIG. 22 is a graph depicting magnetic field strength versus pen position according to an embodiment of the present disclosure.

Referring to FIGS. 19A, 21A, and 22, the horizontal axis of the graph GP may refer to the position of the pen PN (e.g., refer to FIG. 5). The unit of the position of the pen PN may be millimeters (mm). For example, 0 mm may refer to the boundary between the active area 200A and the peripheral area 200NA, and an increase in the position of the pen PN may refer to the movement of the pen PN in the first direction DR1.

The vertical axis of the graph GP may refer to the magnetic field strength received by the sensor layer 200. The unit of the magnetic field strength may be nanoteslas (nT).

A signal received from each of the plurality of first electrodes 210 arranged along the first direction DR1 may exhibit a Gaussian distribution. The connection of the maximum values at the positions of the pen PN (e.g., refer to FIG. 5) may represent the magnetic field strengths of signals sensed by the sensor layer 200 at the positions of the pen PN.

When the sensor layer 200 does not include the first additional electrode AE1 and the second additional electrode AE2, unlike that in some embodiments of the present disclosure, a signal at the boundary between the active area 200A and the peripheral area 200NA that is measured from the pen PN may have a first signal strength C1. For example, the first signal strength C1 may be 8. However, according to some embodiments of the present disclosure, a signal at the boundary between the active area 200A and the peripheral area 200NA that is measured from the pen PN may have a second signal strength C2 by the first additional electrode AE1 disposed in the peripheral area 200NA. The second signal strength C2 may be greater than the first signal strength C1. For example, the second signal strength C2 may be 36. Thus, the magnitude of the signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

According to some embodiments of the present disclosure, at the boundary between the active area 200A and the peripheral area 200NA, the sensor layer 200 including the first additional electrode AE1 may receive a signal having a magnetic field strength that is 4.5 times higher than the magnetic field strength of a signal received by a sensor layer that does not include the first additional electrode AE1. Accordingly, the sensing reliability of the pen PN may be improved.

Figure 23:
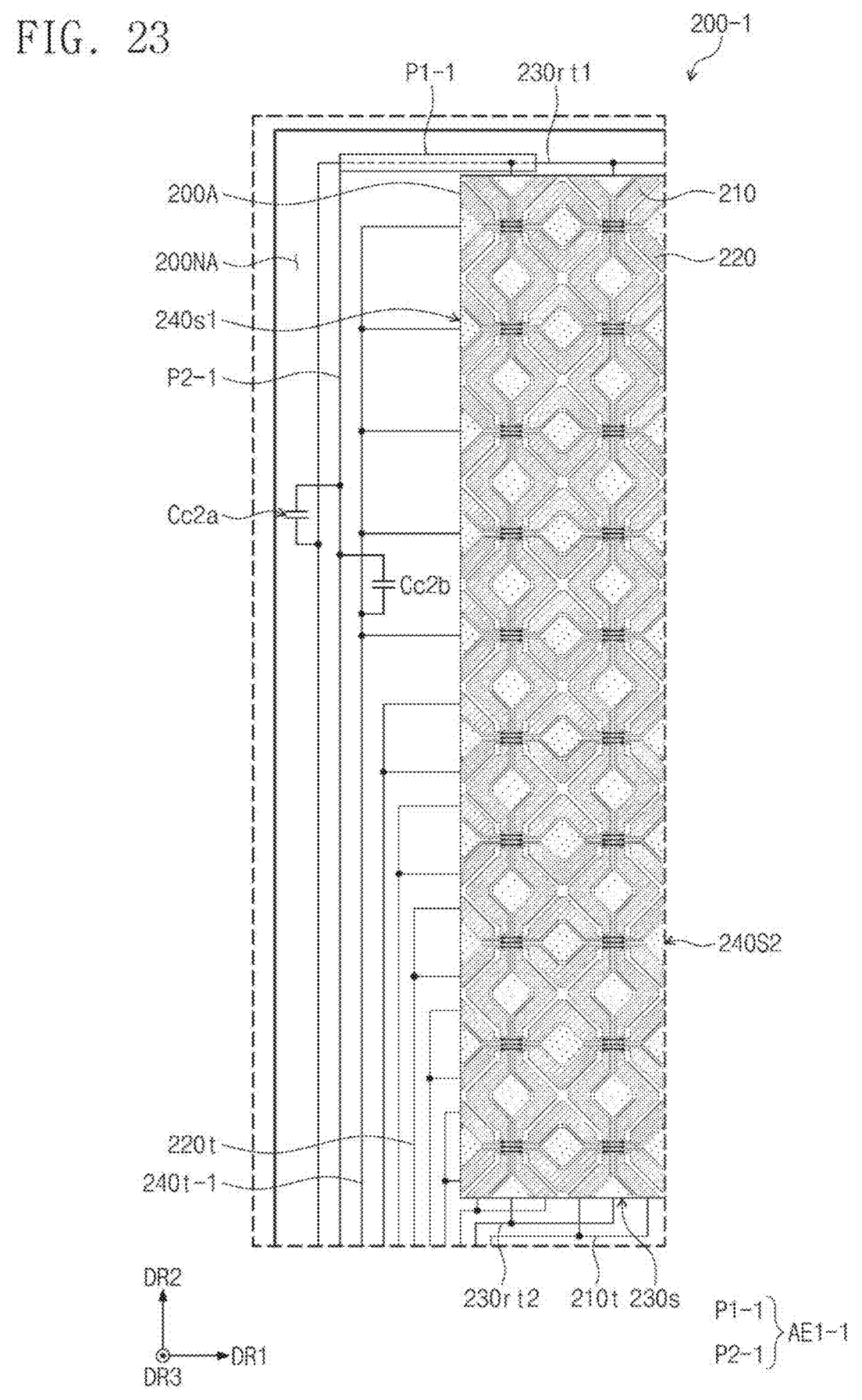

FIG. 23 is a plan view illustrating a portion of a sensor layer according to an embodiment of the present disclosure. In FIG. 23, the same or substantially the same components as those described above with reference to FIG. 8 may be denoted with the same reference symbols, and thus, redundant description thereabout may not be repeated hereinafter.

Referring to FIG. 23, the sensor layer 200-1 may include a first additional electrode AE1-1 disposed in the peripheral area 200NA.

The first additional electrode AE1-1 may include a first portion P1-1 and a second portion P2-1.

The first portion P1-1 may extend in the first direction DR1. The first portion P1-1 may overlap with the third trace line 230$rt$1 when viewed from above the plane (e.g., in a plan view).

The first coupling capacitor Cc1 (e.g., refer to FIG. 20C) may be formed between the first portion P1-1 and the third trace line 230$rt$1. The first coupling capacitor Cc1 may be formed in the third direction DR3. In other words, the first coupling capacitor Cc1 may be a capacitor formed in the vertical direction.

The second portion P2-1 may extend from the first portion P1-1 in the second direction DR2. The second portion P2-1 may be disposed between the third trace line 230$rt$1 and the fourth trace line 240$t$-1 when viewed from above the plane (e.g., in a plan view).

A second-first coupling capacitor Cc2a may be formed between the second portion P2-1 and the third trace line 230rt1. The second-first coupling capacitor Cc2a may be formed in the first direction DR1. In other words, the second-first coupling capacitor Cc2a may be a capacitor formed in the horizontal direction.

A second-second coupling capacitor Cc2b may be formed between the second portion P2-1 and the fourth trace line 240t-1. The second-second coupling capacitor Cc2b may be formed in the first direction DR1. In other words, the second-second coupling capacitor Cc2b may be a capacitor formed in the horizontal direction.

According to some embodiments of the present disclosure, the first additional electrode AE1-1 disposed in the peripheral area 200NA may transfer an induced current formed by the pen PN (e.g., refer to FIG. 5) to the sensor driver 200C based on the first coupling capacitor Cc1 (e.g., refer to FIG. 20C), the second-first coupling capacitor Cc2a, and the second-second coupling capacitor Cc2b. The coupling capacitor between the first additional electrode AE1-1 and the third trace line 230rt1 may be increased, and thus, the magnitude of a sensing signal may be increased. The magnitude of a signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

Figure 24A:
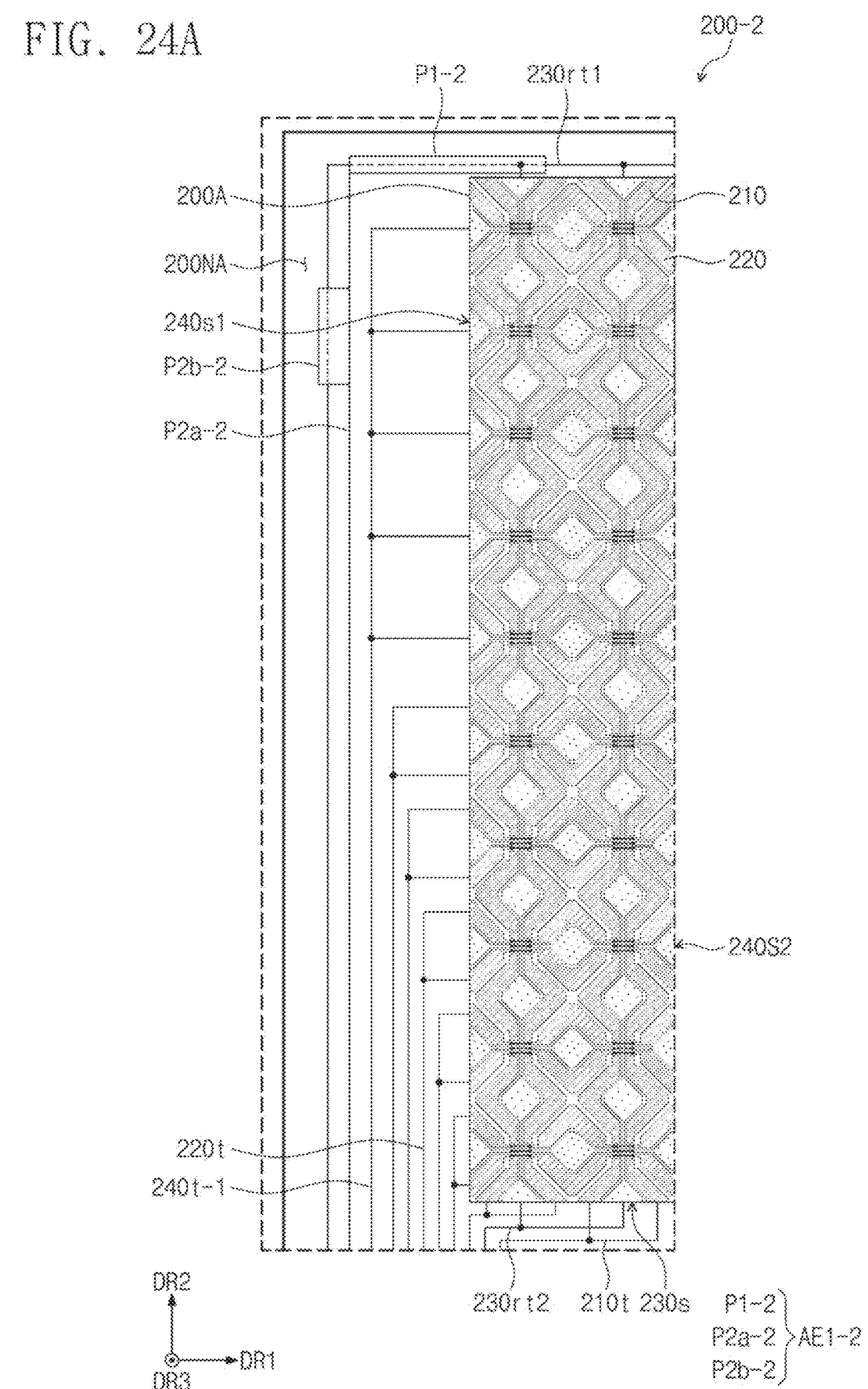
FIG. 24A is a plan view illustrating a portion of a sensor layer according to an embodiment of the present disclosure.
Figure 24B:
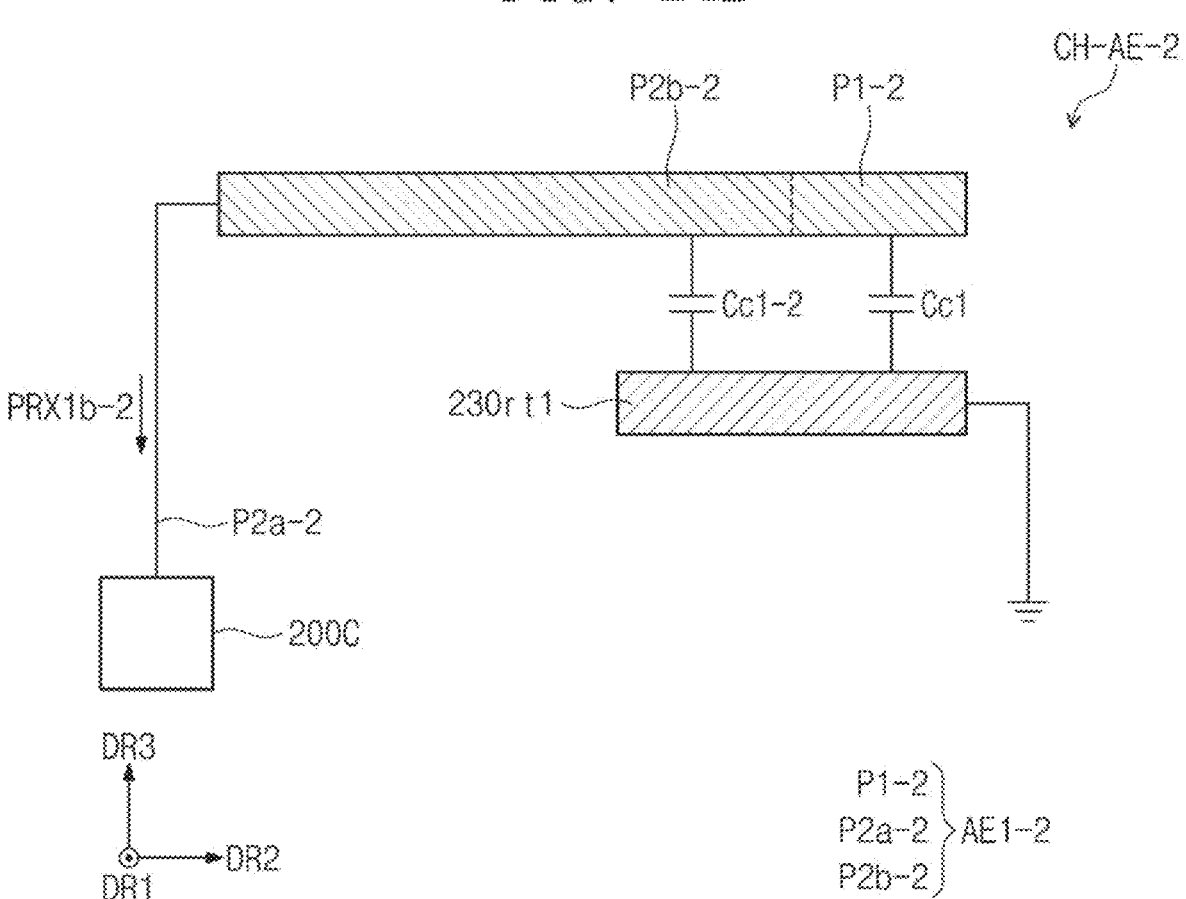
FIG. 24B is a schematic view illustrating one channel according to an embodiment of the present disclosure.

FIG. 24A is a plan view illustrating a portion of a sensor layer according to an embodiment of the present disclosure. FIG. 24B is a schematic view illustrating one channel according to an embodiment of the present disclosure. In FIG. 24A, the same or substantially the same components as those described above with reference to FIG. 8 may be denoted with the same reference symbols, and thus, redundant description thereabout may not be repeated hereinafter.

Referring to FIGS. 24A and 24B, the sensor layer 200-2 may include a first additional electrode AE1-2 disposed in the peripheral area 200NA.

The first additional electrode AE1-2 may include a first portion P1-2 and a second portion. The second portion may include a first sub-portion P2a-2 and a second sub-portion P2b-2.

The first portion P1-2 may extend in the first direction DR1. The first portion P1-2 may overlap with the third trace line 230rt1 when viewed from above the plane (e.g., in a plan view).

A first coupling capacitor Cc1 may be formed between the first portion P1-2 and the third trace line 230rt1. The first coupling capacitor Cc1 may be formed in the third direction DR3. In other words, the first coupling capacitor Cc1 may be a capacitor formed in the vertical direction.

The second portion may extend from the first portion P1-2 in the second direction DR2.

The first sub-portion P2a-2 may have a first area.

The second sub-portion P2b-2 may have a second area. The second area may be greater than the first area. The second sub-portion P2b-2 may overlap with the third trace line 230rt1 when viewed from above the plane (e.g., in a plan view). A first-second coupling capacitor Cc1-2 may be formed between the second sub-portion P2b-2 and the third trace line 230rt1. The first-second coupling capacitor Cc1-2 may be formed in the third direction DR3. In other words, the first-second coupling capacitor Cc1-2 may be a capacitor formed in the vertical direction.

One additional channel CH-AE-2 may include the first additional electrode AE1-2 and the third trace line 230rt1.

The first additional electrode AE1-2 may output a first reception signal PRX1b-2 to the sensor driver 200C. The first additional electrode AE1-2 may be coupled with the third trace line 230rt1.

The first coupling capacitor Cc1 may be defined between the first portion P1-2 and the third trace line 230rt1. The first-second coupling capacitor Cc1-2 may be defined between the second sub-portion P2b-2 and the third trace line 230rt1. In a sensing mode, the sensor driver 200C may receive a third induced current flowing from the third trace line 230rt1 toward the first additional electrode AE1-2 through the first coupling capacitor Cc1 and the first-second coupling capacitor Cc1-2. The third induced current may be transferred to the sensor driver 200C as a reception signal (e.g., a sensing signal or a signal).

According to some embodiments of the present disclosure, the first additional electrode AE1-2 disposed in the peripheral area 200NA may transfer an induced current formed by the pen PN (e.g., refer to FIG. 5) to the sensor driver 200C based on the first coupling capacitor Cc1 and the first-second coupling capacitor Cc1-2. The coupling capacitor between the first additional electrode AE1-2 and the third trace line 230rt1 may be increased, and thus, the magnitude of a sensing signal may be increased. The magnitude of a signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

Figure 25:
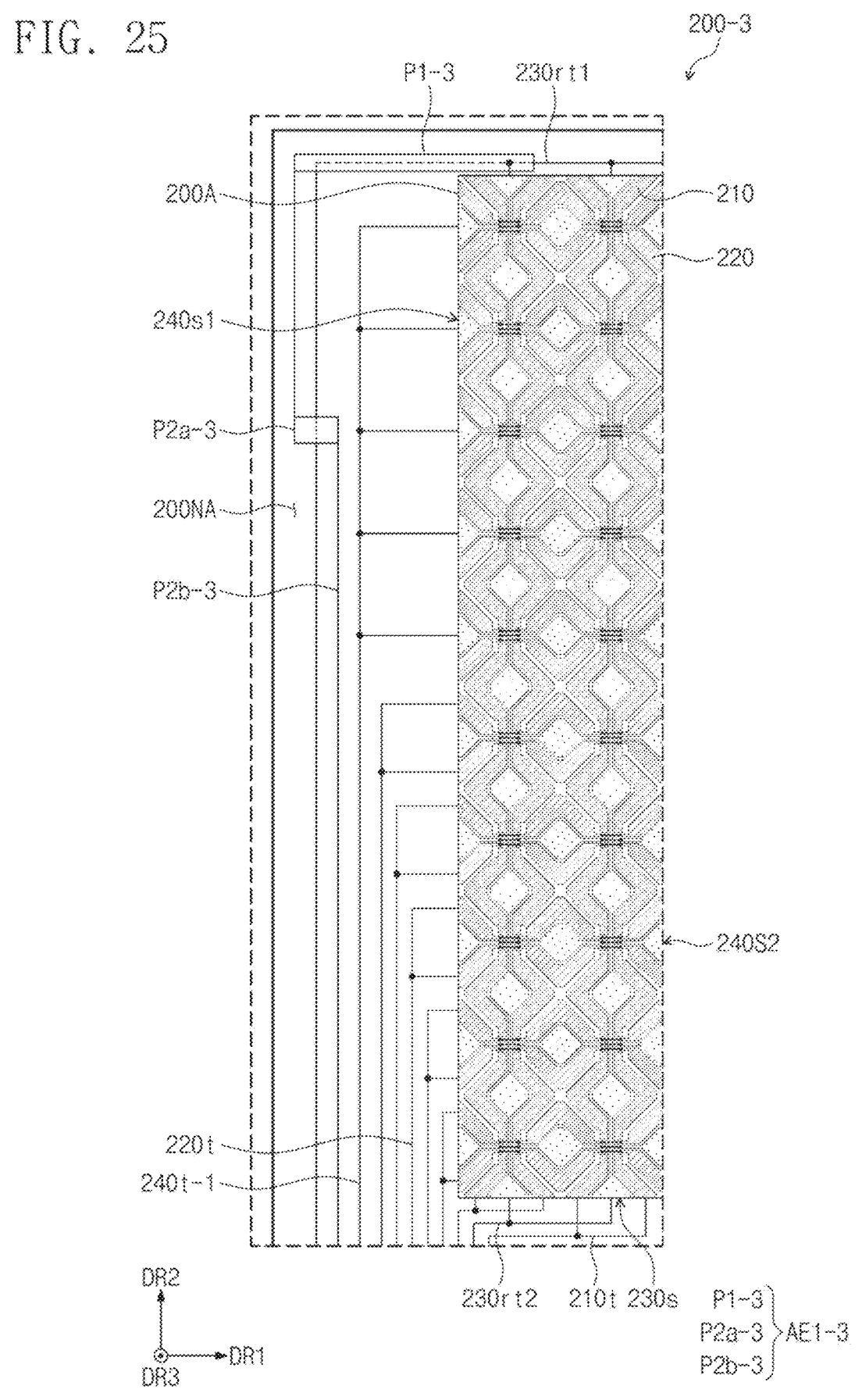

FIG. 25 is a plan view illustrating a portion of a sensor layer according to an embodiment of the present disclosure. In FIG. 25, the same or substantially the same components as those described above with reference to FIG. 8 may be denoted with the same reference symbols, and thus, redundant description thereabout may not be repeated hereinafter.

Referring to FIG. 25, the sensor layer 200-3 may include a first additional electrode AE1-3 disposed in the peripheral area 200NA.

The first additional electrode AE1-3 may include a first portion P1-3 and a second portion. The second portion may include a first sub-portion P2a-3 and a second sub-portion P2b-3.

The first portion P1-3 may extend in the first direction DR1. The first portion P1-3 may overlap with the third trace line 230rt1 when viewed from above the plane (e.g., in a plan view).

The first coupling capacitor Cc1 (e.g., refer to FIG. 20C) may be formed between the first portion P1-3 and the third trace line 230rt1. The first coupling capacitor Cc1 may be formed in the third direction DR3. In other words, the first coupling capacitor Cc1 may be a capacitor formed in the vertical direction.

The second portion may extend from the first portion P1-3 in the second direction DR2.

The first sub-portion P2a-3 may have a first area. The first sub-portion P2a-3 may include a first portion and a second portion spaced apart from each other with the second sub-portion P2b-3 therebetween. The first portion may be spaced apart from the active area 200A with the third trace line 230rt1 therebetween. The second portion may be disposed between the third trace line 230rt1 and the fourth trace line 240t-1.

The second sub-portion P2b-3 may have a second area. The second area may be greater than the first area. The second sub-portion P2b-3 may overlap with the third trace line 230rt1 when viewed from above the plane (e.g., in a plan view). A first-second coupling capacitor may be formed between the second sub-portion P2*b*-3 and the third trace line 230*rt*1. The first-second coupling capacitor may be formed in the third direction DR3. In other words, the first-second coupling capacitor may be a capacitor formed in the vertical direction.

According to some embodiments of the present disclosure, the first additional electrode AE1-3 disposed in the peripheral area 200NA may transfer an induced current formed by the pen PN (e.g., refer to FIG. 5) to the sensor driver 200C based on the first coupling capacitor Cc1 (e.g., refer to FIG. 20C) and the first-second coupling capacitor. The coupling capacitor between the first additional electrode AE1-3 and the third trace line 230*rt*1 may be increased, and thus, the magnitude of a sensing signal may be increased. The magnitude of a signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

Figure 26:
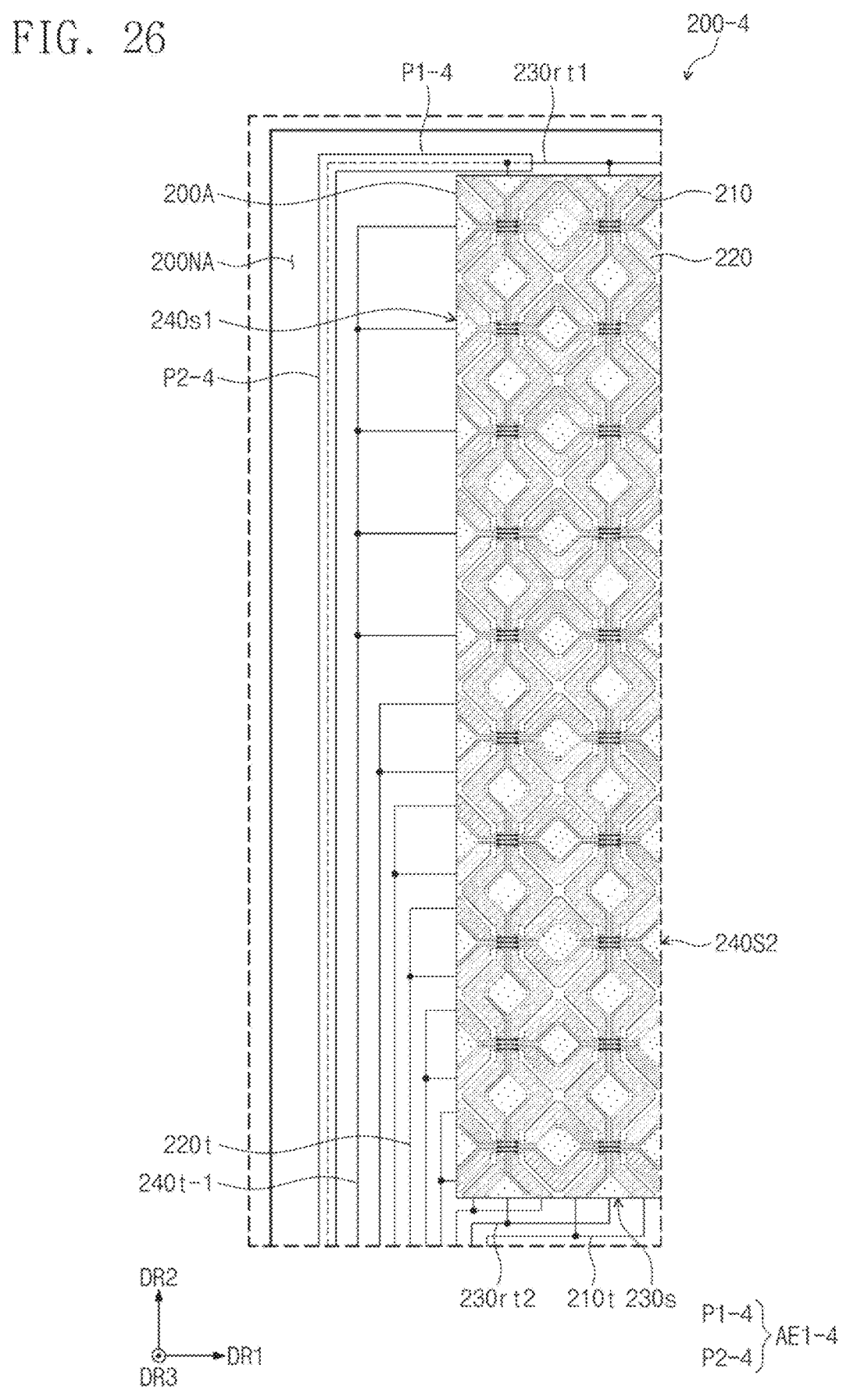

FIG. 26 is a plan view illustrating a portion of a sensor layer according to an embodiment of the present disclosure. In FIG. 26, the same or substantially the same components as those described above with reference to FIG. 8 may be denoted with the same reference symbols, and thus, redundant description thereabout may not be repeated hereinafter.

Referring to FIG. 26, the sensor layer 200-4 may include a first additional electrode AE1-4 disposed in the peripheral area 200NA.

The first additional electrode AE1-4 may include a first portion P1-4 and a second portion P2-4.

The first portion P1-4 may extend in the first direction DR1. The first portion P1-4 may overlap with the third trace line 230*rt*1 when viewed from above the plane (e.g., in a plan view).

The first coupling capacitor Cc1 (e.g., refer to FIG. 20C) may be formed between the first portion P1-4 and the third trace line 230*rt*1. The first coupling capacitor Cc1 may be formed in the third direction DR3. In other words, the first coupling capacitor Cc1 may be a capacitor formed in the vertical direction.

The second portion P2-4 may extend from the first portion P1-4 in the second direction DR2. The second portion P2-4 may overlap with the third trace line 230*rt*1 when viewed from above the plane (e.g., in a plan view).

A second coupling capacitor may be formed between the second portion P2-4 and the third trace line 230*rt*1. The second coupling capacitor may be formed in the third direction DR3. In other words, the second coupling capacitor may be a capacitor formed in the vertical direction.

According to some embodiments of the present disclosure, the first additional electrode AE1-4 disposed in the peripheral area 200NA may transfer an induced current formed by the pen PN (e.g., refer to FIG. 5) to the sensor driver 200C based on the first coupling capacitor Cc1 (e.g., refer to FIG. 20C) and the second coupling capacitor. The coupling capacitor between the first additional electrode AE1-4 and the third trace line 230*rt*1 may be increased, and thus, the magnitude of a sensing signal may be increased. The magnitude of a signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

Figure 27:
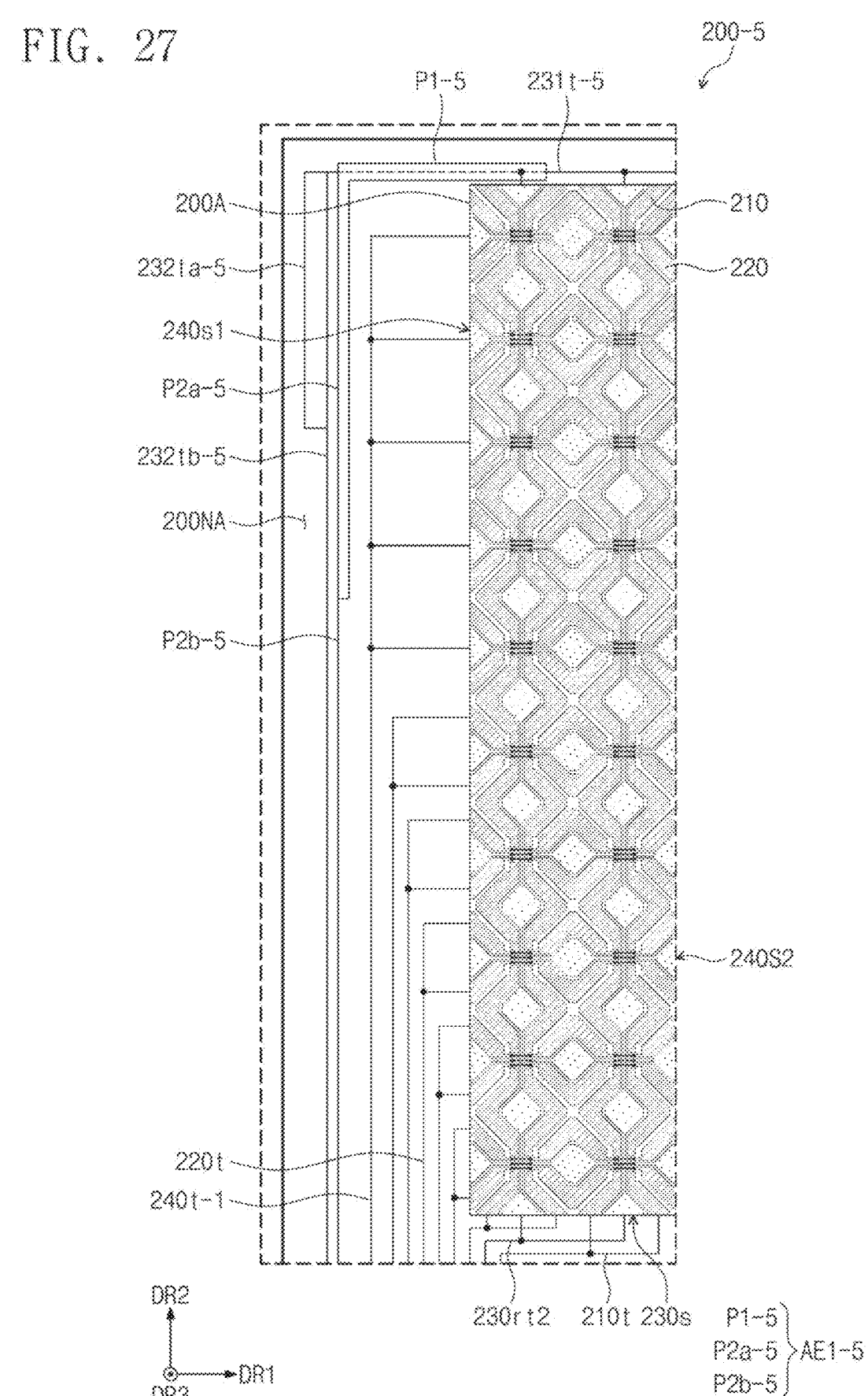
FIG. 27 is a plan view illustrating a portion of a sensor layer according to an embodiment of the present disclosure.

FIG. 27 is a plan view illustrating a portion of a sensor layer according to an embodiment of the present disclosure. In FIG. 27, the same or substantially the same components as those described above with reference to FIG. 8 may be denoted with the same reference symbols, and thus, redundant description thereabout may not be repeated hereinafter.

Referring to FIG. 27, the sensor layer 200-5 may include a first additional electrode AE1-5 disposed in the peripheral area 200NA.

The first additional electrode AE1-5 may include a first portion P1-5 and a second portion.

The first portion P1-5 may extend in the first direction DR1. The first portion P1-5 may overlap with a first line portion 231*t*-5 of the third trace line 230*rt*1 (e.g., refer to FIG. 8) when viewed from above the plane (e.g., in a plan view).

The first coupling capacitor Cc1 (e.g., refer to FIG. 20C) may be formed between the first portion P1-5 and the first line portion 231*t*-5. The first coupling capacitor Cc1 may be formed in the third direction DR3. In other words, the first coupling capacitor Cc1 may be a capacitor formed in the vertical direction.

The second portion may extend from the first portion P1-5 in the second direction DR2. The second portion may include a first sub-portion P2*a*-5 and a second sub-portion P2*b*-5.

The first sub-portion P2*a*-5 may have a first width.

The second sub-portion P2*b*-5 may have a second width. The second width may be different from the first width. For example, the second width may be smaller or narrower than the first width.

A second-first line portion 232*ta*-5 of the third trace line 230*rt*1 (e.g., refer to FIG. 8) may be adjacent to the first sub-portion P2*a*-5 in the first direction DR1. The second-first line portion 232*ta*-5 may have a third width.

A second coupling capacitor may be formed between the first sub-portion P2*a*-5 and the second-first line portion 232*ta*-5. The second coupling capacitor may be formed in the first direction DR1. In other words, the second coupling capacitor may be a capacitor formed in the horizontal direction.

A second-second line portion 232*tb*-5 of the third trace line 230*rt*1 (e.g., refer to FIG. 8) may be adjacent to the second sub-portion P2*b*-5 in the first direction DR1. The second-second line portion 232*tb*-5 may have a fourth width. The fourth width may be different from the third width. For example, the fourth width may be smaller or narrower than the third width.

According to some embodiments of the present disclosure, the first additional electrode AE1-5 disposed in the peripheral area 200NA may transfer an induced current formed by the pen PN (e.g., refer to FIG. 5) to the sensor driver 200C based on the first coupling capacitor Cc1 (e.g., refer to FIG. 20C) and the second coupling capacitor. The coupling capacitor between the first additional electrode AE1-5 and the third trace line 230*rt*1 may be increased, and thus, the magnitude of a sensing signal may be increased. The magnitude of a signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

Figure 28:
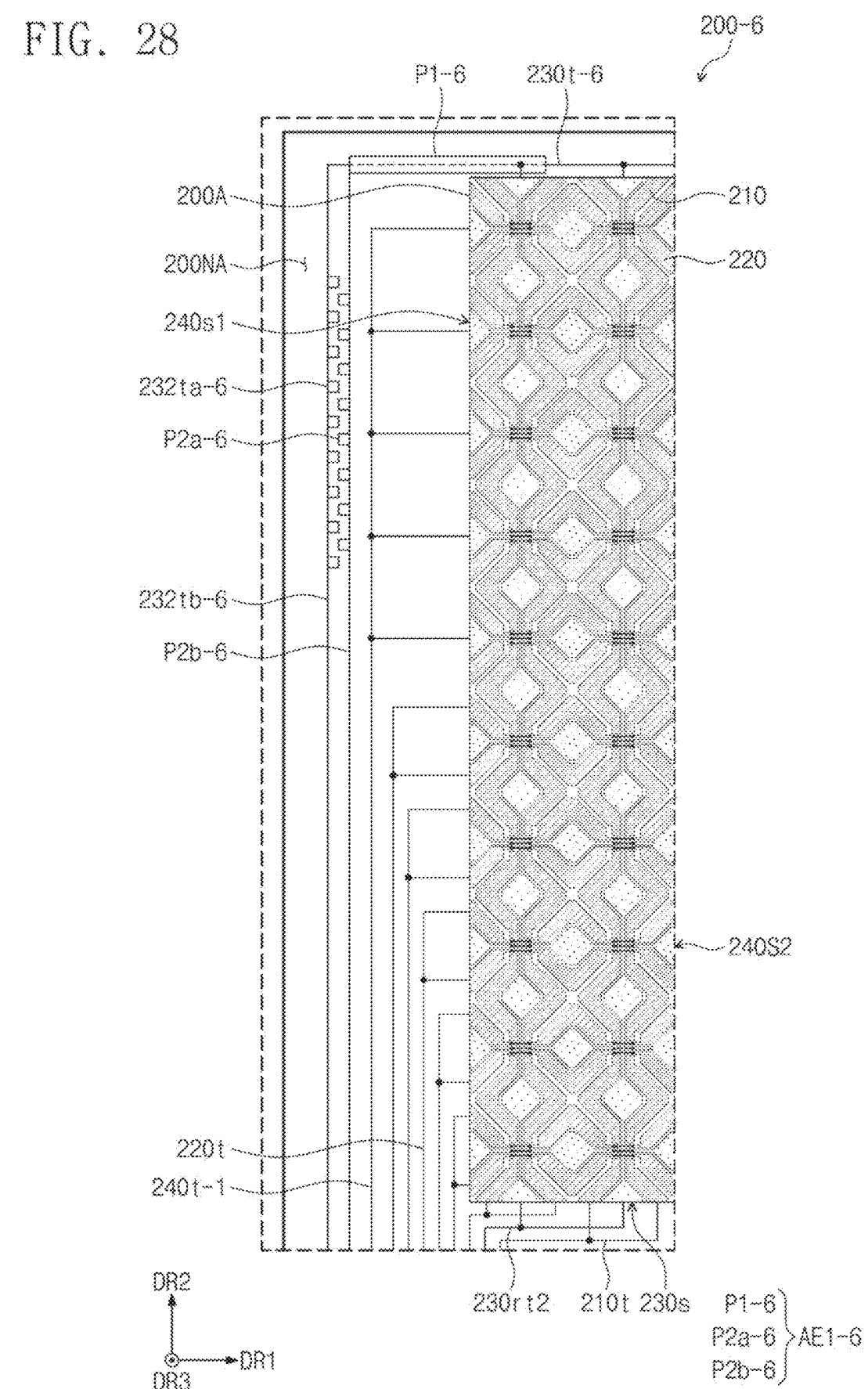
FIG. 28 is a plan view illustrating a portion of a sensor layer according to an embodiment of the present disclosure.

FIG. 28 is a plan view illustrating a portion of a sensor layer according to an embodiment of the present disclosure. In FIG. 28, the same or substantially the same components as those described above with reference to FIG. 8 may be denoted with the same reference symbols, and thus, redundant description thereabout may not be repeated hereinafter.

Referring to FIG. 28, the sensor layer 200-6 may include a first additional electrode AE1-6 disposed in the peripheral area 200NA.

The first additional electrode AE1-6 may include a first portion P1-6 and a second portion.

The first portion P1-6 may extend in the first direction DR1. The first portion P1-6 may overlap with a first line portion 231t-6 of the third trace line 230rt1 (e.g., refer to FIG. 8) when viewed from above the plane (e.g., in a plan view).

The first coupling capacitor Cc1 (e.g., refer to FIG. 20C) may be formed between the first portion P1-6 and the first line portion 231t-6. The first coupling capacitor Cc1 may be formed in the third direction DR3. In other words, the first coupling capacitor Cc1 may be a capacitor formed in the vertical direction.

The second portion may extend from the first portion P1-6 in the second direction DR2. The second portion may include a first sub-portion P2a-6 and a second sub-portion P2b-6.

The first sub-portion P2a-6 may have an uneven shape.

The second sub-portion P2b-6 may extend in the second direction DR2.

A second-first line portion 232ta-6 of the third trace line 230rt1 (e.g., refer to FIG. 8) may be adjacent to the first sub-portion P2a-6 in the first direction DR1. The second-first line portion 232ta-6 may have an uneven shape. The first sub-portion P2a-6 and the second-first line portion 232ta-6 may be engaged with each other when viewed from above the plane (e.g., in a plan view).

A second coupling capacitor may be formed between the first sub-portion P2a-6 and the second-first line portion 232ta-6. The second coupling capacitor may be formed in the first direction DR1. In other words, the second coupling capacitor may be a capacitor formed in the horizontal direction.

A second-second line portion 232tb-6 of the third trace line 230rt1 (e.g., refer to FIG. 8) may be adjacent to the second sub-portion P2b-6 in the first direction DR1.

According to some embodiments of the present disclosure, the first additional electrode AE1-6 disposed in the peripheral area 200NA may transfer an induced current formed by the pen PN (e.g., refer to FIG. 5) to the sensor driver 200C based on the first coupling capacitor Cc1 (e.g., refer to FIG. 20C) and the second coupling capacitor. The coupling capacitor between the first additional electrode AE1-6 and the third trace line 230rt1 may be increased, and thus, the magnitude of a sensing signal may be increased. The magnitude of a signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

Figure 29:
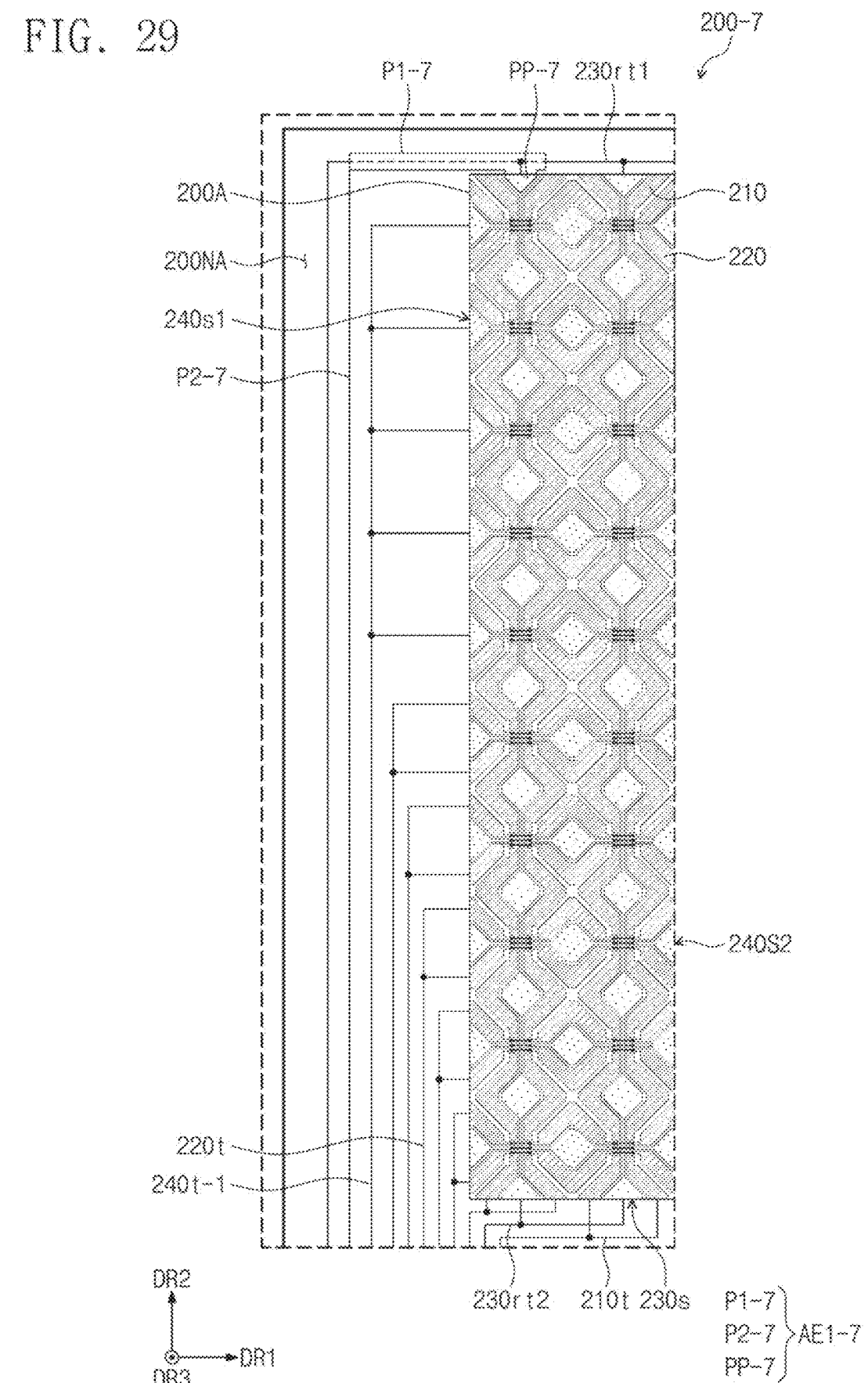
FIG. 29 is a plan view illustrating a portion of a sensor layer according to an embodiment of the present disclosure.

FIG. 29 is a plan view illustrating a portion of a sensor layer according to an embodiment of the present disclosure. In FIG. 29, the same or substantially the same components as those described above with reference to FIG. 8 may be denoted with the same reference symbols, and thus, redundant description thereabout may not be repeated hereinafter.

Referring to FIG. 29, the sensor layer 200-7 may include a first additional electrode AE1-7.

The first additional electrode AE1-7 may include a first portion P1-7, a second portion P2-7, and a protruding portion PP-7.

The first portion P1-7 may be disposed in the peripheral area 200NA. The first portion P1-7 may extend in the first direction DR1. The first portion P1-7 may overlap with the third trace line 230rt1 when viewed from above the plane (e.g., in a plan view).

The first coupling capacitor Cc1 (e.g., refer to FIG. 20C) may be formed between the first portion P1-7 and the third trace line 230rt1. The first coupling capacitor Cc1 may be formed in the third direction DR3. In other words, the first coupling capacitor Cc1 may be a capacitor formed in the vertical direction.

The second portion P2-7 may extend from the first portion P1-7 in the second direction DR2.

The protruding portion PP-7 may protrude from the first portion P1-7 in the second direction DR2. The protruding portion PP-7 may be disposed in the active area 200A.

The protruding portion PP-7 may overlap with one of the plurality of first auxiliary electrodes 230s when viewed from above the plane (e.g., in a plan view).

According to some embodiments of the present disclosure, the first additional electrode AE1-7 may transfer an induced current formed by the pen PN (e.g., refer to FIG. 5) to the sensor driver 200C based on the first coupling capacitor Cc1 (e.g., refer to FIG. 20C) and the coupling capacitor formed by the protruding portion PP-7. The coupling capacitor between the first additional electrode AE1-7, the third trace line 230rt1, and the plurality of first auxiliary electrodes 230s may be increased, and thus, the magnitude of a sensing signal may be increased. The magnitude of a signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

Figure 30:
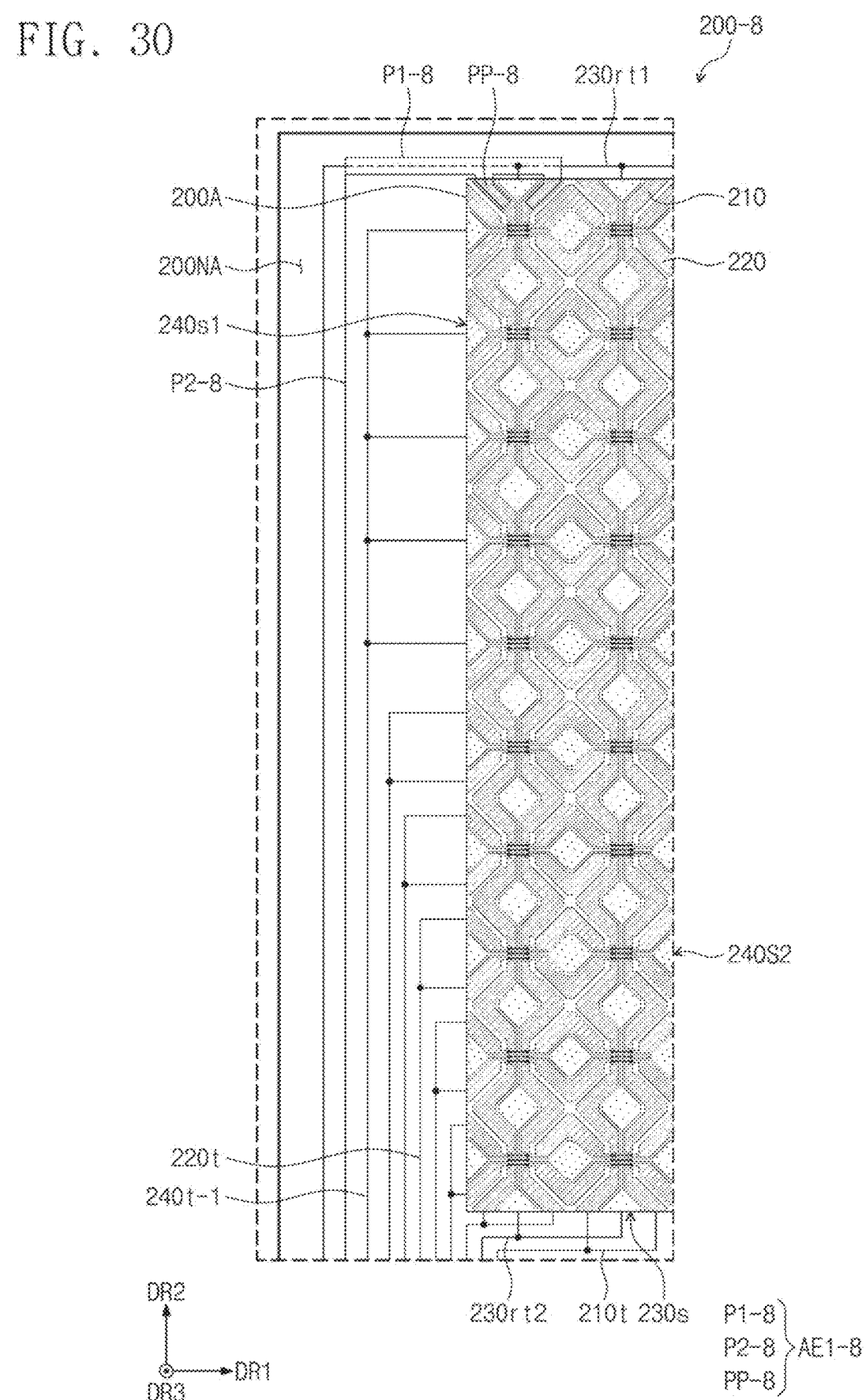
FIG. 30 is a plan view illustrating a portion of a sensor layer according to an embodiment of the present disclosure.

FIG. 30 is a plan view illustrating a portion of a sensor layer according to an embodiment of the present disclosure. In FIG. 30, the same or substantially the same components as those described above with reference to FIG. 8 may be denoted with the same reference symbols, and thus, redundant description thereabout may not be repeated hereinafter.

Referring to FIG. 30, the sensor layer 200-8 may include a first additional electrode AE1-8.

The first additional electrode AE1-8 may include a first portion P1-8, a second portion P2-8, and a protruding portion PP-8.

The first portion P1-8 may be disposed in the peripheral area 200NA. The first portion P1-8 may extend in the first direction DR1. The first portion P1-8 may overlap with the third trace line 230rt1 when viewed from above the plane (e.g., in a plan view).

The first coupling capacitor Cc1 (e.g., refer to FIG. 20C) may be formed between the first portion P1-8 and the third trace line 230rt1. The first coupling capacitor Cc1 may be formed in the third direction DR3. In other words, the first coupling capacitor Cc1 may be a capacitor formed in the vertical direction.

The second portion P2-8 may extend from the first portion P1-8 in the second direction DR2.

The protruding portion PP-8 may protrude from the first portion P1-8 in the second direction DR2. The protruding portion PP-8 may be disposed in the active area 200A.

The protruding portion PP-8 may overlap with one of the plurality of first electrodes 210 when viewed from above the plane (e.g., in a plan view).

According to some embodiments of the present disclosure, the first additional electrode AE1-8 may transfer an induced current formed by the pen PN (e.g., refer to FIG. 5) to the sensor driver 200C based on the first coupling capacitor Cc1 (e.g., refer to FIG. 20C) and the coupling capacitor formed by the protruding portion PP-8. The coupling capacitor between the first additional electrode AE1-8, the third trace line 230rt1, and the plurality of first electrodes 210 may be increased, and thus, the magnitude of a sensing signal may be increased. The magnitude of a signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

Figure 31:
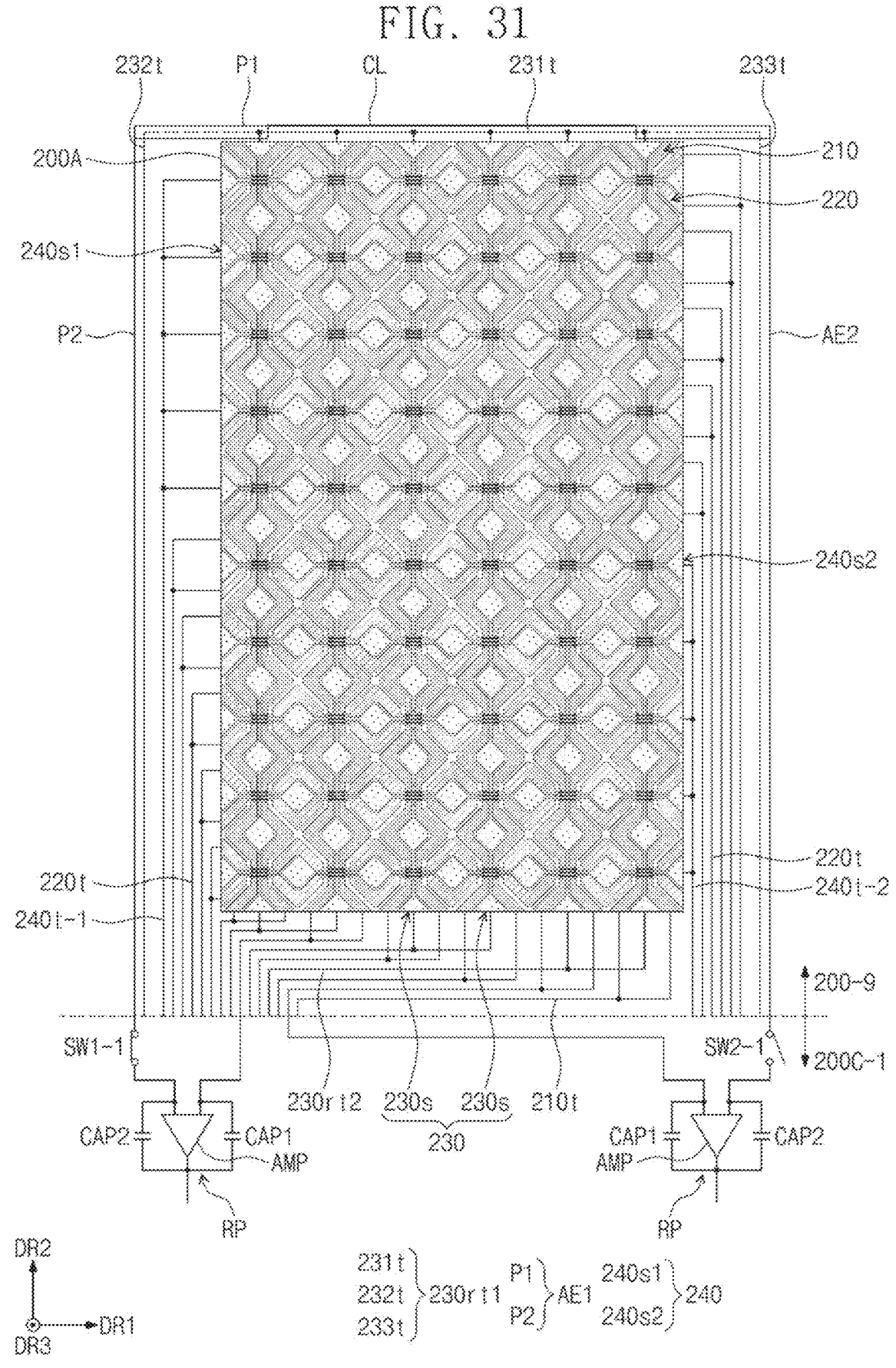
FIG. 31 is a view illustrating a sensor layer and a sensor driver according to an embodiment of the present disclosure.

FIG. 31 is a view illustrating a sensor layer and a sensor driver according to an embodiment of the present disclosure. In FIG. 31, the same or substantially the same components as those described above with reference to FIGS. 8 and 21B may be denoted with the same reference symbols, and thus, redundant description thereabout may not be repeated hereinafter.

Referring to FIG. 31, the sensor layer 200-9 may further include a connecting line CL. The connecting line CL may be disposed between the first additional electrode AE1 and the second additional electrode AE2, and may connect the first additional electrode AE1 and the second additional electrode AE2 to each other. For example, the connecting line CL may be directly connected with the first portion P1.

According to some embodiments of the present disclosure, the first additional electrode AE1, the second additional electrode AE2, and the connecting line CL may be electrically connected with one another. The coupling capacitor between the first additional electrode AE1, the second additional electrode AE2, the connecting line CL, and the third trace line 230rt1 may be increased, and thus, the magnitude of a sensing signal may be increased. The magnitude of a signal at the boundary between the active area 200A and the peripheral area 200NA may be improved. As such, a signal noise ratio (SNR) may be improved. Accordingly, the sensing reliability of the pen PN at the boundary between the active area 200A and the peripheral area 200NA may be improved.

In the second mode in which an input by the pen PN (e.g., refer to FIG. 5) is sensed, the sensor driver 200C-1 may be connected with one of the first additional electrode AE1 or the second additional electrode AE2, and the other one of the first additional electrode AE1 or the second additional electrode AE2 may be floated.

The sensor driver 200C-1 may include a plurality of receivers RP, a first switch SW1-1, and a second switch SW2-1.

One of the plurality of receivers RP may be electrically connected with one of the plurality of first electrodes 210 and the first switch SW1-1. The first switch SW1-1 may be connected with the first additional electrode AE1.

Another one of the plurality of receivers RP may be electrically connected with another one of the plurality of first electrodes 210 and the second switch SW2-1. The second switch SW2-1 may be connected with the second additional electrode AE2.

When one of the first switch SW1-1 or the second switch SW2-1 is short-circuited, the other may be open. In other words, the first switch SW1-1 and the second switch SW2-1 may not be concurrently or substantially simultaneously connected.

When the sensor driver 200C-1 senses the first reception signal PRX1 (e.g., refer to FIG. 19A) of the pen PN (e.g., refer to FIG. 5) using the one of the plurality of receivers RP, the second switch SW2-1 may not be connected with the other one of the plurality of receivers RP. As such, the first reception signal PRX1 (e.g., refer to FIG. 19A) may be provided to the one of the plurality of receivers RP through the first additional electrode AE1 without being transferred to the second additional electrode AE2.

When the sensor driver 200C-1 senses the first reception signal PRX1 (e.g., refer to FIG. 19A) of the pen PN (e.g., refer to FIG. 5) using the other one of the plurality of receivers RP, the first switch SW1-1 may not be connected with the one of the plurality of receivers RP. As such, the first reception signal PRX1 (e.g., refer to FIG. 19A) may be provided to the other one of the plurality of receivers RP through the second additional electrode AE2 without being transferred to the first additional electrode AE1.

Figure 32:
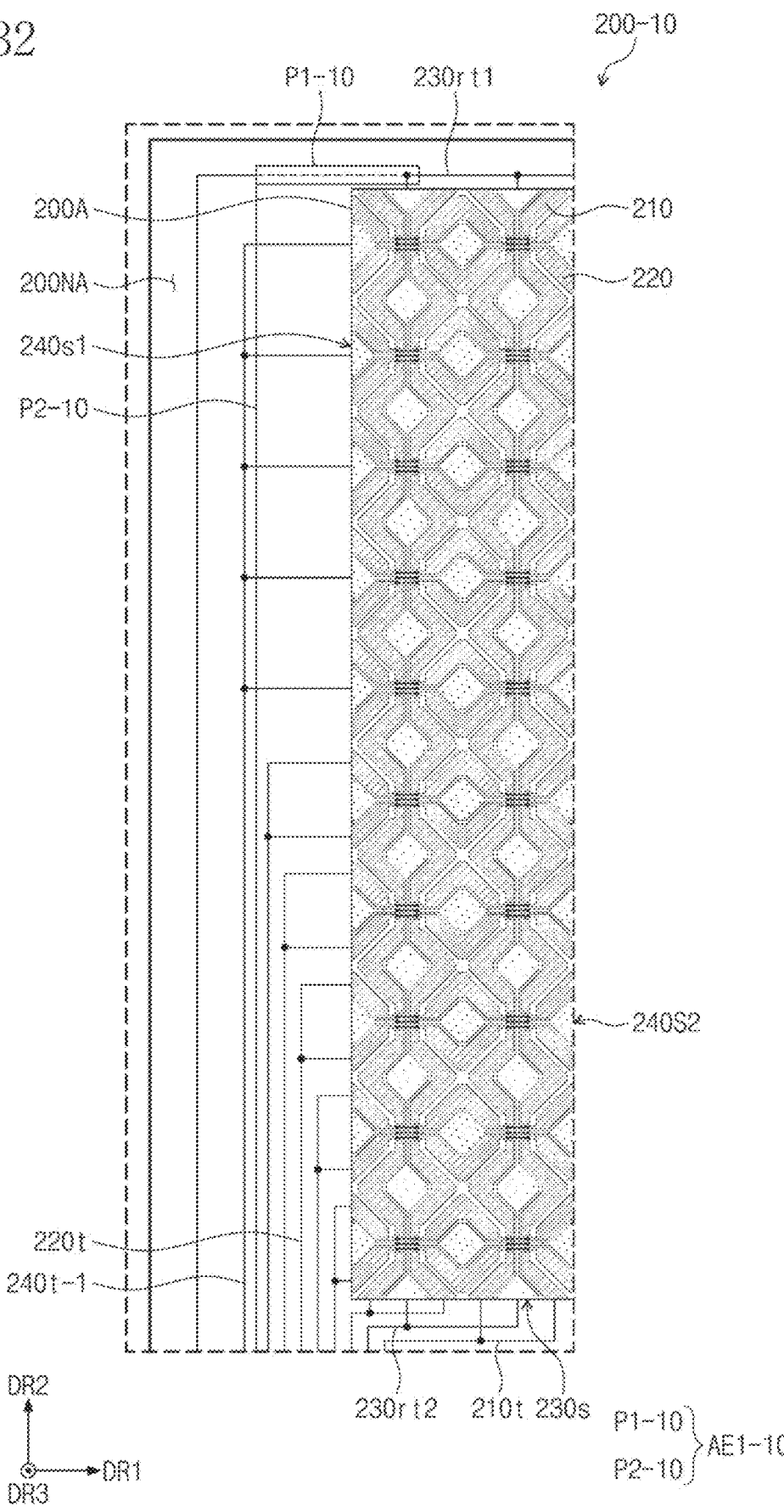
FIG. 32 is a plan view illustrating a portion of a sensor layer according to an embodiment of the present disclosure.

FIG. 32 is a plan view illustrating a portion of a sensor layer according to an embodiment of the present disclosure. In FIG. 32, the same or substantially the same components as those described above with reference to FIG. 8 may be denoted with the same reference symbols, and thus, redundant description thereabout may not be repeated hereinafter.

Referring to FIG. 32, the sensor layer 200-10 may include a first additional electrode AE1-10 disposed in the peripheral area 200NA.

The first additional electrode AE1-10 may include a first portion P1-10 and a second portion P2-10.

The first portion P1-10 may extend in the first direction DR1. The first portion P1-10 may overlap with the third trace line 230rt1 when viewed from above the plane (e.g., in a plan view).

The first coupling capacitor Cc1 (e.g., refer to FIG. 20C) may be formed between the first portion P1-10 and the third trace line 230rt1. The first coupling capacitor Cc1 may be formed in the third direction DR3. In other words, the first coupling capacitor Cc1 may be a capacitor formed in the vertical direction.

The second portion P2-10 may extend from the first portion P1-10 in the second direction DR2. The second portion P2-10 may be disposed between the second trace line 220t and the fourth trace line 240t-1 when viewed from above the plane (e.g., in a plan view). For example, the second portion P2-10 may be disposed adjacent to the outermost line of the second trace line 220t.

According to some embodiments of the present disclosure, the first additional electrode AE1-10 disposed in the peripheral area 200NA may transfer an induced current formed by the pen PN (e.g., refer to FIG. 5) to the sensor driver 200C based on the first coupling capacitor Cc1 (e.g., refer to FIG. 20C). Accordingly, the sensing reliability of the pen PN at the boundary between the active area 200A and the peripheral area 200NA may be improved.

In the self-capacitance detection mode of the first mode MD1-d (e.g., refer to FIG. 15) and the first mode MD1, the first additional electrode AE1-10 may be driven with the same or substantially the same phase and potential as those of the adjacent second trace line 220t.

In the mutual-capacitance detection mode of the first mode MD1-d (e.g., refer to FIG. 15) and the first mode MD1, the first additional electrode AE1-10 may be driven by a ground voltage.

According to some embodiments of the present disclosure, in the first mode MD1-d and the first mode MD1, the first additional electrode AE1-10 may operate as a guard electrode. A parasitic capacitor may be prevented or substantially prevented from being formed between the third trace line 230rt1, the fourth trace line 240t-1, and the second trace line 220*t*. Accordingly, the electronic device 1000 having an improved sensing reliability may be provided.

Figure 33:
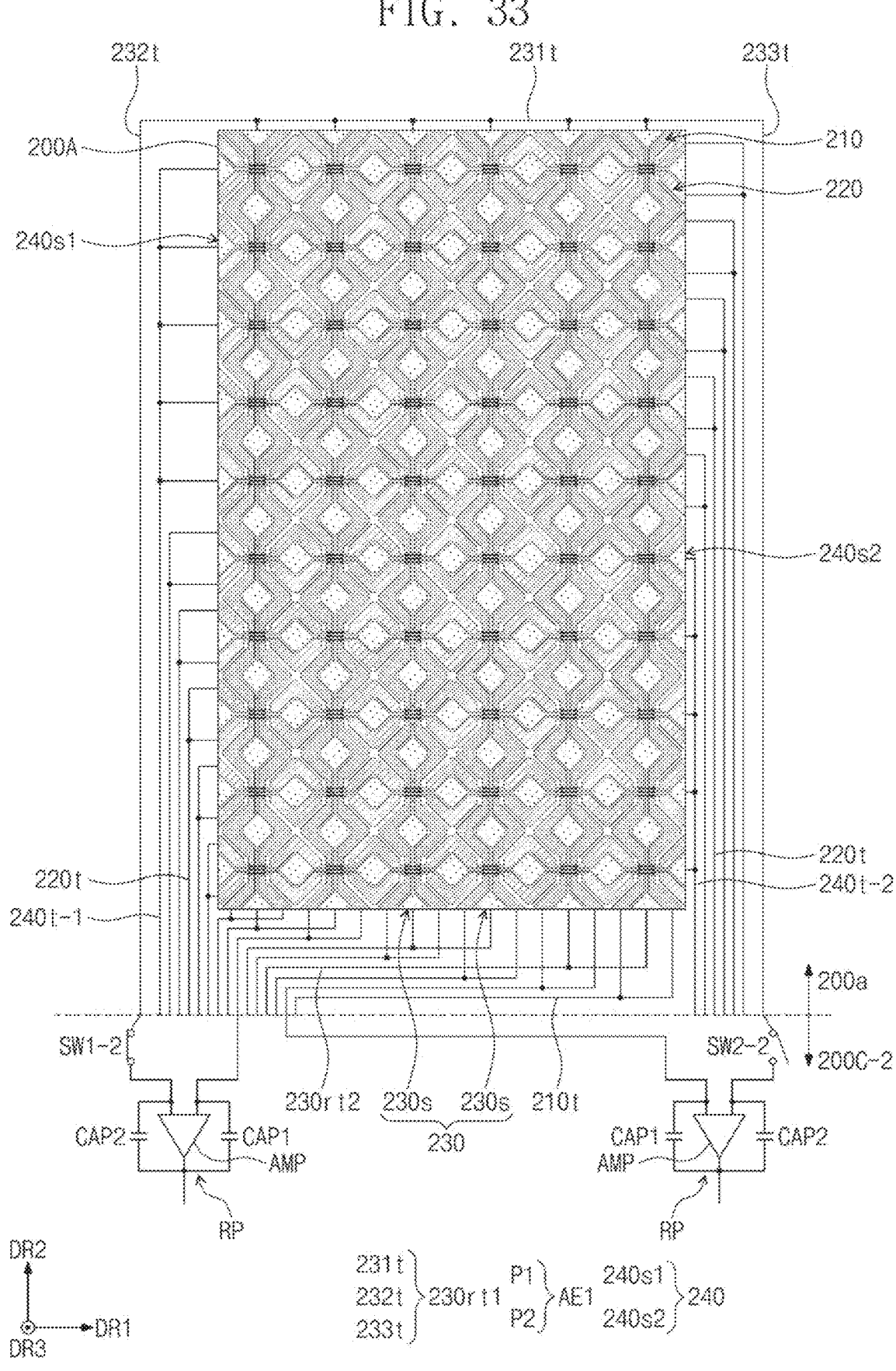
FIG. 33 is a view illustrating a sensor layer and a sensor driver according to an embodiment of the present disclosure.

FIG. 33 is a view illustrating a sensor layer and a sensor driver according to an embodiment of the present disclosure. In FIG. 33, the same or substantially the same components as those described above with reference to FIGS. 8 and 21B may be denoted with the same reference symbols, and thus, redundant description thereabout may not be repeated hereinafter.

Referring to FIG. 33, the sensor driver 200C-2 may drive the sensor layer 200*a*.

The sensor driver 200C-2 may include a plurality of receivers RP, a first switch SW1-2, and a second switch SW2-2.

One of the plurality of receivers RP may be electrically connected with one of the plurality of first electrodes 210 and the first switch SW1-2. The first switch SW1-2 may be connected with the second line portion 232*t*. In other words, the first switch SW1-2 may be connected to a first end of the third trace line 230*rt*1.

Another one of the plurality of receivers RP may be electrically connected with another one of the plurality of first electrodes 210 and the second switch SW2-2. The second switch SW2-2 may be connected with the third line portion 233*t*. In other words, the second switch SW2-2 may be connected to a second end of the third trace line 230*rt*1.

When one of the first switch SW1-2 or the second switch SW2-2 is short-circuited, the other may be open. In other words, the first switch SW1-2 and the second switch SW2-2 may not be concurrently or substantially simultaneously connected.

When the sensor driver 200C-2 senses the first reception signal PRX1 (e.g., refer to FIG. 19A) of the pen PN (e.g., refer to FIG. 5) using the one of the plurality of receivers RP, the second switch SW2-2 may not be connected with the other one of the plurality of receivers RP. In other words, when the one of the plurality of receivers RP is connected with the first end of the third trace line 230*rt*1 in the second mode MD2 (e.g., refer to FIG. 15), the other one of the plurality of receivers RP may not be connected with the second end of the third trace line 230*rt*1. As such, the first reception signal PRX1 (e.g., refer to FIG. 19A) may be provided to the one of the plurality of receivers RP through the first additional electrode AE1 without being transferred to the second additional electrode AE2.

When the sensor driver 200C-2 senses the first reception signal PRX1 (e.g., refer to FIG. 19A) of the pen PN (e.g., refer to FIG. 5) using the other one of the plurality of receivers RP, the first switch SW1-2 may not be connected with the one of the plurality of receivers RP. In other words, when the other one of the plurality of receivers RP is connected with the second end of the third trace line 230*rt*1 in the second mode MD2 (e.g., refer to FIG. 15), the one of the plurality of receivers RP may not be connected with the first end of the third trace line 230*rt*1. As such, the first reception signal PRX1 (e.g., refer to FIG. 19A) may be provided to the other one of the plurality of receivers RP through the second additional electrode AE2 without being transferred to the first additional electrode AE1.

The potential of the third trace line 230*rt*1 of the sensor layer 200*a* that operates in the charging drive mode may be raised by the charging signals SG1 and SG2 (e.g., refer to FIG. 18B). The second mode MD2 (e.g., refer to FIG. 15) may further include a mode for decreasing the potential of the third trace line 230*rt*1 before the sensor layer 200*a* operates in the pen sensing drive mode.

As described above, in some embodiments of the present disclosure, the first additional electrode disposed in the peripheral area may transfer the induced current formed by the pen to the sensor driver based on the first coupling capacitor formed between the first trace line and the first additional electrode. The magnitude of a signal at the boundary between the active area and the peripheral area may be improved. Accordingly, the sensing reliability of the pen at the boundary between the active area and the peripheral area may be improved.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:
a sensor layer having an active area, and a peripheral area adjacent to the active area; and
a sensor driver configured to drive the sensor layer by selectively operating in a first mode to sense a touch input or in a second mode to sense a pen input,
wherein the sensor layer comprises:
a plurality of first electrodes along a first direction, and extending in a second direction crossing the first direction;
a plurality of second electrodes along the second direction, and extending in the first direction;
a plurality of first auxiliary electrodes along the first direction, and extending in the second direction;
a first trace line in the peripheral area, and connected with the plurality of first auxiliary electrodes; and
a first additional electrode in the peripheral area, and comprising:
a first portion overlapping with the first trace line in a plan view; and
a second portion connecting one end of the first portion with the sensor driver.

2. The electronic device of claim 1, wherein a coupling capacitor is defined between the first portion and the first trace line.

3. The electronic device of claim 1, wherein, in a plan view, the second portion is spaced from the active area with the first trace line therebetween.

4. The electronic device of claim 1, wherein the first portion extends in the first direction, and the second portion extends in the second direction.

5. The electronic device of claim 1, wherein the first portion is located over the first trace line.

6. The electronic device of claim 1, wherein the sensor driver is configured to sense coordinates of the pen input based on one of the plurality of first electrodes and the first additional electrode.

7. The electronic device of claim 6, wherein the sensor driver further comprises a receiver electrically connected with the one of the plurality of first electrodes and the first additional electrode, the receiver comprising:

an amplifier comprising a first input terminal, a second input terminal, and an output terminal;

a first feedback capacitor connected between the first input terminal and the output terminal; and a second feedback capacitor connected between the second input terminal and the output terminal, and wherein a capacitance of the first feedback capacitor is different from a capacitance of the second feedback capacitor.

8. The electronic device of claim 1, wherein the sensor layer further comprises a plurality of second trace lines connected with the plurality of second electrodes, respectively, and wherein the second portion is located between the first trace line and the plurality of second trace lines in a plan view.

9. The electronic device of claim 8, wherein a second-first coupling capacitor is defined between the second portion and the first trace line, and wherein a second-second coupling capacitor is defined between the second portion and each of the plurality of second trace lines.

10. The electronic device of claim 1, wherein the second portion comprises:

a first sub-portion having a first area; and a second sub-portion overlapping with the first trace line in a plan view, the second sub-portion having a second area greater than the first area.

11. The electronic device of claim 1, wherein the second portion overlaps with the first trace line in a plan view.

12. The electronic device of claim 1, wherein the second portion comprises:

a first sub-portion having a first width; and a second sub-portion having a second width different from the first width.

13. The electronic device of claim 1, wherein the second portion has an uneven shape.

14. The electronic device of claim 1, wherein the first additional electrode further comprises a protruding portion protruding from the first portion and located in the active area.

15. The electronic device of claim 14, wherein the protruding portion overlaps with one of the plurality of first electrodes in a plan view.

16. The electronic device of claim 14, wherein the protruding portion overlaps with one of the plurality of first auxiliary electrodes in a plan view.

17. The electronic device of claim 1, wherein the sensor layer further comprises a second additional electrode in the peripheral area, and spaced from the first additional electrode in the first direction with the active area therebetween.

18. The electronic device of claim 17, wherein the first additional electrode and the second additional electrode are connected with each other.

19. The electronic device of claim 18, wherein, in the second mode, the sensor driver is connected with one of the first additional electrode or the second additional electrode, and another one of the first additional electrode or the second additional electrode is floated.

20. An electronic device comprising:

a sensor layer; and a sensor driver comprising a plurality of receivers, the sensor driver being configured to selectively operate in a first mode to sense a touch input or in a second mode to sense a pen input, wherein the sensor layer comprises:

a plurality of first electrodes along a first direction, and extending in a second direction crossing the first direction;

a plurality of second electrodes along the second direction, and extending in the first direction;

a plurality of first auxiliary electrodes along the first direction, and extending in the second direction; and a first trace line connected with the plurality of first auxiliary electrodes, the first trace line comprising a first end and a second end, wherein, when one of the plurality of receivers is connected with the first end in the second mode, another one of the plurality of receivers is not connected with the second end, and wherein, when another one of the plurality of receivers is connected with the second end, the one of the plurality of receivers is not connected with the first end.

* * * * *